(12) United States Patent
Kubota

(10) Patent No.: US 9,746,652 B2
(45) Date of Patent: Aug. 29, 2017

(54) PROJECTION LENS AND IMAGE DISPLAY DEVICE

(71) Applicant: Takashi Kubota, Tokyo (JP)

(72) Inventor: Takashi Kubota, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/170,159

(22) Filed: Jun. 1, 2016

(65) Prior Publication Data

US 2016/0363745 A1     Dec. 15, 2016

(30) Foreign Application Priority Data

Jun. 10, 2015 (JP) ................. 2015-117708
Jul. 8, 2015 (JP) ................. 2015-137251
Jul. 8, 2015 (JP) ................. 2015-137273

(51) Int. Cl.

| | | |
|---|---|---|
| *G02B 15/177* | (2006.01) | |
| *G02B 13/16* | (2006.01) | |
| *G03B 21/20* | (2006.01) | |
| *G03B 21/14* | (2006.01) | |
| *G02B 13/00* | (2006.01) | |
| *G03B 21/28* | (2006.01) | |

(52) U.S. Cl.
CPC ............ *G02B 15/177* (2013.01); *G02B 13/00* (2013.01); *G02B 13/16* (2013.01); *G03B 21/142* (2013.01); *G03B 21/208* (2013.01); *G03B 21/28* (2013.01)

(58) Field of Classification Search
CPC ...... G03B 21/28; G03B 21/53; G03B 21/142; G03B 21/208; G03B 21/2066; G03B 2205/0046; G03B 2205/0053; G02B 17/008; G02B 17/0892; G02B 17/0896
See application file for complete search history.

(56) References Cited

U.S. PATENT DOCUMENTS

| | | | | |
|---|---|---|---|---|
| 2007/0229779 A1* | 10/2007 | Kuwata | ................ | G02B 13/16 353/99 |
| 2008/0123059 A1* | 5/2008 | Abe | ................ | G03B 21/00 353/70 |
| 2011/0128637 A1 | 6/2011 | Kubota | | |

(Continued)

FOREIGN PATENT DOCUMENTS

| | | |
|---|---|---|
| JP | 2004-333688 | 11/2004 |
| JP | 2004-354405 | 12/2004 |

(Continued)

*Primary Examiner* — Sultan Chowdhury
(74) *Attorney, Agent, or Firm* — Oblon, McClelland, Maier & Neustadt, L.L.P.

(57) ABSTRACT

A projection lens includes, in order from a magnification side to a reduction side, a first lens group having a negative refractive power, a reflector to bend an optical path, a second lens group having a positive refractive power, and an aperture stop disposed within the second lens group. The second lens group has a positive refractive power on the magnification side of the aperture stop, and a negative refractive power on the reduction side of the aperture stop. Conditional formula (A) is satisfied: (A) Ot/Y'<6.1, where Ot is a distance along the optical axis between a maximum-magnification-side surface of the first lens group and a surface of a lens adjacent to a reduction-side surface of the reflector, and Y' is a maximum height of the image displayed on the display surface of the image display element.

20 Claims, 41 Drawing Sheets

(56) References Cited

U.S. PATENT DOCUMENTS

| | | |
|---|---|---|
| 2011/0310496 A1 | 12/2011 | Kubota et al. |
| 2011/0317285 A1 | 12/2011 | Ohashi et al. |
| 2012/0147485 A1 | 6/2012 | Kubota |
| 2012/0154768 A1 | 6/2012 | Tatsuno |
| 2013/0070217 A1 | 3/2013 | Tatsuno |
| 2013/0194488 A1 | 8/2013 | Kubota et al. |
| 2013/0194681 A1 | 8/2013 | Ohashi et al. |
| 2013/0308105 A1 | 11/2013 | Kubota |
| 2014/0016214 A1 | 1/2014 | Kubota et al. |
| 2014/0063612 A1 | 3/2014 | Kubota |
| 2014/0126072 A1 | 5/2014 | Ohashi et al. |
| 2014/0139931 A1 | 5/2014 | Kubota |
| 2014/0185143 A1 | 7/2014 | Kubota |
| 2014/0185144 A1 | 7/2014 | Kubota |
| 2014/0340768 A1 | 11/2014 | Kubota et al. |
| 2015/0138649 A1 | 5/2015 | Kubota |
| 2016/0054544 A1 | 2/2016 | Ohashi et al. |

FOREIGN PATENT DOCUMENTS

| | | |
|---|---|---|
| JP | 2012-132967 | 7/2012 |
| JP | 2013-019985 | 1/2013 |
| JP | 2013-019986 | 1/2013 |
| JP | 2013-083817 | 5/2013 |

\* cited by examiner

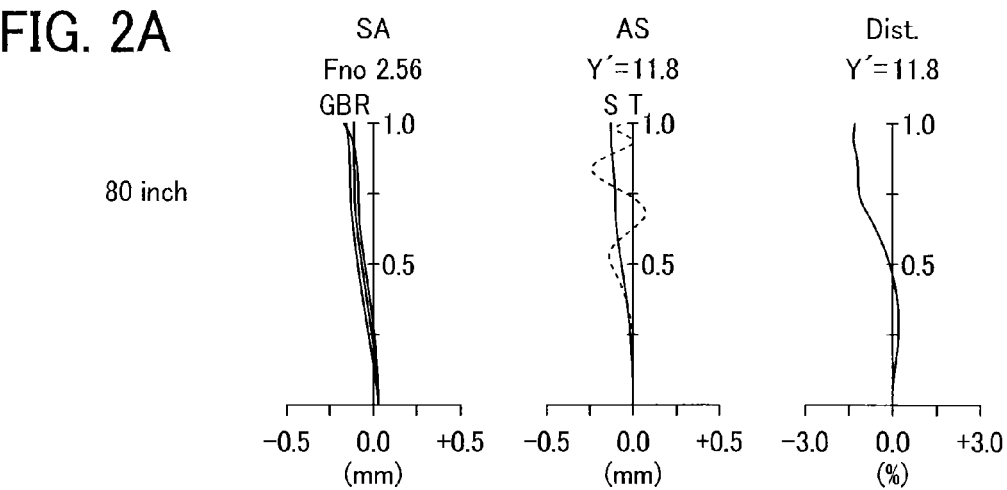
FIG. 2A  80 inch
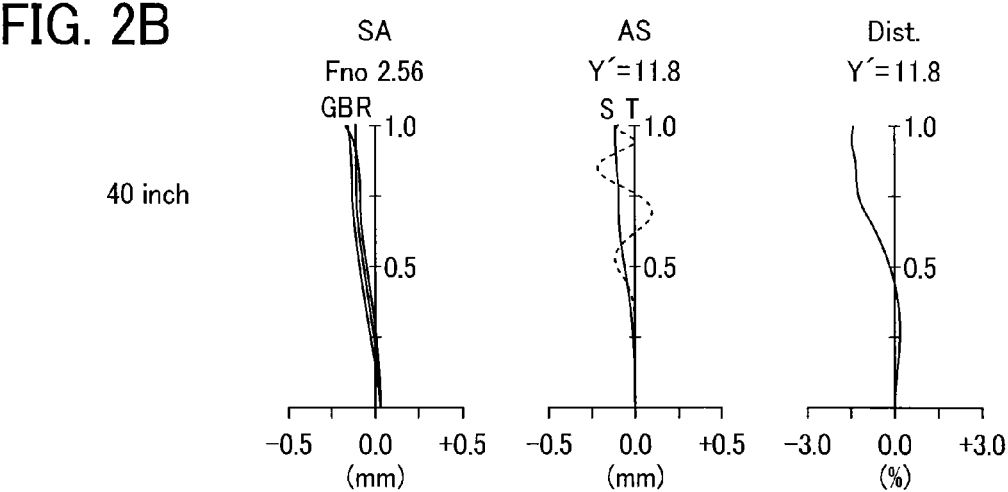
FIG. 2B  40 inch
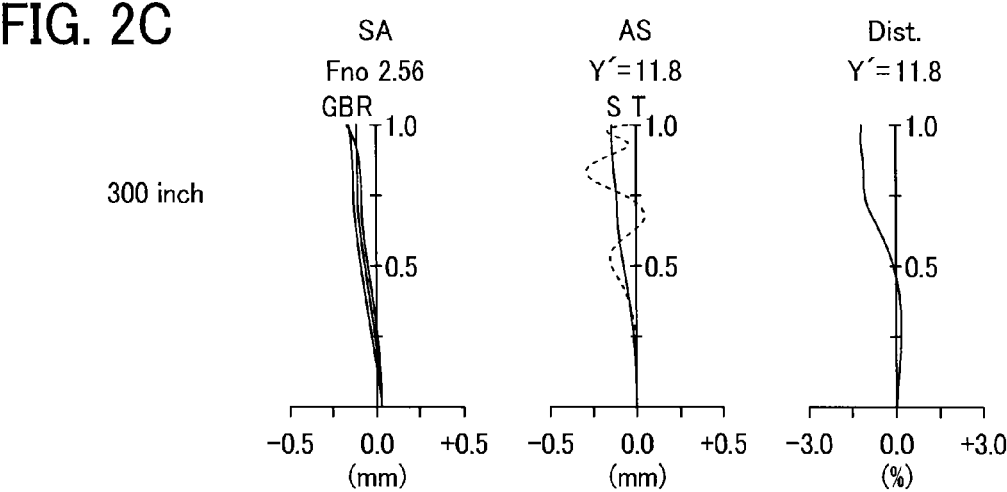
FIG. 2C  300 inch

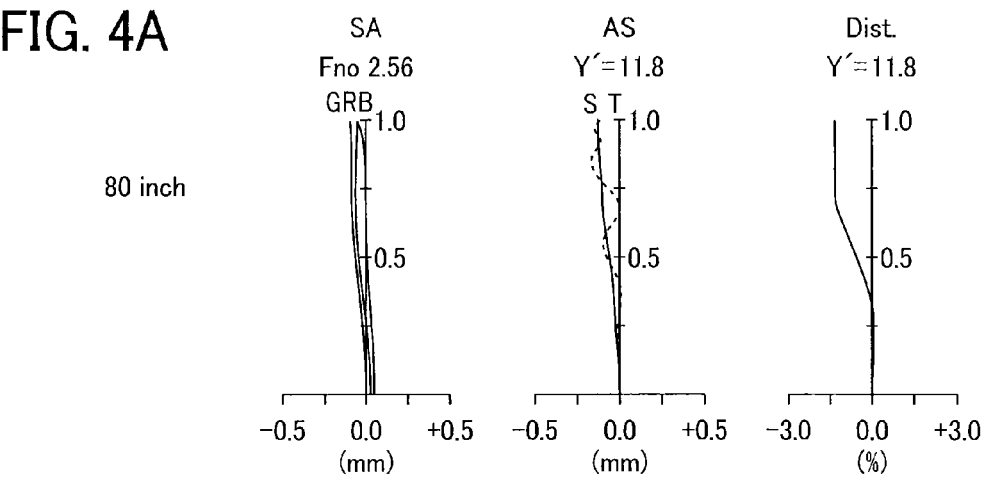
FIG. 4A 80 inch
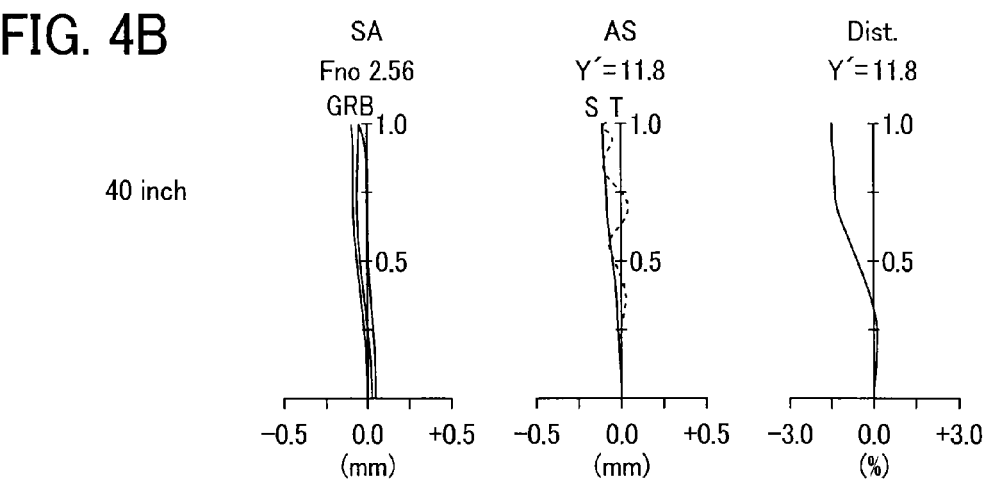
FIG. 4B 40 inch
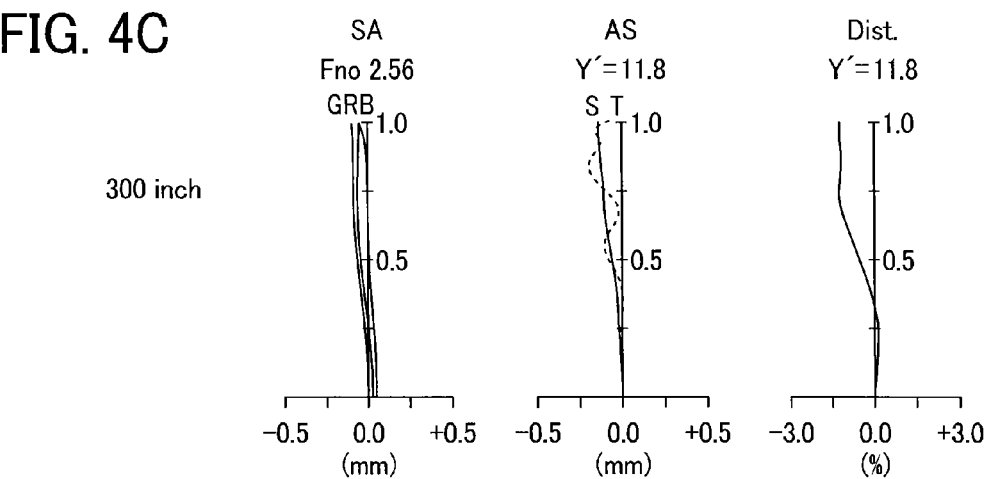
FIG. 4C 300 inch

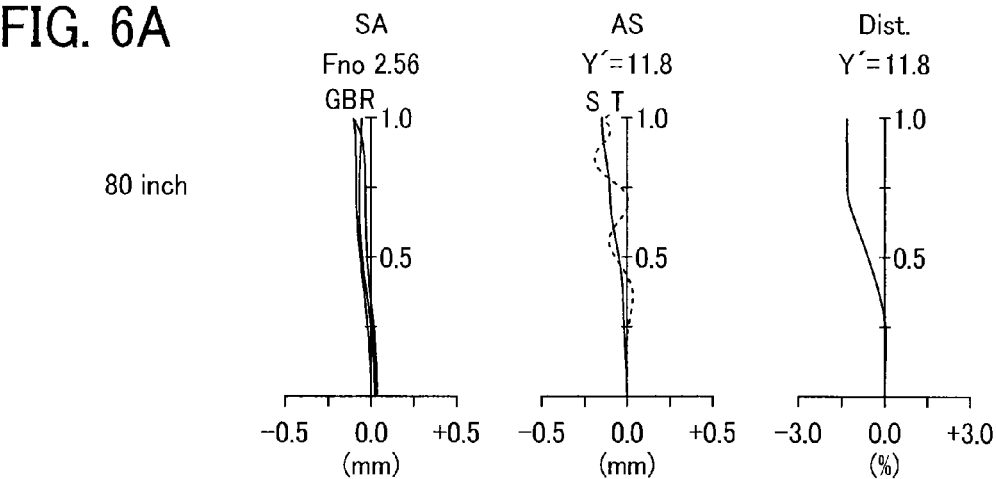
FIG. 6A  80 inch
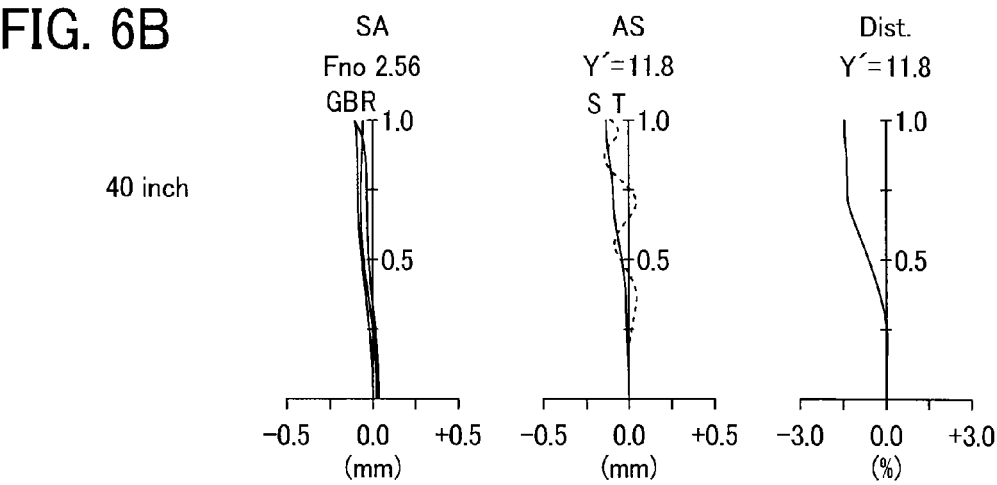
FIG. 6B  40 inch
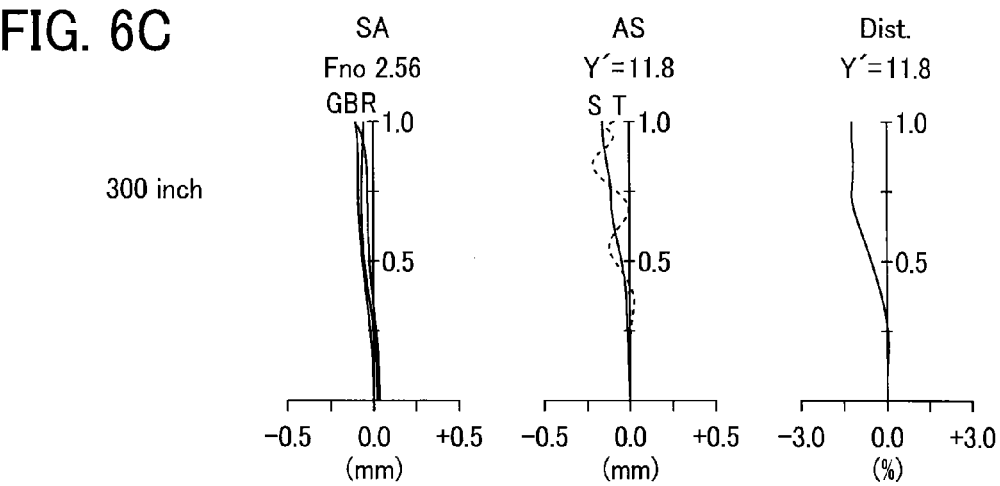
FIG. 6C  300 inch

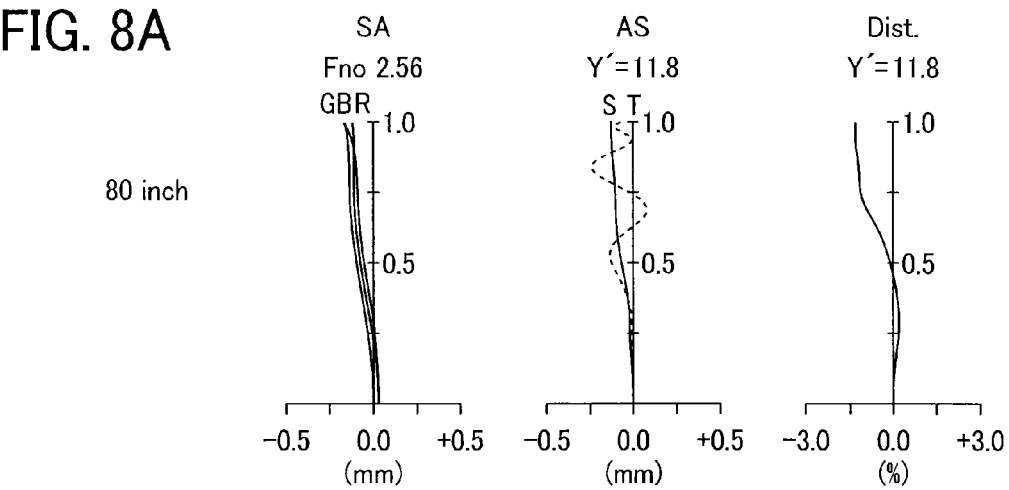
FIG. 8A 80 inch
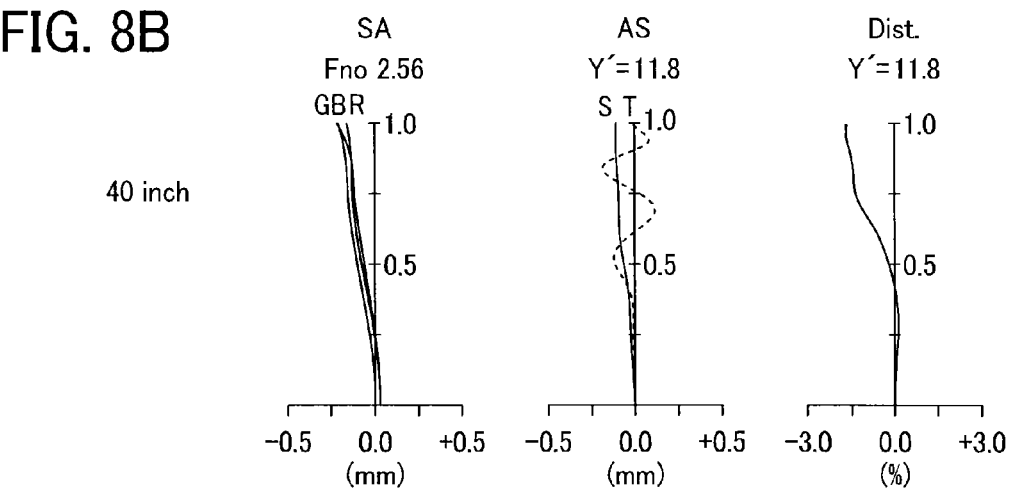
FIG. 8B 40 inch
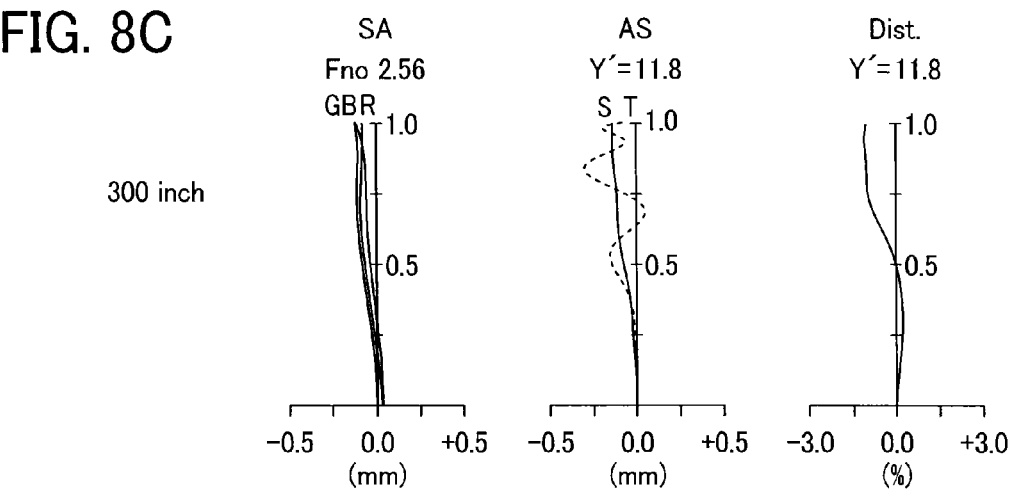
FIG. 8C 300 inch

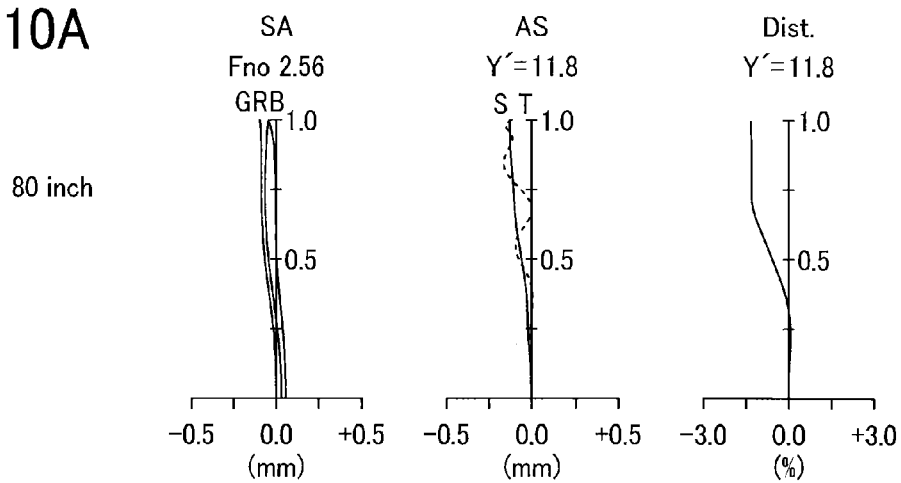
FIG. 10A  80 inch
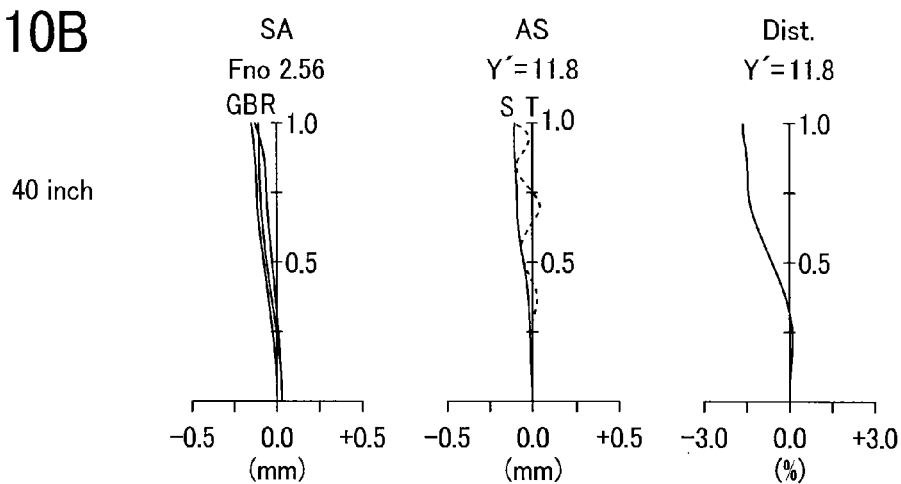
FIG. 10B  40 inch
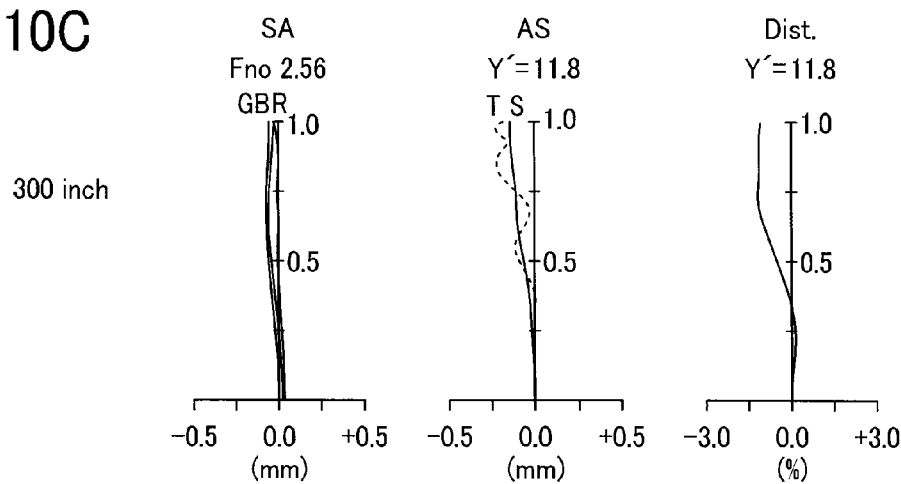
FIG. 10C  300 inch

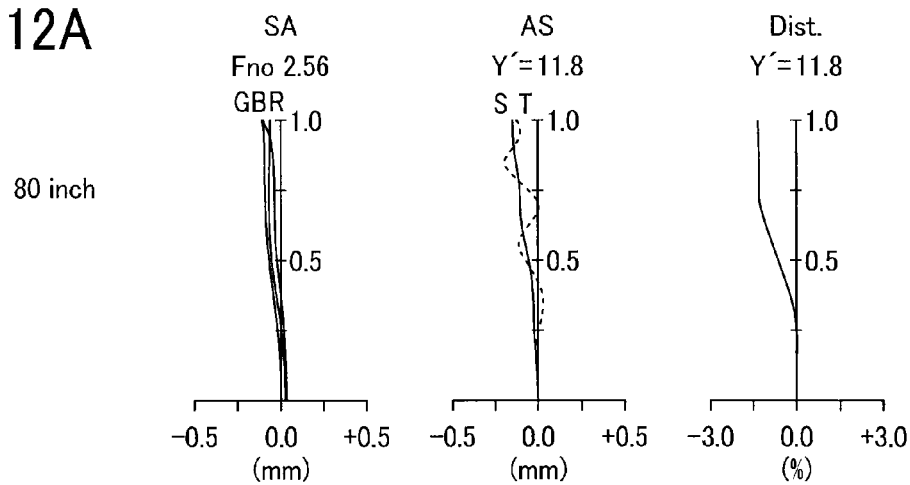
FIG. 12A 80 inch
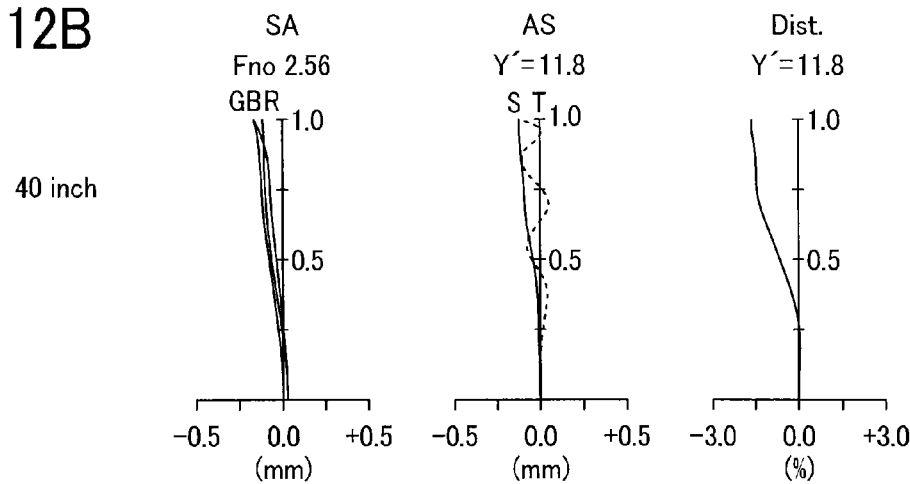
FIG. 12B 40 inch
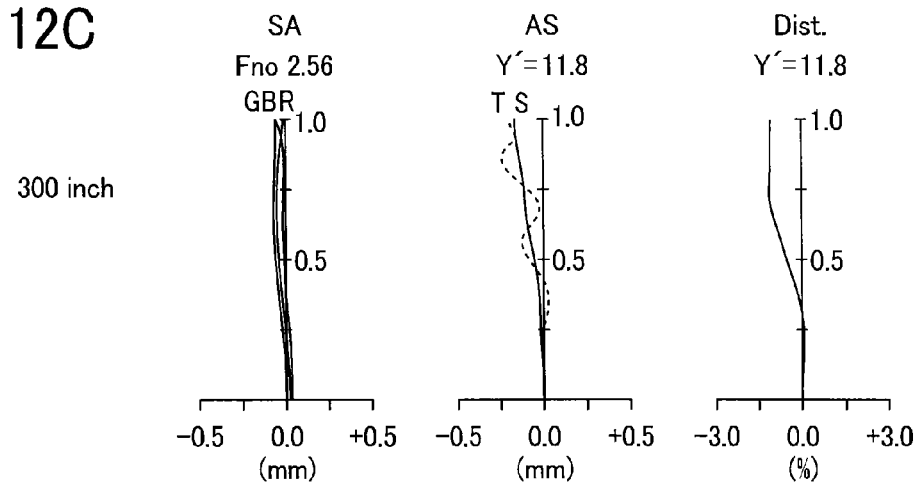
FIG. 12C 300 inch

FOCUSING

FOCUSING

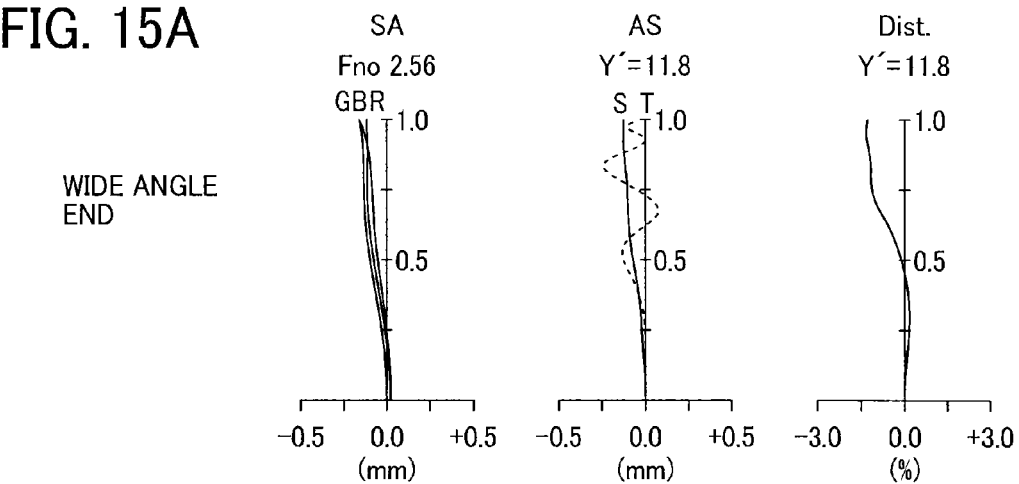
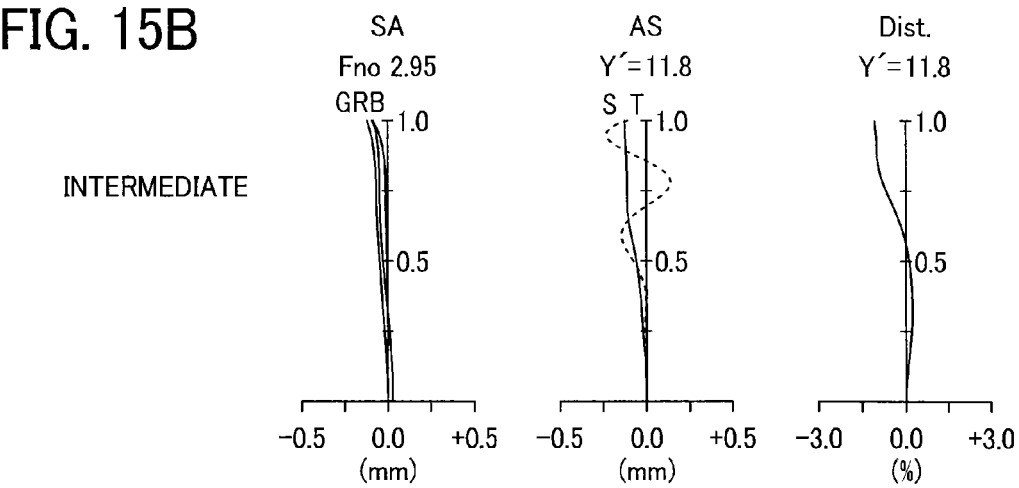
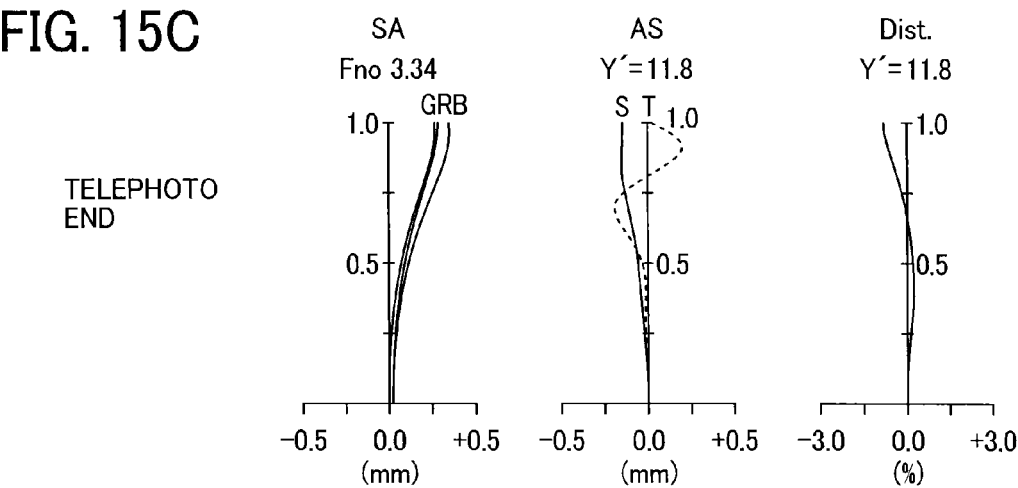

FOCUSING

FOCUSING

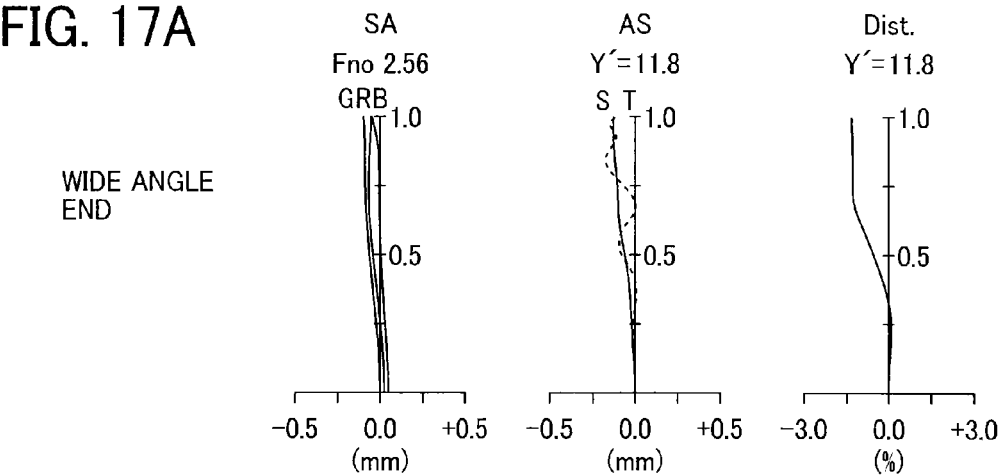
FIG. 17A  WIDE ANGLE END
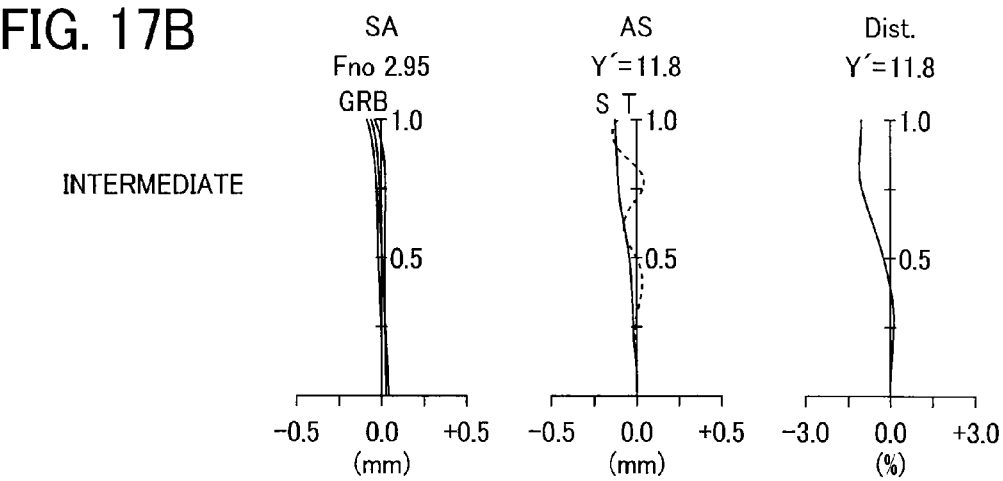
FIG. 17B  INTERMEDIATE
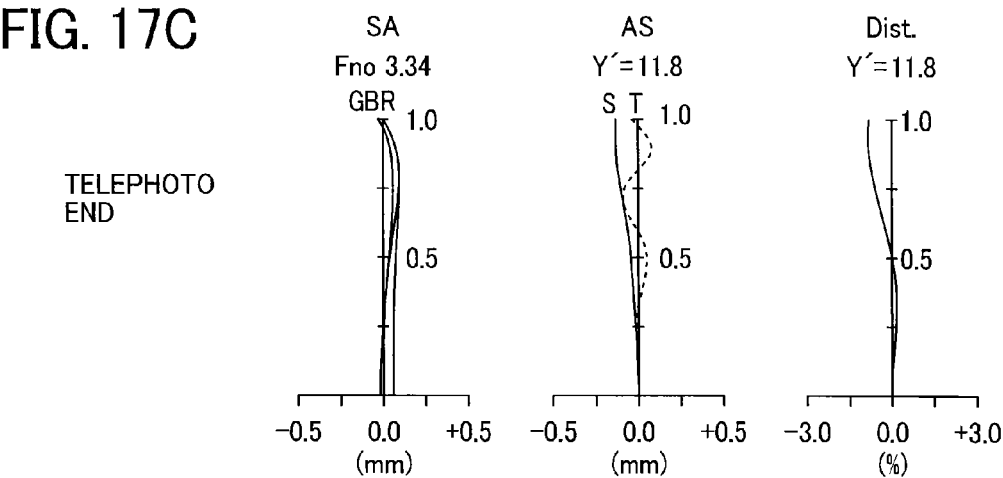
FIG. 17C  TELEPHOTO END

FOCUSING

FOCUSING

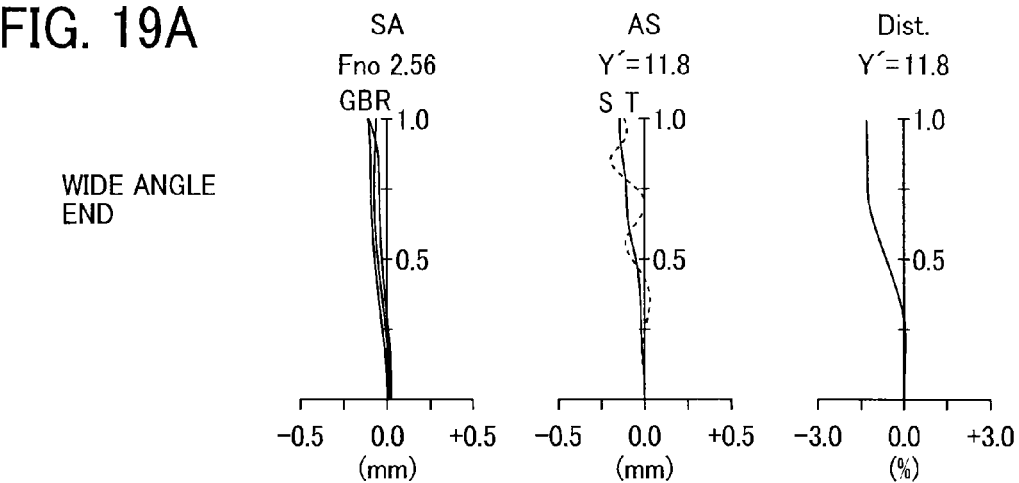
FIG. 19A WIDE ANGLE END
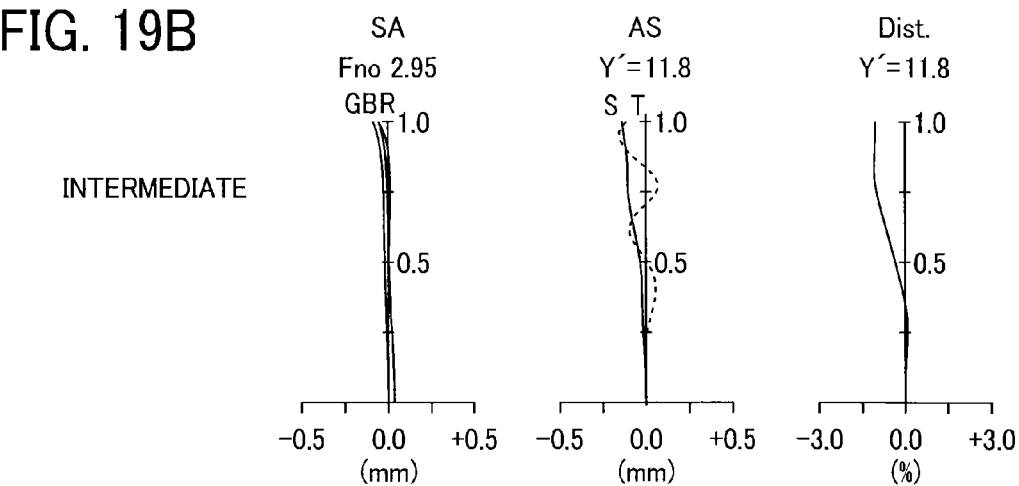
FIG. 19B INTERMEDIATE
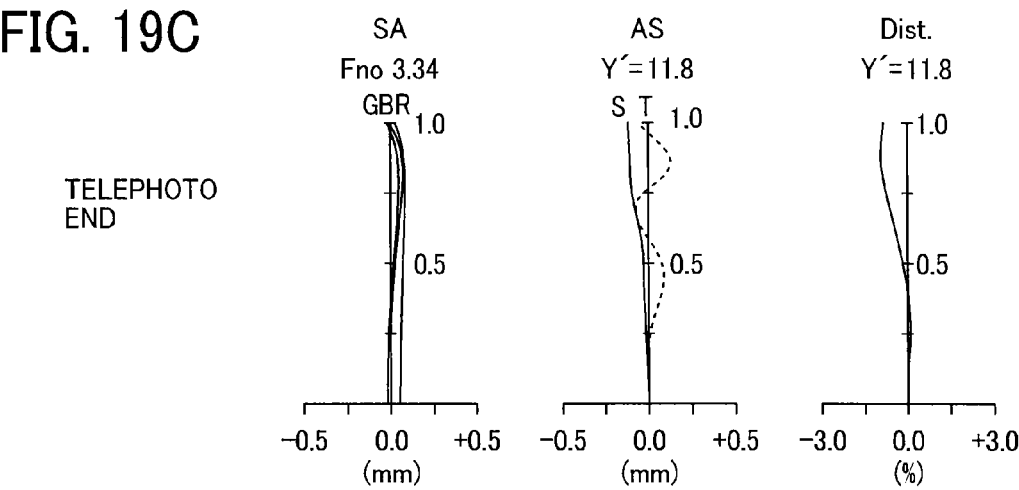
FIG. 19C TELEPHOTO END

FOCUSING

FOCUSING

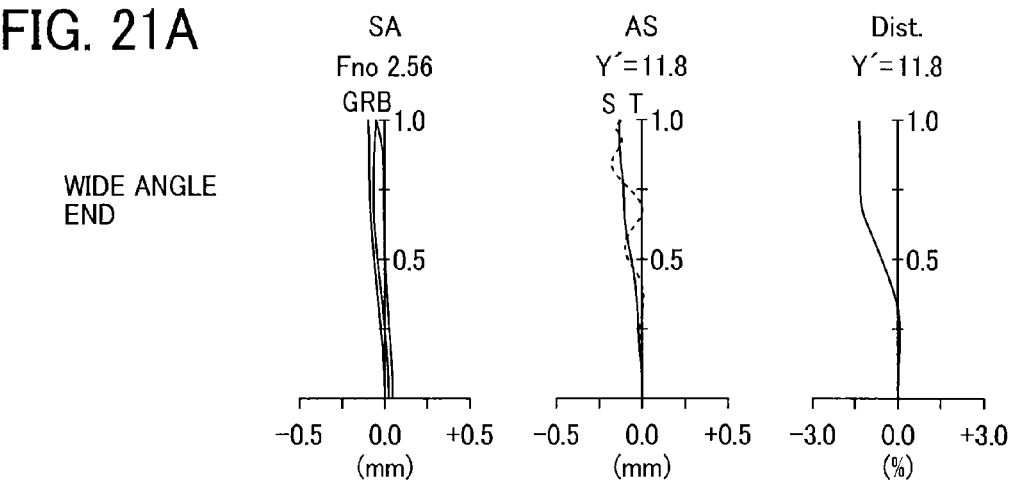
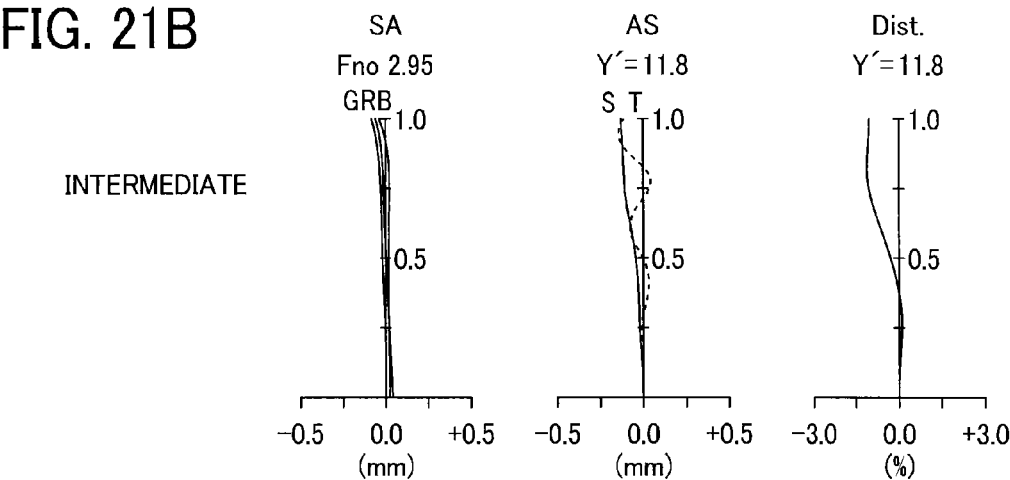
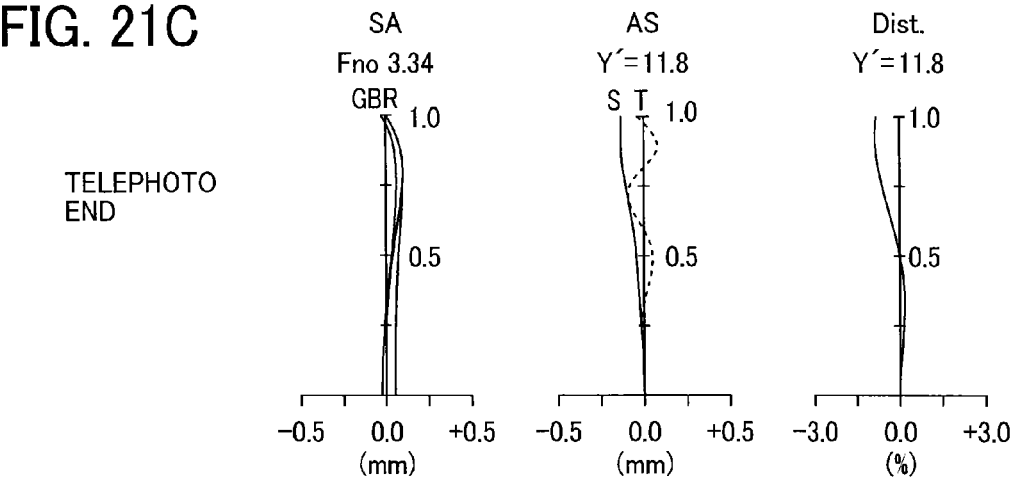

FOCUSING

FOCUSING

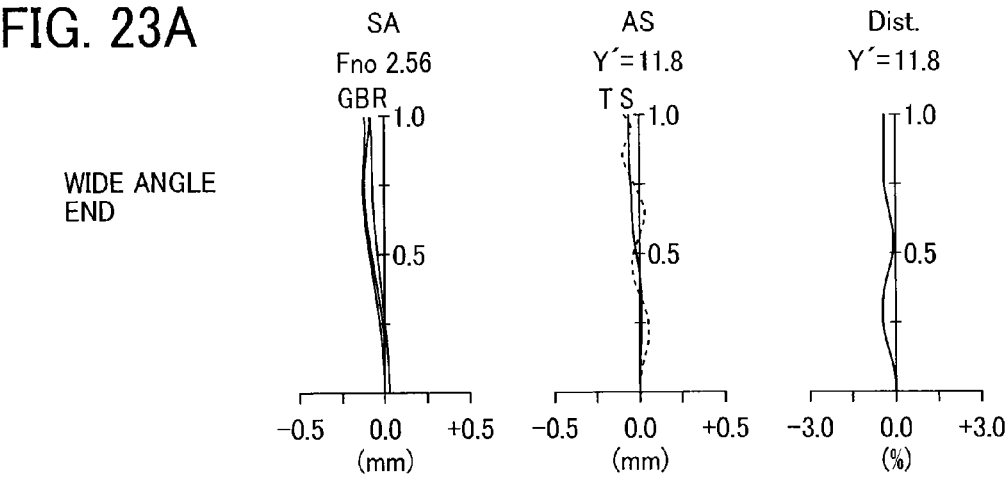
FIG. 23A WIDE ANGLE END
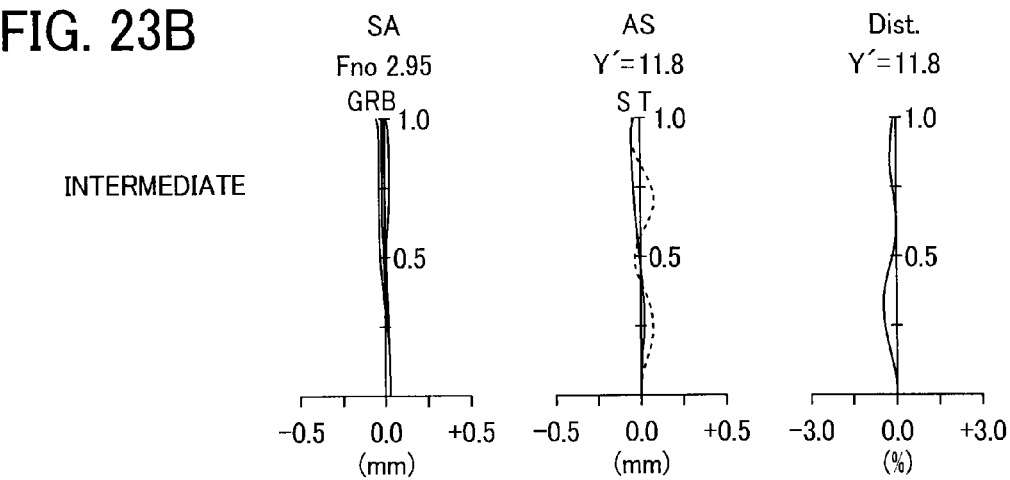
FIG. 23B INTERMEDIATE
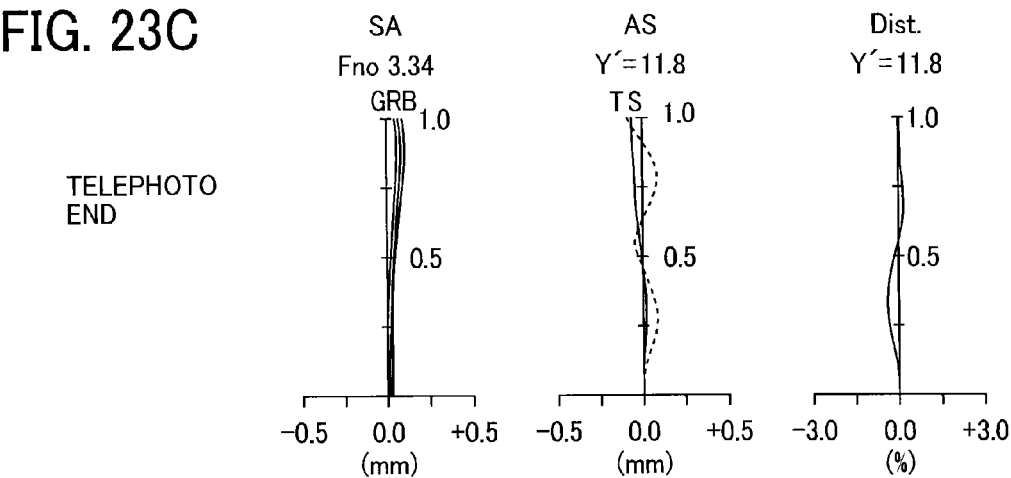
FIG. 23C TELEPHOTO END

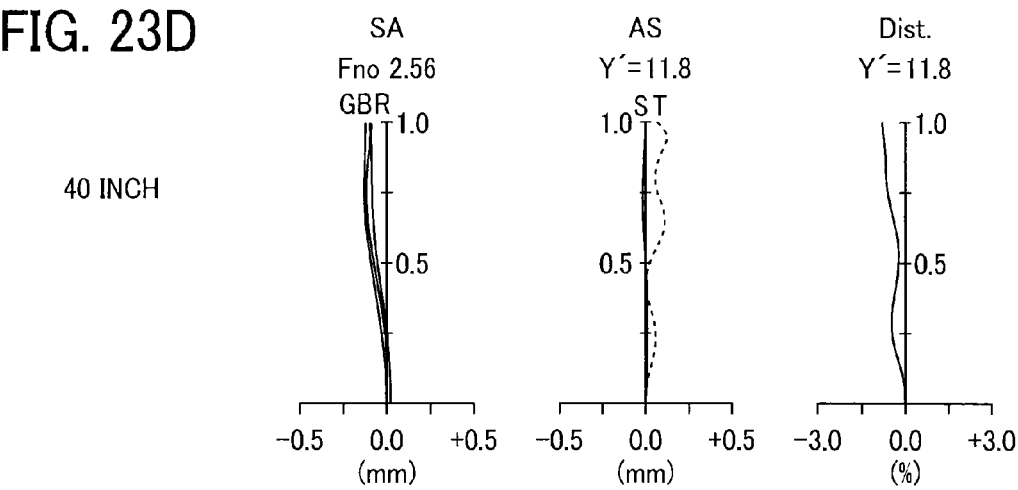
FIG. 23D 40 INCH
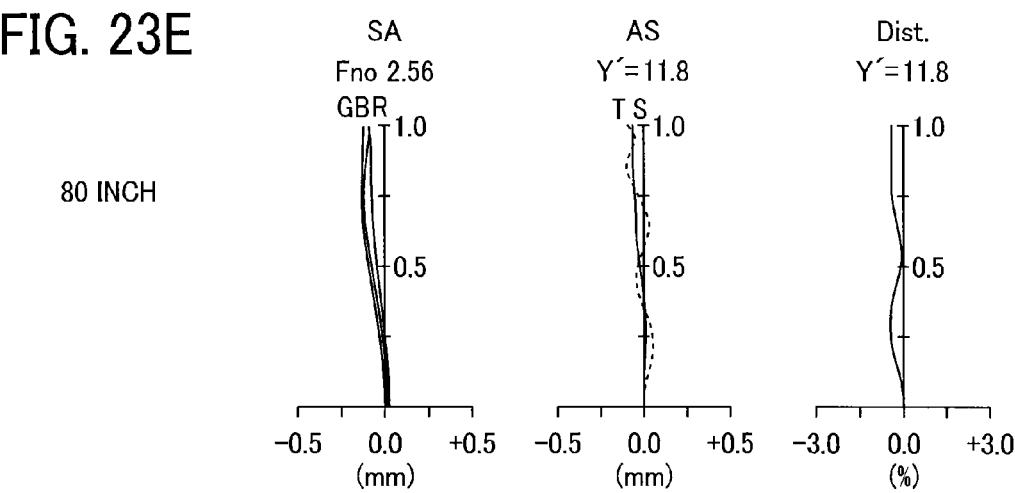
FIG. 23E 80 INCH
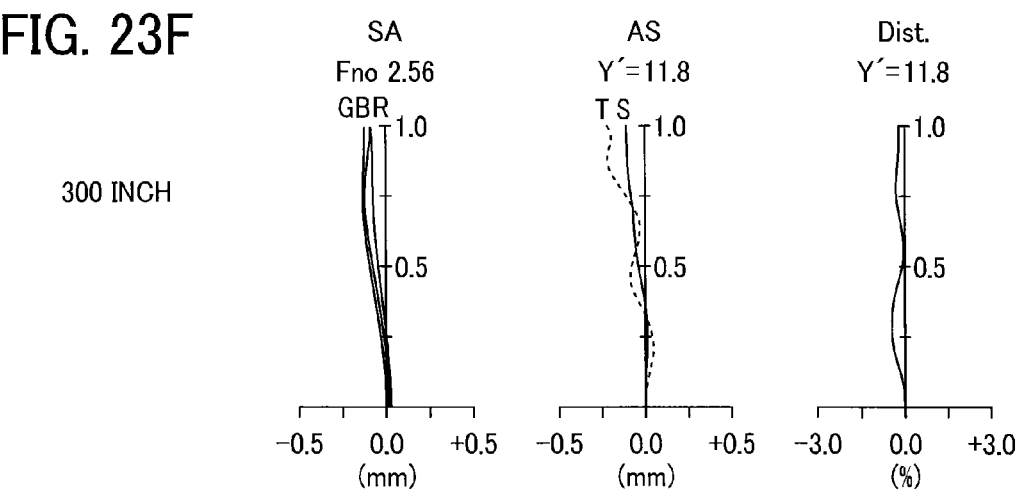
FIG. 23F 300 INCH

FOCUSING

FOCUSING

WIDE ANGLE END

INTERMEDIATE

TELEPHOTO END

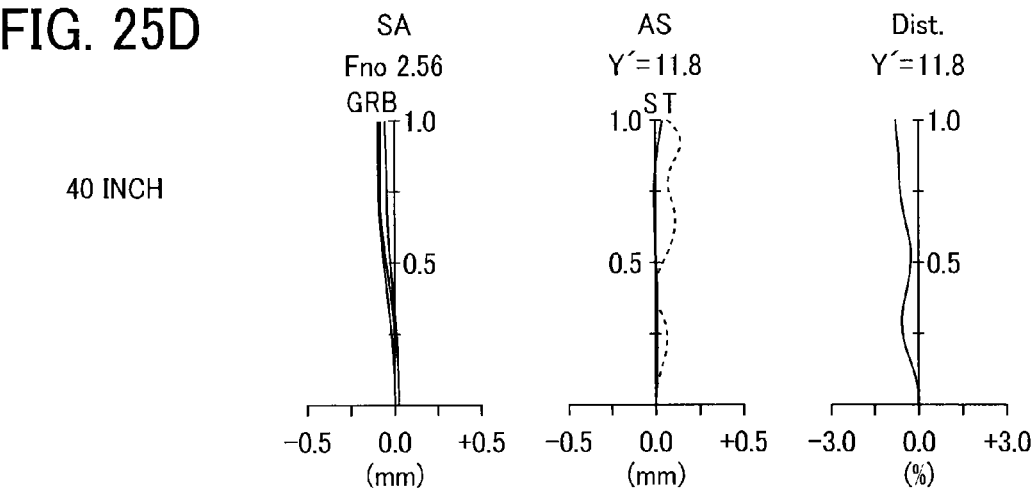
FIG. 25D  40 INCH
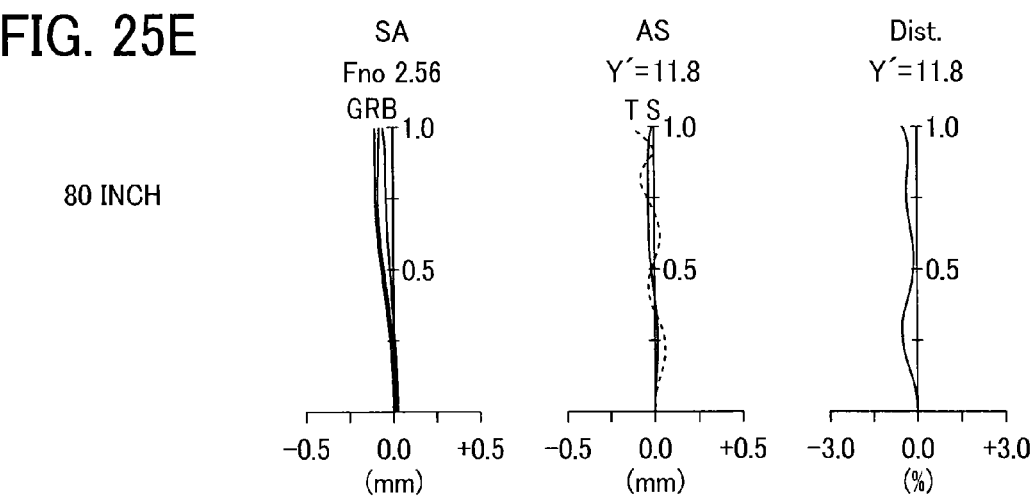
FIG. 25E  80 INCH
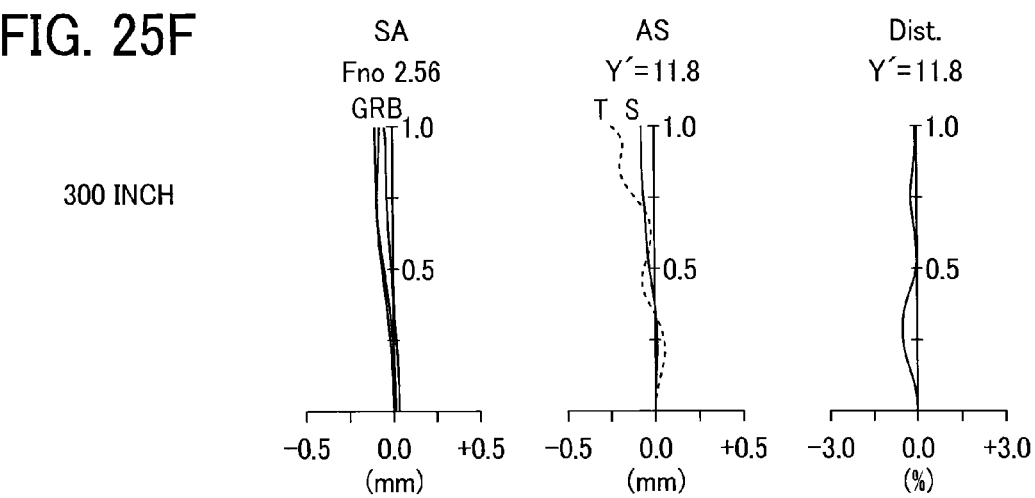
FIG. 25F  300 INCH

FOCUSING

FOCUSING

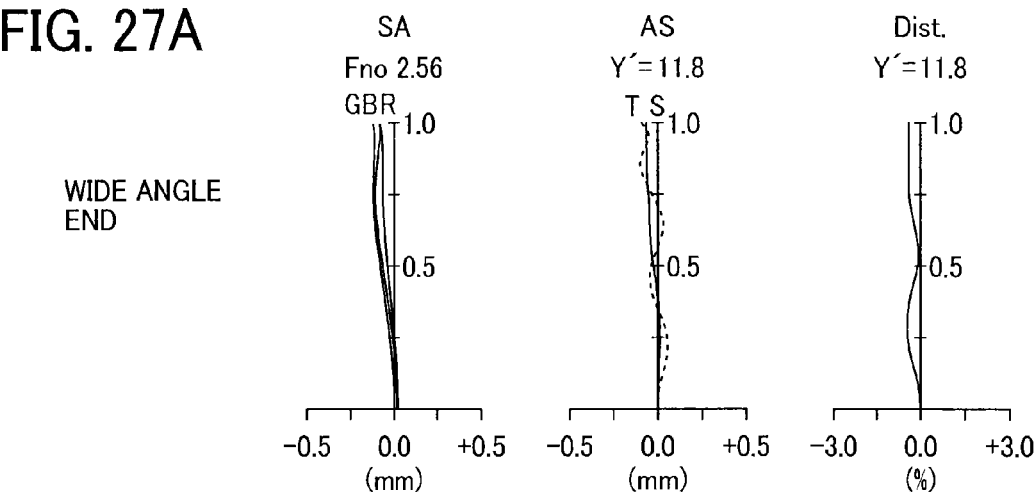
FIG. 27A WIDE ANGLE END
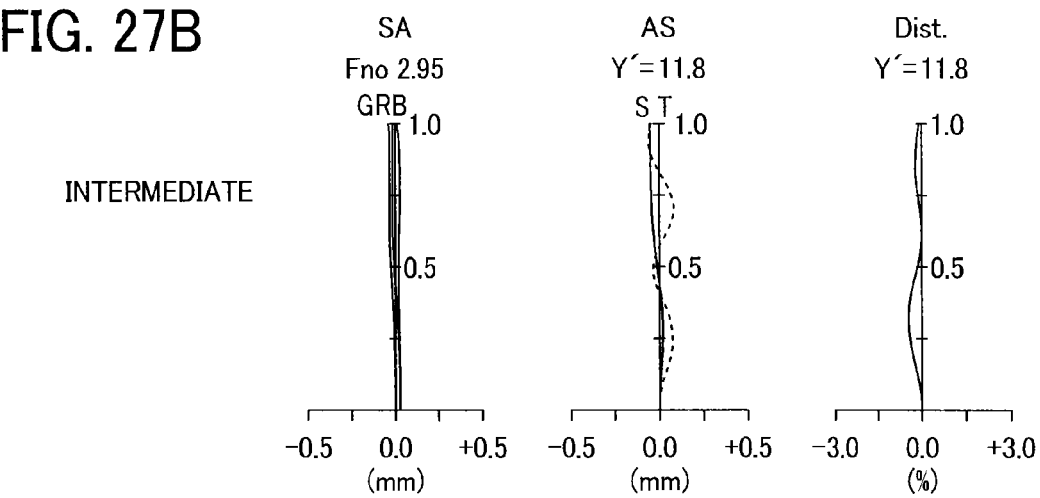
FIG. 27B INTERMEDIATE
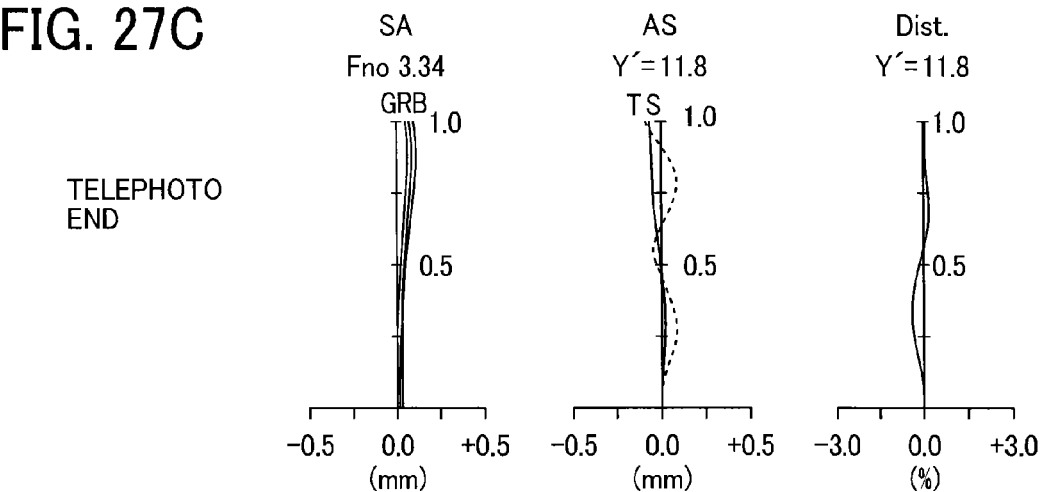
FIG. 27C TELEPHOTO END

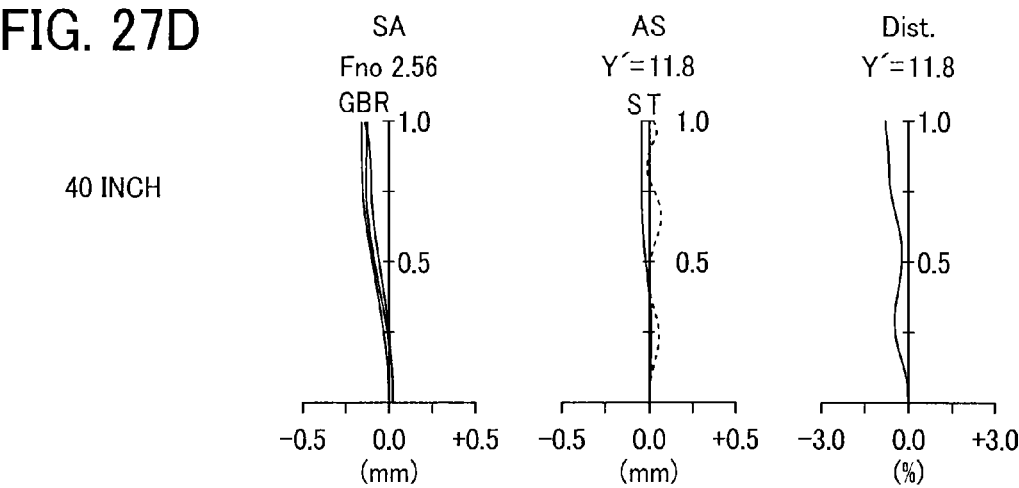
FIG. 27D 40 INCH
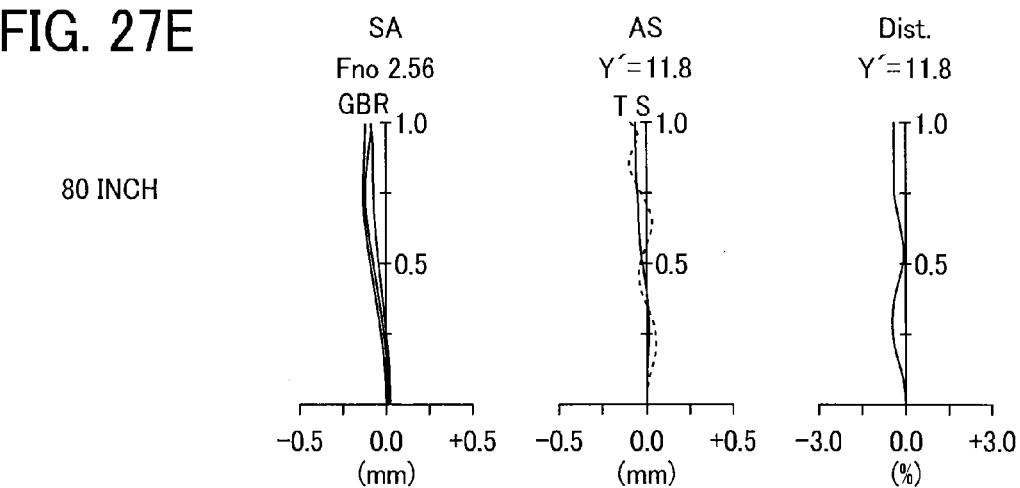
FIG. 27E 80 INCH
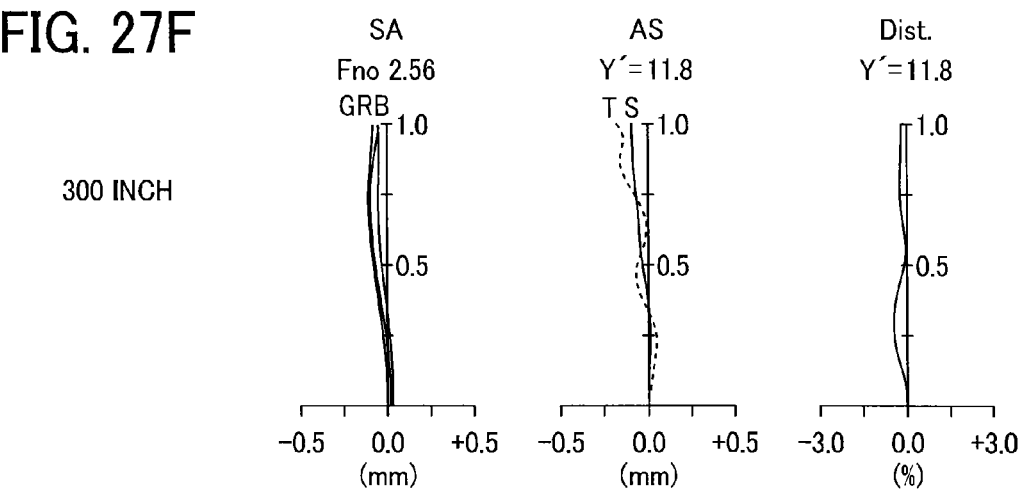
FIG. 27F 300 INCH

FOCUSING

FOCUSING

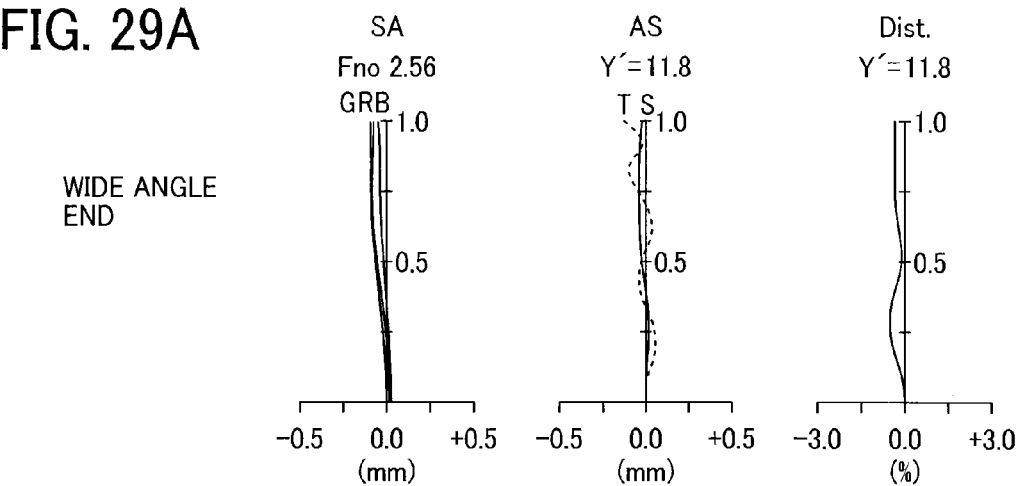
FIG. 29A WIDE ANGLE END
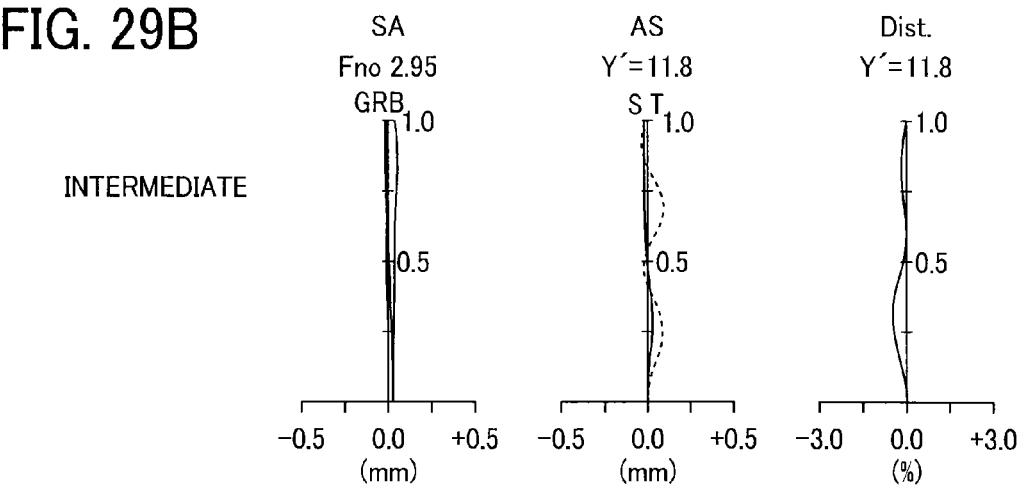
FIG. 29B INTERMEDIATE
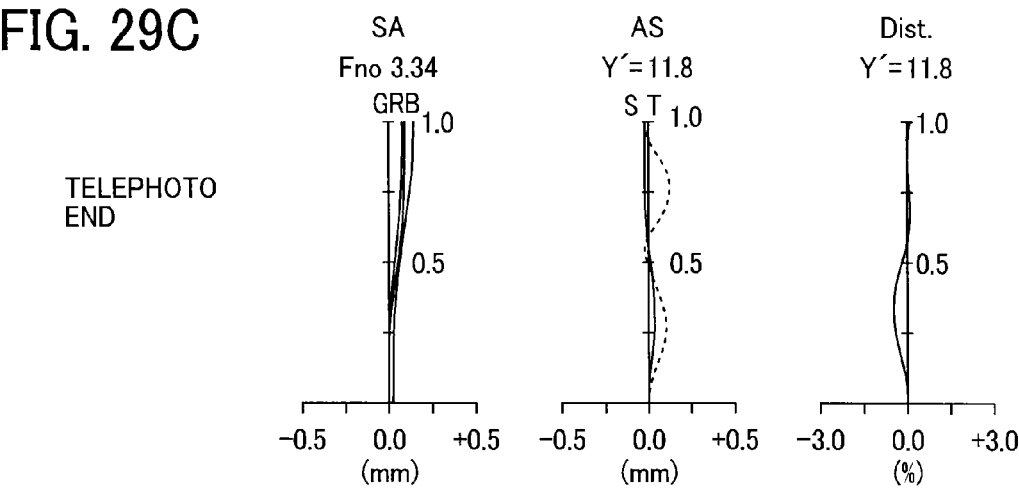
FIG. 29C TELEPHOTO END

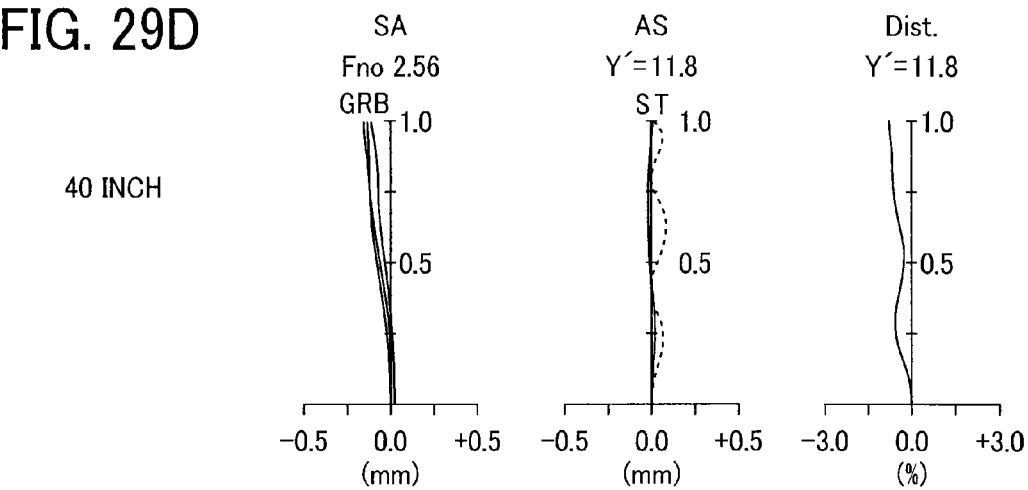
FIG. 29D 40 INCH
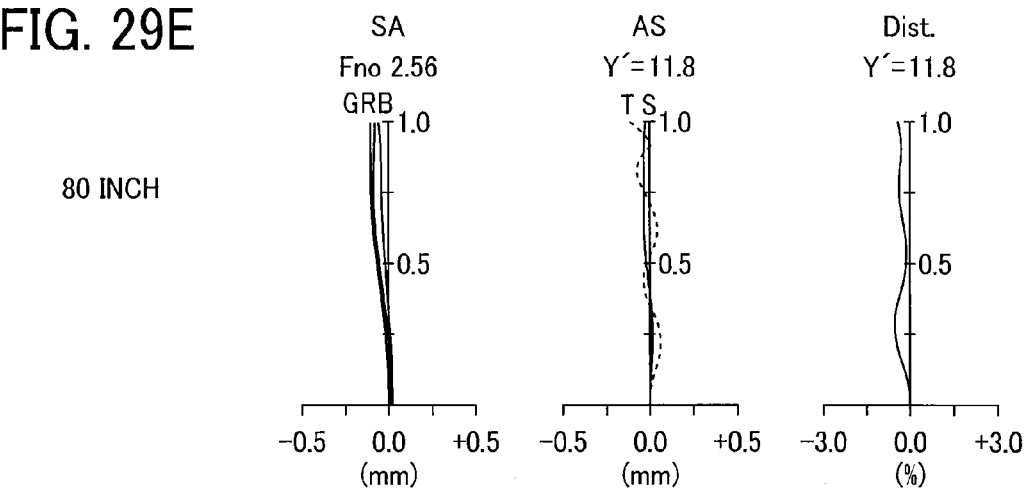
FIG. 29E 80 INCH
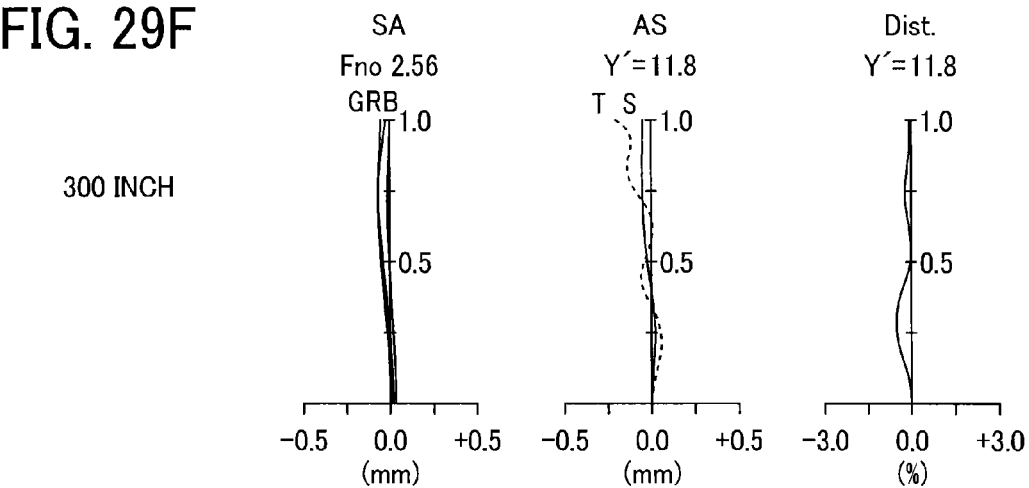
FIG. 29F 300 INCH

PROJECTION LENS AND IMAGE DISPLAY DEVICE

CROSS-REFERENCE TO RELATED APPLICATIONS

This patent application is based on and claims priority pursuant to 35 U.S.C. §119(a) to Japanese Patent Application No. 2015-117708, filed on Jun. 10, 2015, Japanese Patent Application No. 2015-137251, filed on Jul. 8, 2015, and Japanese Patent Application No. 2015-137273, filed on Jul. 8, 2015, in the Japan Patent Office, the entire disclosures of which are hereby incorporated by reference herein.

BACKGROUND

Technical Field

Exemplary aspects of the present disclosure generally relate to a projection lens and an image display device incorporating the same.

Related Art

In recent years, image display devices are widely used for presentation in companies, for education in schools, and for household purposes, that enlarge and project, onto a screen, an image displayed on a display surface of an image display element. Such image display devices are hereinafter referred to as a projector.

Projectors have increasingly improved optical performance. Accompanying such improvement, demand for a reduction in size of projectors is increasing. To achieve such size reduction in projectors, there is a need for projection lenses used as a projection optical system in projectors to be reduced in size.

To reduce the size of the projection optical system, a reflecting member for bending optical paths is disposed within a lens system in a projection lens to bend optical paths of image-forming rays within the lens system.

SUMMARY

In an aspect of this disclosure, there is provided an improved projection lens for a projection optical system of an image display device to enlarge and project an image displayed on a display surface of an image display element onto a projection surface. The projection lens includes, in order from a magnification side to a reduction side, a first lens group having a negative refractive power, a reflector to bend an optical path, a second lens group having a positive refractive power, and an aperture stop disposed within the second lens group. The second lens group has a positive refractive power on the magnification side of the aperture stop, and a negative refractive power on the reduction side of the aperture stop. Conditional formula (A) below is satisfied:

$$Ot/Y' < 6.1, \quad (A)$$

where $Ot$ is a distance along the optical axis between a maximum-magnification-side surface of the first lens group and a surface of a lens adjacent to a reduction-side surface of the reflector, and $Y'$ is a maximum height of the image displayed on the display surface of the image display element.

In another aspect of this disclosure, there is provided another improved image display device, including: a light source to emit light rays; an image display element having a display surface to display an image to be projected; an illumination optical system to illuminate the display surface of the image display element with the light rays emitted from the light source; and a projection optical system to receive, from the illumination optical system, a projection light rays modulated by the image displayed on the display surface, to enlarge and project the image onto a projection surface. The projection optical system is the projection lens described above.

In another aspect of this disclosure, there is provided another improved projection lens that is a projection optical system of an image display device to enlarge and project an image displayed on a display surface of an image display element onto a projection surface. The projection lens includes, in order from a magnification side to a reduction side, a first lens group fixed in a change in magnification from a wide angle end to a telephoto end; a second lens group having a negative refractive power; a third lens group having a positive refractive power; a fourth lens group having a positive refractive power; and a fifth lens group having a negative refractive power. The second lens group, the third lens group, the fourth lens group, and the fifth lens group separately move to the reduction side or the magnification side in a change in magnification from the wide angle end to the telephoto end.

BRIEF DESCRIPTION OF THE DRAWINGS

The aforementioned and other aspects, features, and advantages of the present disclosure will be better understood by reference to the following detailed description when considered in connection with the accompanying drawings, wherein:

FIGS. 2A through 2C are diagrams of aberration of the projection lens according to Example 1;

FIGS. 4A through 4C are diagrams of aberration of the projection lens according to Example 2;

FIGS. 6A through 6C are diagrams of aberration of the projection lens according to Example 3;

FIGS. 8A through 8C are diagrams of aberration of the projection lens according to Example 4;

FIGS. 10A through 10C are diagrams of aberration of the projection lens according to Example 5;

FIGS. 12A through 12C are diagrams of aberration of the projection lens according to Example 6;

FIGS. 15A through 15C are diagrams of aberration of the projection lens according to Example 7;

FIGS. 17A through 17C are diagrams of aberration of the projection lens according to Example 8;

FIGS. 19A through 19C are diagrams of aberration of the projection lens according to Example 9;

FIGS. 21A through 21C are diagrams of aberration of the projection lens according to Example 10;

FIGS. 23A through 23F are diagrams of aberration of the projection lens according to Example 11;

FIGS. 25A through 25F are diagrams of aberration of the projection lens according to Example 12;

FIGS. 27A through 27F are diagrams of aberration of the projection lens according to Example 13;

FIGS. 29A through 29F are diagrams of aberration of the projection lens according to Example 14.

Figure 1A:
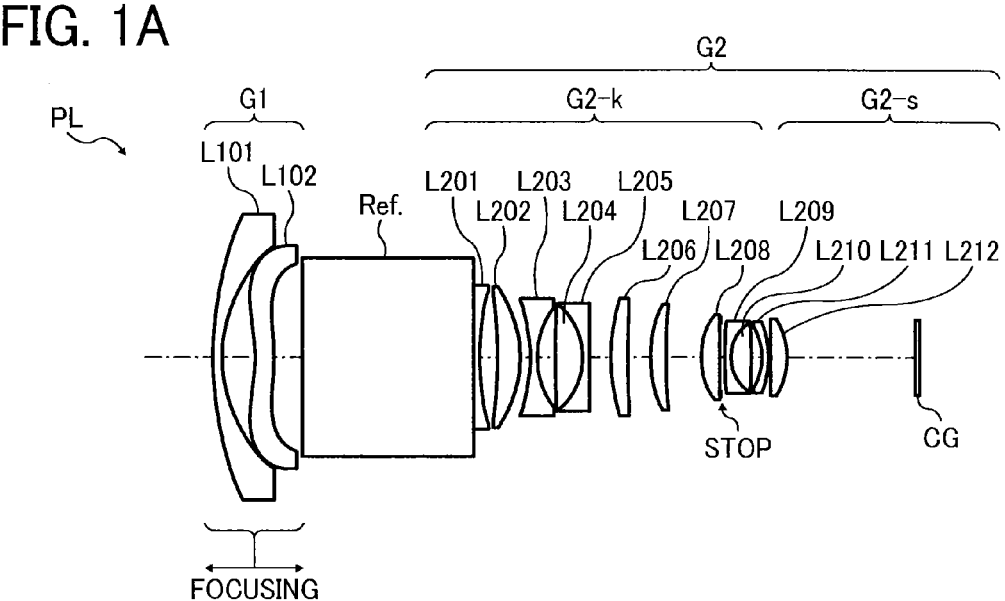
FIG. 1A is a cross-sectional view of a configuration of a projection lens according to Example 1.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable.

A description is provided of embodiments below.

Each of FIGS. 1A through 1C, FIGS. 3A through 3C, FIGS. 5A through 5C, FIGS. 7A through 7C, FIGS. 9A through 9C, and FIGS. 11A through 11C is a view of a projection lens PL according to a corresponding embodiment.

The projection lenses PL of FIGS. 1A through 1C, FIGS. 3A through 3C, FIGS. 5A through 5C, FIGS. 7A through 7C, FIGS. 9A through 9C, and FIGS. 11A through 11C correspond to Example 1, Example 2, Example 3, Example 4, Example 5, and Example 6, respectively.

In each of the figures listed above, the upper state illustrates an arrangement of lens groups with an optical axis linearly elongated, and the middle stage illustrates optical paths with the optical axis linearly elongated.

The lower stage illustrates the arrangement of lens groups and optical paths with a right-angle prism as a reflector. In the upper stage and the middle stage of each figure, the left side is a "magnification side", and the right side is a "reduction side".

The same reference signs are given to corresponding elements in FIGS. 1A through 1C, FIGS. 3A through 3C, FIGS. 5A through 5C, FIGS. 7A through 7C, FIGS. 9A through 9C, and FIGS. 11A through 11C to facilitate understanding of elements.

In the upper stage of each of FIGS. 1A through 1C, FIGS. 3A through 3C, FIGS. 5A through 5C, FIGS. 7A through 7C, FIGS. 9A through 9C, and FIGS. 11A through 11C, reference sign "G1" denotes a first lens group, and reference sign "G2" denotes a second lens group. Reference sign "Ref." denotes a reflector, and reference sign "STOP" denotes an aperture stop. Reference sign "CG" denotes a cover glass to protect a display surface of an image display element (DMD) 3.

In each of the figures listed above, the projection lens according to an embodiment of the present disclosure includes, in the order from the magnification side to the reduction side, the first lens group G1, the reflector Ref., and the second lens group G2 that further includes the aperture stop STOP. That is, the aperture stop STOP is disposed within the second lens group G2.

The "double-headed arrow" in each figure indicates movement for focusing.

As illustrated in the upper stage of each of FIGS. 1A through 1C, FIGS. 3A through 3C, FIGS. 5A through 5C, FIGS. 7A through 7C, FIGS. 9A through 9C, and FIGS. 11A through 11C, the first lens group G1 includes two lenses L101 and L102, and the second lens group G2 includes twelve lenses L201 through L212.

In the projection lens PL according to an embodiment of the present disclosure as illustrated in each figure, the first lens group G1 has a negative refractive power, and the second lens group G2 has a positive refractive power.

With the first lens group G1 having a negative refractive power disposed in the magnification side, the height of a chief ray of image-forming rays decreases, thereby reducing the effective diameters of the lenses that constitute the first lens group G1. Such a configuration allows a compact projection lens with a wide angle of view.

The second lens group G2 has a positive refractive power as a whole, while having a positive refractive power on the magnification side of the aperture stop STOP and a negative refractive power on the reduction side of the aperture stop STOP.

In the projection lens PL according to an embodiment of the present disclosure, the second lens group G2 has eight lenses L201 through L208 on the magnification side of the aperture stop STOP. The eight lenses L201 through L208 constitute a positive lens group on the magnification side of the aperture stop STOP, which is hereinafter referred to as a positive lens group G2-k or simply as a lens group G2-k.

The second lens group G2 has four lenses L209 through L212 on the reduction side of the aperture stop STOP. The four lenses L209 through L212 constitute a negative lens group on the reduction side of the aperture stop STOP, which is hereinafter referred to as a negative lens group G2-s or a lens group G2-s.

With the second lens group G2 having a positive refractive power on the magnification side of the aperture stop STOP and a negative refractive power on the reduction side of the aperture stop STOP, the pupil position relative to an illumination optical system 2 is improved.

The distance (distance in air) between the maximum-magnification-side surface, which is a magnification-side surface of the lens L101, of the first lens group G1 and a lens surface, which is a magnification-side surface of the lens L201 adjacent to the reduction-side surface of the reflector Ref. is Ot. A maximum height of an image displayed on the display surface of the image display element (DMD) 3 is Y'. Ot and Y' satisfy the relation of Ot/Y' <6.1 (condition A).

Condition A refers to a condition for improving the visual thickness of the projection lens PL according to an embodiment of the present disclosure.

Satisfying condition A reduces the thickness of the projection lens as an optical system.

Failing to satisfy condition A with the value of Ot/Y' not less than 6.1 increases the optical performance, while inhibiting size reduction of a projection lens. This arrangement further increases the size of the body of the image display device, thus hampering size reduction of a projector.

The projection lens PL according to an embodiment of the present disclosure performs focusing by two kinds of methods.

In a first method, as illustrated in FIGS. 1A through 1C, FIGS. 3A through 3C, and FIGS. 5A through 5C, the first lens group G1 is displaced along the direction of the optical axis to achieve focusing.

Such a manner of focusing reduces fluctuations in ray aberration due to focusing because the first lens group G1 having a negative refractive power moves. Applying the first method further reduces the amount of movement of the first lens group G1 while focusing, and increases the negative refractive power, thereby increasing the angle of view of the projection lens PL. As a result, an optical performance effectively increases.

In a second method, as illustrated in FIGS. 7A through 7C, FIGS. 9A through 9C, and FIGS. 11A through 11C, at least one lens of the second lens group G2 moves to achieve focusing. The second method is an inner focus method. In each example illustrated in FIGS. 7A through 7C, FIGS. 9A through 9C, and FIGS. 11A through 11C, the lens L206 of the positive lens group G2-k in the second lens group G2 moves to achieve focusing.

Both of the first and second focusing methods reduce fluctuations in the optical performance with changes in projection distance.

It should be noted that the focusing method is not limited to the first and second methods. Optionally, a method that moves the entirety of the second lens group G2 and the entire extending system that move the entire projection lens PL are also applicable.

The projection lens PL according to an embodiment of the present disclosure preferably satisfies any one of conditional formulas (1), (2), and (3) below:

$$3.3 < |F1|/F < 4.6; \tag{1}$$

$$1.5 < f2\text{-}s/F1 < 20.0; \text{ and} \tag{2}$$

$$5.5 < |f2\text{-}s|/f2\text{-}k < 10.5. \tag{3}$$

In the respective conditional formulas (1), (2), and (3), symbols in parameters denote as follows:

F: the focal length (>0) of the entire system of the projection lens PL;

F1: the focal length (<0) of the first lens group G1;

f2-s: the focal length (<0) of the negative lens group G2-s; and f2-k: the focal length (>0) of the positive lens group G2-k.

Conditional formula (1) defines a preferable range of the ratio of the negative refractive power of the first lens group G1 to the positive refractive power of the entire system. The projection lens PL according to an embodiment of the present disclosure easily generates various aberration, particularly chromatic aberration and coma aberration in accordance with an operation of focusing. However, satisfying conditional formula (1) facilitates favorably maintaining chromatic aberration and coma aberration while focusing.

With an increase (a decrease) in parameter of |F1|/F in conditional formula (1), the negative refractive power of the first lens group G1 decreases (increases) relative to the positive refractive power of the entire system.

With the parameter of |F1|/F greater than the lower limit defined by conditional formula (1), the negative refractive power of the first lens group G1 excessively increases, thereby reducing the aperture diameters of the lenses disposed on the magnification side, resulting in a great increase in lateral chromatic aberration and coma aberration due to focusing.

With the parameter of f2-s/F1 greater than or equal to the upper limit defined by conditional formula (2), the negative refractive power of the first lens group G1 excessively decreases, thereby easily increasing the effective diameters of the lenses that constitute the first lens group G1.

When displaying an image, the image display element (DMD) 3 outputs light rays, which are guided to the first lens group G1 through the second lens group G2. In this case, the first lens group G1 having a negative refractive power increases the divergence angles of the light rays having passed through the second lens group G2.

Satisfying conditional formula (1) reduces angles, at which the light rays having passed through the second lens group G2 to enter the first lens group G1 diverge, thereby effectively increasing the divergence angles of the image-forming rays emitted from the first lens group G1. This arrangement further eliminates or reduces deterioration in performance due to the eccentricity of lenses when manufacturing the lenses.

The projection lens according to an embodiment of the present disclosure includes the first lens group G1 having a negative refractive power, and the second lens group G2. The second lens group G2 further includes the positive lens group G2-k having a positive refractive power, disposed on the magnification side of the aperture stop STOP, and the negative lens group G2-k having a negative refractive power on the reduction side of the aperture stop STOP.

Accordingly, the refractive power is distributed in the order of "negative, positive, and negative" among the first lens group G1, the lens group G2-k, and the lens group G2-s in the projection lens PL according to an embodiment of the present disclosure.

Conditional formula (2) defines the range to make a favorable balance in the negative refractive powers of the first lens group G1 and the lens group G2-k.

The negative refractive powers of the first lens group G1 and the lens group G2-k are vulnerable to various aberrations, particularly coma aberration.

Increasing (decreasing) the parameter of f2-s/F1 in conditional formula (2) means that the negative refractive power of the first lens group G1 increases (decreases) relative to the negative refractive power of the lens group G2-s.

With the parameter of f2-s/F1 not greater than the lower limit defined by conditional formula (2), the negative refractive power of the lens group G2-s excessively increases relative to the negative refractive power of the first lens group G1, thereby increasing the fluctuations in coma aberration while focusing. With the parameter of f2-s/F1 greater than or equal to the upper limit defined by conditional formula (2), the negative refractive power of the first lens group G1 excessively increases relative to the negative refractive power of the lens group G2-k, thereby easily increasing the total length of the projection lens PL.

Satisfying conditional formula (2) reduces an increase in total length of the projection lens PL, favorably eliminating or reducing the fluctuations in coma aberration due to focusing.

Conditional formula (3) defines the range to make a favorable balance between the positive refractive power of the lens group G2-k disposed on the magnification side of the aperture stop STOP and the negative refractive power of the lens group G2-s disposed on the reduction side of the aperture stop STOP in the second lens group G2.

With an increase (a decrease) in parameter of |f2-s|/f2-k, the positive refractive power of the lens group G2-k increases (decreases) relative to the negative refractive power of the lens group G2-s.

With the parameter of |f2-s|/f2-k not greater than the lower limit defined by conditional formula (3), the negative refractive power of the lens group G2-s excessively increases relative to the positive refractive power of the lens group G2-k, thereby shortening the back focus. However, a significant amount of lateral chromatic aberration is more likely to occur as a result. With the parameter of |f2-s|/f2-k greater than or equal to the upper limit defined by conditional formula (3), the positive refractive power of the lens group G2-k excessively increases relative to the negative refractive power of the lens group G2-s, which contributes to a reduction in the total length of the projection lens PL. However, spherical aberration in particular is more likely to occur as a result.

Satisfying conditional formula (3) reduces an increase in the total length of the projection lens PL, favorably reducing the occurrence of lateral chromatic aberration and a significant amount of spherical aberration.

As described above, the projection lens PL according to an embodiment of the present disclosure performs focusing by the first method or the second method. With the second method that moves at least one lens of the second lens group G2 to achieve focusing, it is preferable to satisfy conditional formula (4) below:

$$1.5 \leq f2f/F2 < 3.8. \quad (4)$$

In conditional formula (4), symbols "f2f" and "F2" denotes as follows:

F2: the focal length (>0) of the second lens group G2; and
f2f: the focal length of a lens group that moves while focusing.

With an increase (a decrease) in parameter of f2f/F2 in conditional formula (4), the refractive power of the lens group that moves while focusing decreases (increases) relative to the positive refractive power of the second lens group G2.

With the parameter of f2f/F2 not greater than the lower limit defined by conditional formula (4), the refractive power of the lens group that moves while focusing increases and the amount of movement of the moving lens group to achieve focusing reduces. Accordingly, fine resolution is provided for focusing. With the parameter of f2f/F2 greater than or equal to the upper limit defined by conditional formula (4), the amount of movement of the moving group increases, thereby easily increasing the length of the second lens group G2.

Satisfying conditional formula (4) sets an appropriate degree of resolution for focusing, reducing an increase in the total length of the projection lens PL.

A supplementary description is provided below.

Preferably, the first lens group G1 includes two or more lenses to easily correct distortion and spherical aberration. The second lens group G2 preferably includes two or more sets of cemented lenses, in each of which two lenses are cemented to each other, to optimize performance.

As is clear from the optical paths in each of FIGS. 7, 9, and 11, any one of the projection lenses PL according to the embodiments as described above adopts an image-forming system that captures oblique rays.

Figure 13A:
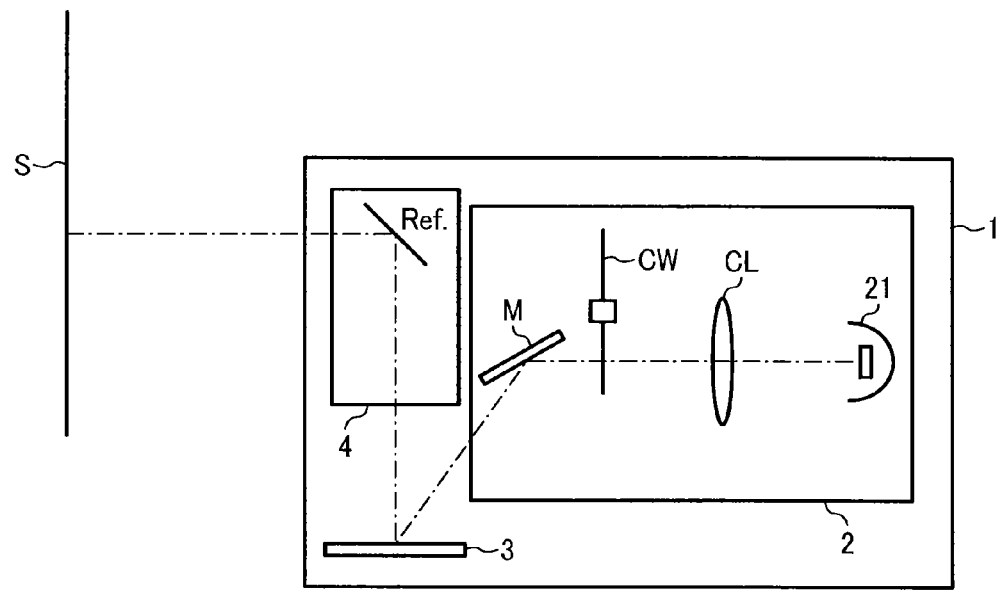
FIGS. 13A and 13B are schematic views of a projector as an image display device.
Figure 13B:
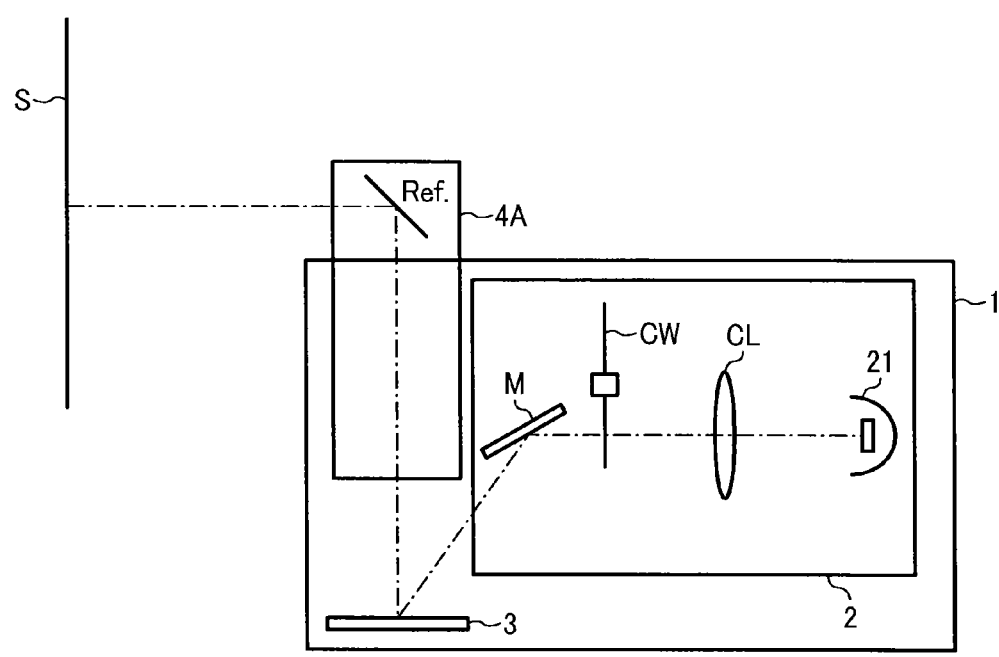

A brief description is provided of a projector 1 according to two embodiments of the present disclosure, referring to FIGS. 13A and 13B, before describing specific Examples of the projection lens according to the embodiments of the present disclosure. The same reference signs are given to corresponding elements, which are not likely to cause confusion, in FIGS. 13A and 13B to facilitate understanding of the elements.

In each of FIGS. 13A and 13B, the projector 1 includes a digital mirror device (DMD), which is a micro mirror device, as an image display element 3.

The projector 1 further includes an illumination optical system 2, the DMD 3 as the image display element 3, and a projection lens as a projection optical system 4 or 4A.

The projection lens 4 or 4A includes any one of the projection lenses PL according to Examples 1 through 6.

The illumination optical system 2 time-separates light rays into the three colors of red, green, and blue to illuminate the display surface of the DMD 3, thereby adjusting inclination of the micro mirrors corresponding to the respective pixels of the colors in response to the respective light rays in the DMD 3.

Then, an image to be projected is displayed on the DMD 3, and the light with an intensity modulated by the image is magnified by the projection lens 4 or 4A to be enlarged and projected onto a screen S as a projection surface.

The illumination optical system 2 includes a light source 21, a condenser lens CL, a red green blue (RGB) color wheel CW, and a mirror M.

To ensure a sufficient amount of space to include the light source 21, the condenser lens CL, the red green blue (RGB) color wheel CW, and the mirror M in the illumination optical system 2, the incident angle of the light rays emitted from the illumination optical system 2 to the DMD 3 is increased.

To maintain the space between the projection lens 4 or 4A and the illumination optical system 2, there is a need for a certain degree of the back focus of the projection lens 4 or 4A to be secured.

It should be noted that the condenser lens CL, the RGB color wheel CW, and the mirror M constitute an illumination optical system 2 to illuminate the display surface of the image display element 3.

In the example of FIG. 13A, the projector 1 includes the projection lens 4 within the casing of the projector 1. In the example of FIG. 13B, a portion of the projection lens 4A is exposed to the outside of the casing of the projector 1. The portion includes the reflector Ref. and the first lens group disposed on the magnification side of the reflector Ref.

The configuration of FIG. 13B may be a configuration, in which the projection body is disposed with the bottom face vertical to the ground. Alternatively, a configuration, in which the projection direction is toward the ceiling side or the floor side, may be employed.

A description is given of specific Examples 1 through 6 regarding a projection lens PL according to the present disclosure.

The meanings of symbols in Examples 1 through 6 are described below.

F: the focal length of the entire optical system;
Fno: numerical aperture;
R: the radius of curvature ("paraxial radius of curvature" for an aspherical surface);
D: The distance between surfaces (which is referred to also as surface distance);
Nd: refractive index;
vd: the Abbe number; and
BF: back focus.

Aspherical surface is expressed by the following formula.

$$X=(H^2/R)/[1+\{1-K(H/r)^2\}^{1/2}]+C4 \cdot H^4+C6 \cdot H^6+C8 \cdot H^8+C10 \cdot H^{10}+ \ldots$$

In the formula, X denotes a displacement along the direction of the optical axis at a position of a height H from the optical axis to the peak of a surface. K denotes a constant of the cone, and "C4, C6, C8, C10 . . . " refer to aspherical surface coefficients.

The unit of length, which is a dimension, is mm unless otherwise mentioned.

In Examples 1 through 3, a first lens group moves to achieve focusing. In Examples 4 through 6, a lens within a second lens group moves to achieve focusing.

A DMD is used as an image display element in Examples 1 through 6.

Example 1

Figure 1B:
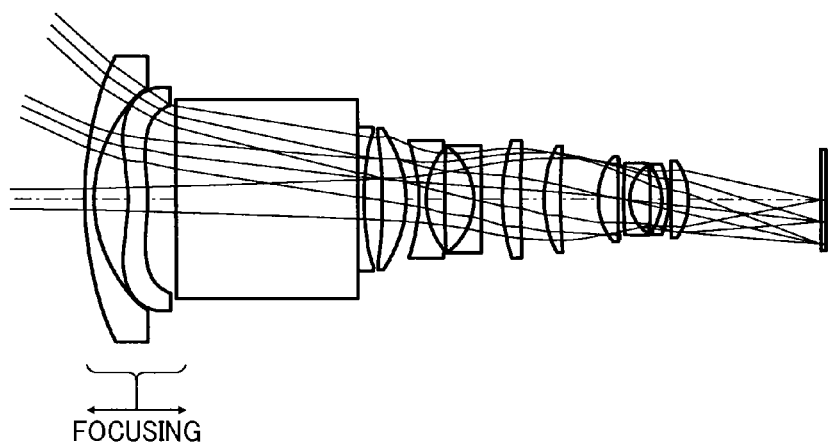
FIG. 1B is a view of optical paths of the projection lens according to Example 1.
Figure 1C:
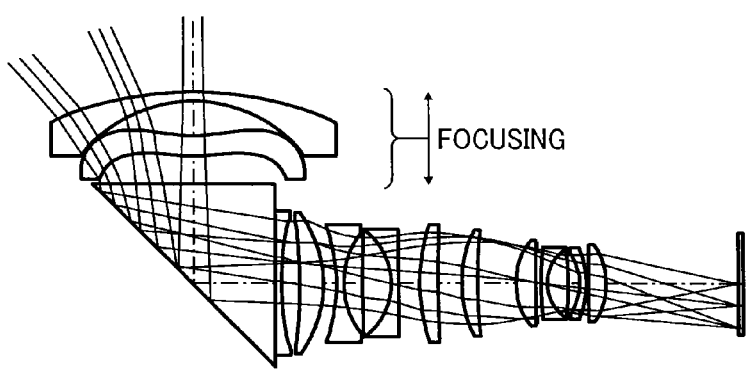
FIG. 1C is a view of the projection lens including a right-angle prism as a reflector according to Example 1.

The projection lens PL according to Example 1 is as illustrated in FIGS. 1A, 1B, and 1C.

As illustrated in FIG. 1A, the first lens group G1 includes lenses L101 and L102. The reflector Ref. is a right-angle prism. The second lens group G2 includes lenses L201 through L212.

In the projections lens PL according to Example 1, the first lens group G1 moves along the direction of the optical axis to perform focusing.

The first lens group G1 is a negative group including a negative meniscus lens L101 with a convex surface facing the magnification side and a meniscus lens L102 with a low thickness deviation ratio. The lens L102 has the center portion with a concave surface facing the magnification side and peripheral portions that inflect toward the reduction side.

The second lens group G2 is a group having a positive refractive power (which is referred to as a positive group), including twelve lenses L201 through L212, and an aperture stop STOP.

The lens L201 is a negative plano-concave meniscus lens, and the lens L202 is a positive meniscus lens with a convex surface facing the reduction side. The lens 203 is a negative biconcave lens, and the lens L204 is a positive meniscus lens with a convex surface facing the reduction side.

The lens L205 is a negative meniscus lens with a concave surface facing the magnification side, and the lens L206 is a positive meniscus lens with a convex surface facing the magnification side. The lens L207 is a positive meniscus lens with a convex surface facing the magnification side, and the lens L208 is a positive biconvex lens.

The eight lenses L201 through L208 constitute a positive lens group on the magnification side of the aperture stop STOP.

The four lenses L209 through L212 on the reduction side of the aperture stop STOP constitute a negative lens group G2-s.

The lens 209 is a negative meniscus lens with a convex surface facing the magnification side, and the lens L210 is a positive meniscus lens with a convex surface facing the magnification side. The lens 211 is a negative meniscus lens with a convex surface facing the reduction side. The lens L212 is a positive meniscus lens with a convex surface facing the reduction side.

In the positive lens group G2-k, the lens L204 and the lens L205 are cemented to each other. In the negative lens group G2-s, the lens L209 and the lens L210 are cemented to each other.

The reflector Ref. is disposed between the first lens group G1 and the second lens group G2.

In Example 1, the focal length of the entire system, the range of F, F-number, and a half angle of view at the wide angle end (ωw) are as follows:

F is 12.8 mm, Fno is 2.56, and ωw is 42.5°. Table 1 shows data regarding the projection lens PL in Example 1 below.

TABLE 1

| S | R | D | Nd | vd | Lens | Group |
|---|---|---|---|---|---|---|
| 0 | — | D0 | | | | |
| 1 | 87.318 | 2.3 | 1.80400 | 46.6 | L101 | G1 |
| 2 | 35.166 | 9.0 | | | | |
| 3* | −29.857 | 5.1 | 1.53111 | 56.0 | L102 | |
| 4* | −43.936 | 7.3 | | | | |
| 5 | INF | D5 | | | | |
| 6 | INF | 46.0 | 1.51680 | 64.2 | Ref. | — |
| 7 | INF | 0.0 | | | | |
| 8 | INF | 1.6 | 1.92286 | 20.9 | L201 | G2-k G2 |
| 9 | 62.673 | 4.9 | | | | |
| 10 | −117.557 | 5.9 | 1.80610 | 40.9 | L202 | |
| 11 | −30.178 | 2.7 | | | | |
| 12 | −43.798 | 1.8 | 1.43875 | 94.9 | L203 | |
| 13 | 19.821 | 4.9 | | | | |
| 14 | 367.020 | 7.4 | 1.64769 | 33.8 | L204 | |
| 15 | −16.836 | 2.0 | 1.77250 | 49.6 | L205 | |
| 16 | −1085.642 | 5.7 | | | | |
| 17 | 45.214 | 4.7 | 1.72000 | 46.0 | L206 | |
| 18 | 253.464 | 6.0 | | | | |
| 19 | 31.344 | 4.0 | 1.69700 | 48.5 | L207 | |
| 20 | 99.348 | 9.6 | | | | |
| 21 | 17.069 | 5.3 | 1.49700 | 81.5 | L208 | |
| 22 | −681.383 | 0.3 | | | | |
| 23 | INF | 0.9 | | | | |

TABLE 1-continued

| S | R | D | Nd | vd | Lens | Group |
|---|---|---|---|---|---|---|
| 24 | 86.800 | 1.6 | 1.83400 | 37.3 | L209 | 2G-s |
| 25 | 9.856 | 5.4 | 1.48749 | 70.4 | L210 | |
| 26 | −143.157 | 3.0 | | | | |
| 27 | −13.587 | 1.6 | 1.80000 | 29.8 | L211 | |
| 28 | −23.163 | 0.7 | | | | |
| 29* | −340.235 | 4.5 | 1.48749 | 70.4 | L212 | |
| 30* | −16.779 | 33.2 | | | | |
| 31 | INF | 1.0 | 1.51680 | 64.2 | CG | — |
| 32 | INF | — | | | | |

In Table 1, Surface numbers refer to the numbers of lens surfaces sequentially numbered from the magnification side. The surface of the aperture stop STOP, which is 23 in Table 1, is included in the surface numbers. Ref. denotes the reflector, and CG denotes a cover glass of an optical device.

"INF" in Table 1 indicates that the radius curvature is infinite. The mark "*" is indicated at surface numbers of "aspherical surfaces".

The same applies to Examples 8 through 10.

Table 2 shows data regarding the respective aspherical surfaces below.

TABLE 2

| | 3 | 4 | 29 | 30 |
|---|---|---|---|---|
| k | 0 | 0 | 0 | 0 |
| C4 | 7.7700E−05 | 6.2423E−05 | 6.3345E−06 | 1.8106E−05 |
| C6 | −1.7991E−07 | −9.2766E−08 | 6.0431E−08 | 7.6636E−08 |
| C8 | 2.6477E−10 | −1.1805E−10 | 1.4554E−09 | 8.1885E−10 |
| C10 | 2.8644E−14 | 6.0200E−13 | −6.1156E−12 | −3.5099E−12 |
| C12 | −4.9544E−16 | 9.3768E−16 | 0.0000E+00 | 0.0000E+00 |
| C14 | 4.4820E−19 | −5.0296E−18 | 0.0000E+00 | 0.0000E+00 |
| C16 | −7.2229E−23 | 4.6836E−21 | 0.0000E+00 | 0.0000E+00 |

In Table 1, "D5" refers to the distance between groups, which varies while focusing in accordance with changes in the projection distance (hereinafter referred to also as object distance) D0. "D5" increases or decreases relative to the surface distance D4.

Table 3 show the relations between object distance and surface distance D5. The first lens group moves along a direction of the optical axis to perform focusing.

TABLE 3

| D0 | 770 | 1600 | 6136 |
|---|---|---|---|
| D5 | −0.439 | 0.00 | 0.123 |

[Values of Parameters of Conditional Formulas]

Table 4 below shows values of parameters in condition A, and conditional formulas (1) through (3).

As described above, "Ot" refers to the distance (distance in air) between the maximum-magnification-side surface of the optical system and the lens surface adjacent to the reduction-side surface of the reflector Ref. The symbol "Y'" is a maximum height of a display element. The symbol "F" is the focal length of the entire system of the projection lens PL. F1 is the focal length of the first lens group G1. The symbol "F2" is the focal length of the second lens group G2. The symbol "f2-k" is the focal length on the magnification side of the aperture stop STOP in the second lens group G2. The symbol "f2-s" is the focal length on the reduction side of the aperture stop STOP in the second lens group G2. According to Table 1, "Ot" represents the total length from surface number S1 through surface number S7.

Conditional formula (4) does not apply to Example 1, in which the first lens group G1 moves to achieve focusing.

TABLE 4

| Parameters | | Values |
|---|---|---|
| Ot | | 69.7 |
| Y' | | 11.8 |
| F | | 12.80 |
| F1 | | −54.2 |
| F2 | | 27.6 |
| f2-k | | 17.0 |
| f2-s | | −127.2 |
| (A) | Ot/Y' | 5.9 |
| (1) | f1/F | −4.23 |
| (2) | f2-s/f1 | 2.35 |
| (3) | |f2-s/f2-k| | 7.48 |

FIGS. 2A, 2B, and 2C are diagrams of aberration of the projection lens PL in Example 1.

FIG. 2A illustrates various aberration when the object distance D0 is 80 inch. FIG. 2B illustrates various aberration when the object distance D0 is 40 inch. FIG. 2C illustrates various aberration when the object distance is 300 inch.

FIGS. 15A, 15B, and 15C illustrate "SA" representing spherical aberration, "AS" representing astigmatism, and "Dist." representing distortion, respectively.

In the diagram of spherical aberration "SA", the symbols "R", "G", and "B" are denoted as the descriptions of a wavelength R of 625 nm, a wavelength G of 550 nm, and a wavelength B of 460 nm.

In the diagram of astigmatism "AS", the symbols "T" and "S" denote aberration with respect to the tangential direction and aberration with respect to the sagittal direction, respectively.

It should be noted that astigmatism and distortion are with respect to light rays having a wavelength of 550 nm. As is found from FIGS. A through 2C, even with changes in the size of a screen, the fluctuations in aberration reduces.

The same applies to Examples 2 through 6.

Example 2

Figure 3A:
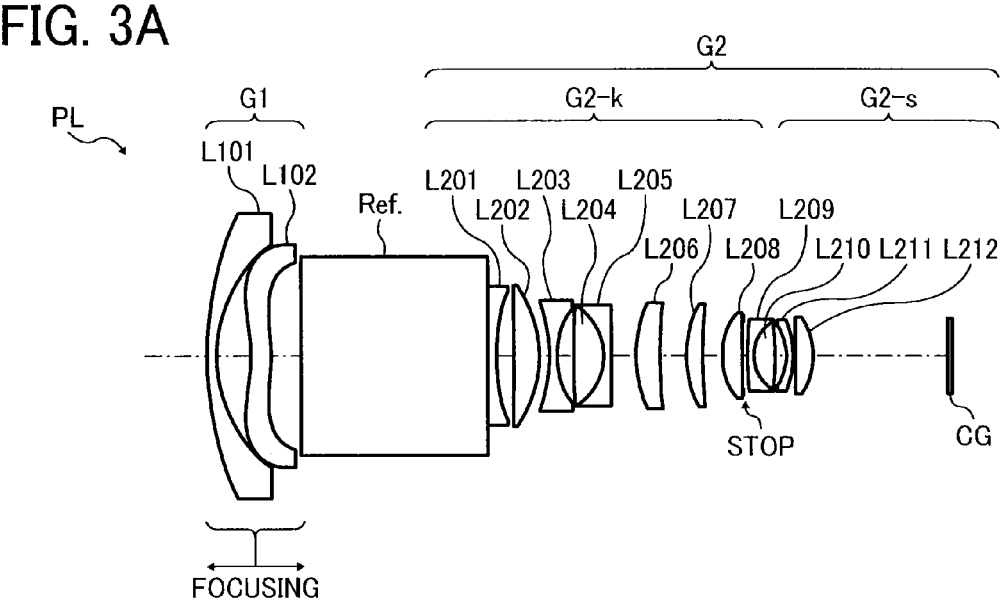
FIG. 3A is a cross-sectional view of a configuration of a projection lens according to Example 2.
Figure 3B:
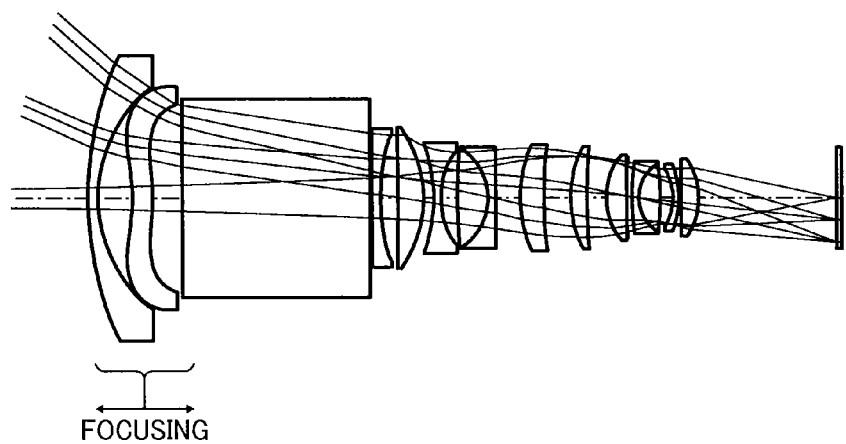
FIG. 3B is a view of optical paths of the projection lens according to Example 2.
Figure 3C:
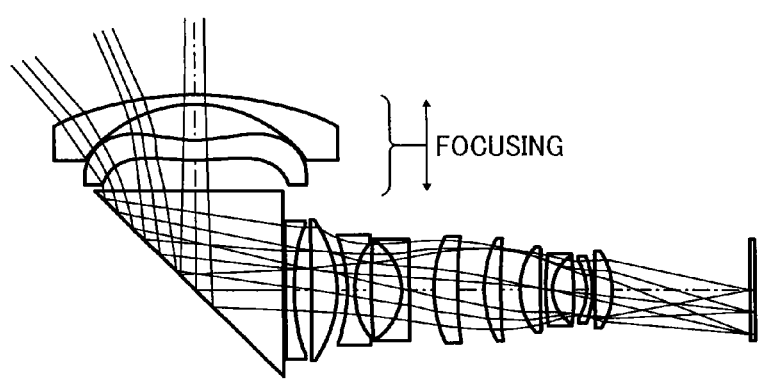
FIG. 3C is a view of the projection lens including a right-angle prism as a reflector according to Example 2.

The projection lens PL according to Example 2 is as illustrated in FIGS. 3A, 3B, and 3C.

As illustrated in FIG. 3A, a first lens group G1 includes a lens L101 and a lens L102. A reflector Ref. is a right-angle prism. A second lens group G2 includes lenses L201 through L212.

In the projections lens PL according to Example 2, the first lens group G1 moves along the direction of the optical axis to achieve focusing.

The first lens group G1 is a negative group including a negative meniscus lens L101 with a convex surface facing the magnification side and a meniscus lens L102 with a low thickness deviation ratio. The lens L102 has the center portion with a concave surface facing the magnification side and the peripheral portions, which inflects toward the reduction side.

The second lens group G2 is a positive group including twelve lenses L201 through L212.

The lens L201 is a negative meniscus lens with a convex surface facing the magnification side, and the lens L202 is a positive meniscus lens with a convex surface facing the reduction side. The lens 203 is a negative biconcave lens, and the lens L204 is a positive biconvex positive lens.

The lens L205 is a negative biconcave lens, and the lens L206 is a positive meniscus lens with a convex surface facing the magnification side. The lens L207 is a positive meniscus lens with a convex surface facing the magnification side, and the lens L208 is a positive biconvex lens.

The lenses L201 through L208 constitute a positive lens group G2-k on the magnification side of the aperture stop STOP.

A negative lens group G2-s disposed on the reduction side of the aperture stop STOP includes four lenses L209 through L212.

The lens 209 is a negative meniscus lens with a convex surface facing the magnification side, and the lens L210 is a positive biconvex lens. The lens 211 is a negative meniscus lens with a convex surface facing the reduction side. The lens L212 is a positive meniscus lens with a convex surface facing the reduction side.

In the positive lens group G2-k, the lens L204 and the lens L205 are cemented to each other. In the negative lens group G2-s, the lens L209 and the lens L210 are cemented to each other.

The reflector Ref. is disposed between the first lens group G1 and the second lens group G2.

In Example 2, the focal length of the entire system, the range of F, F-number, and a half angle of view at the wide angle end (ωw) are as follows:

F is 12.9 mm, Fno is 2.56, and ωw is 42.4°. Table 5 shows data regarding Example 2 below.

TABLE 5

| S | R | D | Nd | vd | Lens | Group |
|---|---|---|----|----|----|-------|
| 0 | — | D0 | | | | |
| 1 | 87.313 | 2.3 | 1.80400 | 46.6 | L101 | G1 |
| 2 | 34.946 | 9.0 | | | | |
| 3* | −30.796 | 5.0 | 1.53111 | 56.0 | L102 | |
| 4* | −45.730 | 7.7 | | | | |
| 5 | INF | D5 | | | | |
| 6 | INF | 46.0 | 1.51680 | 64.2 | Ref. | — |
| 7 | INF | 0.3 | | | | |
| 8 | 446.731 | 2.0 | 1.84666 | 23.8 | L201 | G2-k  G2 |
| 9 | 42.123 | 4.7 | | | | |
| 10 | −482.956 | 6.4 | 1.80610 | 40.9 | L202 | |
| 11 | −29.627 | 2.8 | | | | |
| 12 | −35.487 | 1.5 | 1.43875 | 94.9 | L203 | |
| 13 | 20.948 | 3.9 | | | | |
| 14 | 143.037 | 7.3 | 1.64769 | 33.8 | L204 | |
| 15 | −16.169 | 1.8 | 1.77250 | 49.6 | L205 | |
| 16 | 612.359 | 6.3 | | | | |
| 17 | 36.151 | 6.0 | 1.72000 | 46.0 | L206 | |
| 18 | 97.309 | 6.7 | | | | |
| 19 | 29.484 | 3.7 | 1.69700 | 48.5 | L207 | |
| 20 | 87.998 | 4.8 | | | | |
| 21 | 17.278 | 5.3 | 1.49700 | 81.5 | L208 | |
| 22 | −298.945 | 0.3 | | | | |
| 23 | INF | 0.9 | | | | |
| 24 | 112.122 | 1.5 | 1.83400 | 37.3 | L209 | G2-s |
| 25 | 9.988 | 5.5 | 1.48749 | 70.4 | L210 | |
| 26 | −113.311 | 3.1 | | | | |
| 27 | −13.173 | 1.6 | 1.80000 | 29.8 | L211 | |
| 28 | −21.874 | 0.3 | | | | |
| 29* | −292.846 | 4.4 | 1.48749 | 70.4 | L212 | |
| 30* | −16.774 | 33.6 | | | | |
| 31 | INF | 1.0 | 1.51680 | 64.2 | CG | — |
| 32 | INF | — | | | | |

Table 6 shows data regarding the respective aspherical surfaces below.

TABLE 6

| | 3 | 4 | 29 | 30 |
|---|---|---|----|----|
| k | 0 | 0 | 0 | 0 |
| C4 | 7.71463E−05 | 6.27771E−05 | 9.12044E−07 | 1.71924E−05 |
| C6 | −1.79058E−07 | −9.06057E−08 | 5.93077E−08 | 4.85520E−08 |
| C8 | 2.66269E−10 | −1.20256E−10 | 1.81951E−09 | 9.31880E−10 |
| C10 | 2.73554E−14 | 6.07468E−13 | −1.54158E−12 | 4.09439E−12 |
| C12 | −4.96654E−16 | 9.42548E−16 | 0.00000E+00 | 0.00000E+00 |
| C14 | 4.47504E−19 | −5.03098E−18 | 0.00000E+00 | 0.00000E+00 |
| C16 | −7.19761E−23 | 4.67687E−21 | 0.00000E+00 | 0.00000E+00 |

Table 7 shows the relations between object distance D0 and surface distance D5, as in Table 3. The first lens group moves along a direction of the optical axis to perform focusing.

TABLE 7

| D0 | 773 | 1600 | 5971 |
|----|-----|------|------|
| D5 | −0.439 | 0.00 | 0.123 |

[Values of Parameters of Conditional Formulas] Table 8 below shows values of parameters in condition A, and conditional formulas (1) through (3). Conditional formula (4) does not apply to Example 2, in which the first lens group G1 moves to achieve focusing.

TABLE 8

| Parameters | | Values |
|---|---|---|
| Ot | | 70.0 |
| Y' | | 11.8 |
| F | | 12.87 |
| F1 | | −53.7 |
| F2 | | 27.8 |
| f2-k | | 16.8 |
| f2-s | | −112.2 |
| (A) | Ot/Y' | 5.9 |
| (1) | f1/F | −4.17 |
| (2) | f2-s/f1 | 2.09 |
| (3) | |f2-s/f2-k| | 6.69 |

FIGS. 4A through 4C are diagrams of aberration of the projection lens PL in Example 2, as in FIGS. 2A through 2C.

Example 3

Figure 5A:
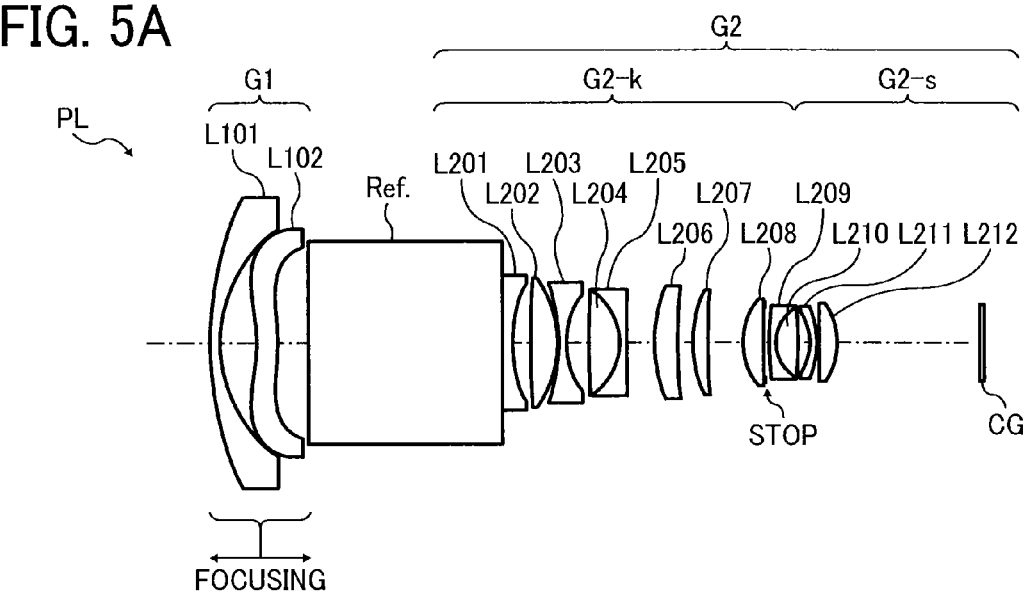
FIG. 5A is a cross-sectional view of a configuration of a projection lens according to Example 3.
Figure 5B:
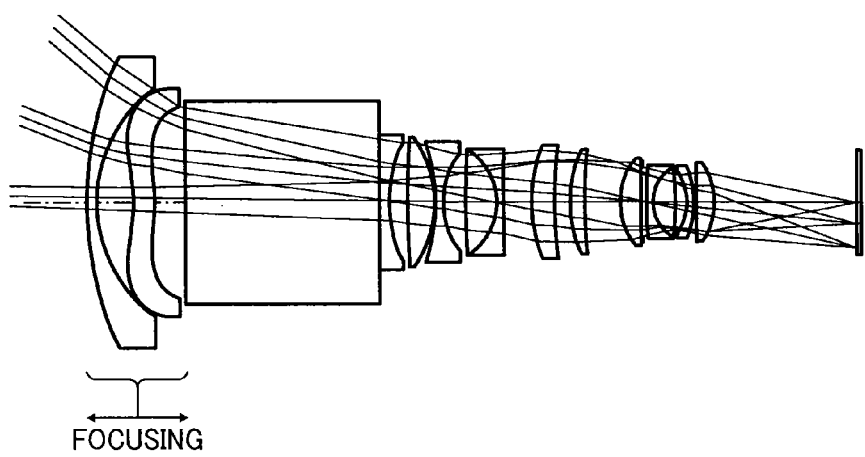
FIG. 5B is a view of optical paths of the projection lens according to Example 3.
Figure 5C:
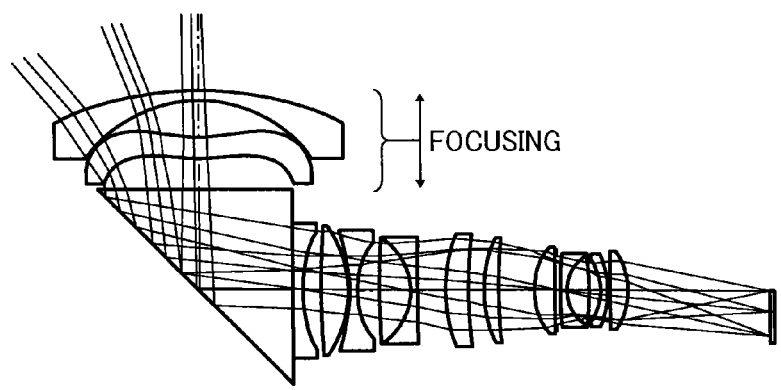
FIG. 5C is a view of the projection lens including a right-angle prism as a reflector according to Example 3.

The projection lens PL according to Example 3 is as illustrated in FIGS. 5A, 5B, and 5C.

As illustrated in FIG. 5A, a first lens group G1 includes a lens L101 and a lens L102. A reflector Ref. is a right-angle prism. A second lens group G2 includes lenses L201 through L212.

The first lens group G1 is a negative group including a negative meniscus lens L101 with a convex surface facing the magnification side and a meniscus lens L102 with a low thickness deviation ratio. The lens L102 has the center portion with a concave surface facing the magnification side and peripheral portions that inflect toward the reduction side.

The second lens group G2 is a positive group including the lenses L201 through L212.

The lens L201 is a negative meniscus lens with a convex surface facing the magnification side, and the lens L202 is a positive biconvex lens with a convex surface facing the reduction side. The lens 203 is a negative biconcave lens, and the lens L204 is a positive biconvex lens.

The lens L205 is a negative biconcave lens, and the lens L206 is a positive meniscus lens with a convex surface facing the magnification side. The lens L207 is a positive meniscus lens with a convex surface facing the magnification side, and the lens L208 is a positive biconvex lens.

The lenses L201 through L208 constitute a positive lens group G2-k on the magnification side of the aperture stop STOP.

The lens 209 disposed on the reduction side of the aperture stop STOP is a negative meniscus lens with a convex surface facing the magnification side. The lens 210 is a positive biconvex lens. The lens 211 is a negative meniscus lens with a convex surface facing the reduction side. The lens L212 is a positive meniscus lens with a convex surface facing the reduction side.

The lenses L209 through L212 constitute a negative lens group G2-s.

In the positive lens group G2-k, the lens L204 and the lens L205 are cemented to each other. In the negative lens group G2-s, the lens L209 and the lens L210 are cemented to each other.

The reflector Ref. is disposed between the first lens group G1 and the second lens group G2.

In Example 3, the focal length of the entire system, the range of F, F-number, and a half angle of view at the wide angle end ($\omega w$) are as follows:

F is 13.0 mm, Fno is 2.56, and $\omega w$ is 42.1°. Table 9 shows data regarding Example 3 below.

TABLE 9

| S | R | D | Nd | vd | Lens | Group |
|---|---|---|---|---|---|---|
| 0 | — | D0 | | | | |
| 1 | 84.168 | 2.3 | 1.77250 | 49.6 | L101 | G1 |
| 2 | 34.808 | 9.0 | | | | |
| 3* | −30.286 | 4.9 | 1.53111 | 56.0 | L102 | |
| 4* | −44.666 | 7.2 | | | | |
| 5 | INF | D5 | | | | |
| 6 | INF | 47.0 | 1.51680 | 64.2 | Ref. | — |
| 7 | INF | 0.3 | | | | |
| 8 | 2954.025 | 2.0 | 1.84666 | 23.8 | L201 | G2-k  G2 |
| 9 | 38.195 | 4.2 | | | | |
| 10 | 624.572 | 6.4 | 1.80610 | 40.9 | L202 | |
| 11 | −28.587 | 0.3 | | | | |
| 12 | −41.100 | 1.5 | 1.43875 | 94.9 | L203 | |
| 13 | 19.561 | 5.4 | | | | |
| 14 | 195.115 | 7.5 | 1.64769 | 33.8 | L204 | |
| 15 | −16.305 | 1.8 | 1.77250 | 49.6 | L205 | |
| 16 | 811.486 | 6.1 | | | | |
| 17 | 34.101 | 6.0 | 1.72000 | 46.0 | L206 | |
| 18 | 95.121 | 3.5 | | | | |
| 19 | 36.482 | 3.4 | 1.74320 | 49.3 | L207 | |
| 20 | 96.320 | 8.3 | | | | |
| 21 | 16.493 | 5.3 | 1.49700 | 81.5 | L208 | |
| 22 | −501.786 | 0.3 | | | | |
| 23 | INF | 0.8 | | | | |
| 24 | 82.180 | 1.5 | 1.83400 | 37.3 | L209 | G2-s |
| 25 | 9.857 | 5.5 | 1.48749 | 70.4 | L210 | |
| 26 | −166.384 | 3.3 | | | | |
| 27 | −12.448 | 1.6 | 1.80000 | 29.8 | L211 | |
| 28 | −19.846 | 0.3 | | | | |
| 29* | −192.595 | 4.4 | 1.48749 | 70.4 | L212 | |
| 30* | −15.885 | 33.5 | | | | |
| 31 | INF | 1.0 | 1.51680 | 64.2 | CG | — |
| 32 | INF | — | | | | |

[Data regarding Aspherical Surface] Table 10 shows data regarding aspherical surfaces below.

TABLE 10

| | 3 | 4 | 29 | 30 |
|---|---|---|---|---|
| k | 0 | 0 | 0 | 0 |
| C4 | 7.7197E−05 | 6.3092E−05 | 3.5943E−06 | 1.9425E−05 |
| C6 | −1.7942E−07 | −9.2570E−08 | 3.3927E−08 | 5.0128E−08 |
| C8 | 2.6600E−10 | −1.2137E−10 | 1.4678E−09 | 6.5811E−10 |
| C10 | 2.7452E−14 | 6.0835E−13 | −3.5727E−12 | 1.7683E−12 |
| C12 | −4.9556E−16 | 9.5254E−16 | 0.0000E+00 | 0.0000E+00 |
| C14 | 4.4787E−19 | −5.0351E−18 | 0.0000E+00 | 0.0000E+00 |
| C16 | −7.4039E−23 | 4.6461E−21 | 0.0000E+00 | 0.0000E+00 |

Table 11 shows the relations between object distance D0 and surface distance D5, as in Table 3. The first lens group moves along a direction of the optical axis to perform focusing.

TABLE 11

| D0 | 965 | 1600 | 6208 |
|---|---|---|---|
| D5 | −0.263 | 0.00 | 0.314 |

[Values of Parameters of Conditional Formulas]

Table 12 below shows values of parameters in condition A, and conditional formulas (1) through (3). Conditional formula (4) does not apply to Example 3, in which the first lens group G1 moves to achieve focusing.

TABLE 12

| Parameters | | Values |
|---|---|---|
| Ot | | 70.4 |
| Y' | | 11.8 |
| F | | 13.00 |
| f1 | | −56.1 |
| f2 | | 27.0 |
| f2-k | | 17.1 |
| f2-s | | −160.6 |
| (A) | Ot/Y' | 6.0 |
| (1) | f1/F | −4.32 |
| (2) | f2-s/f1 | 0.35 |
| (3) | f2-s/f2-k | 9.37 |

FIGS. 6A through 6C are diagrams of aberration of the projection lens PL in Example 3, as in FIGS. 2A through 2C.

Example 4

Figure 7A:
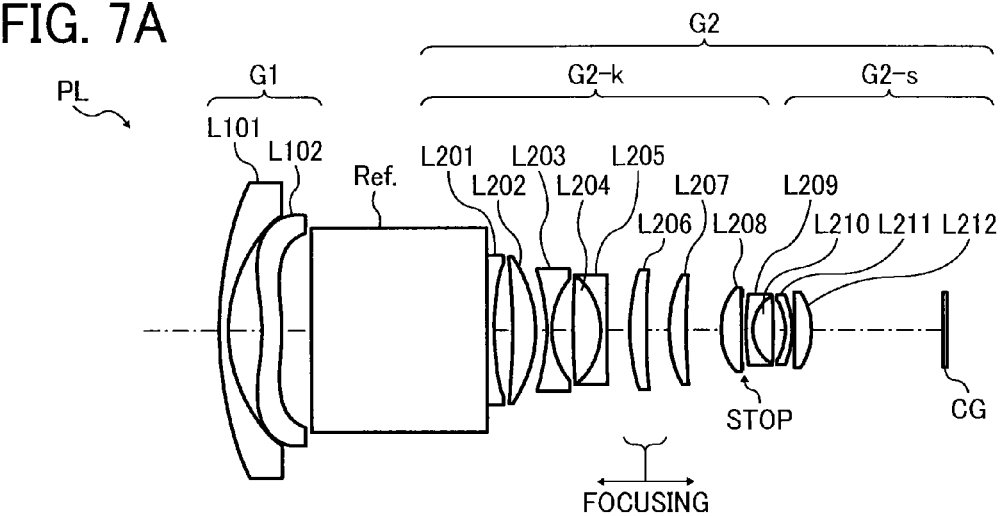
FIG. 7A is a cross-sectional view of a configuration of a projection lens according to Example 4.
Figure 7B:
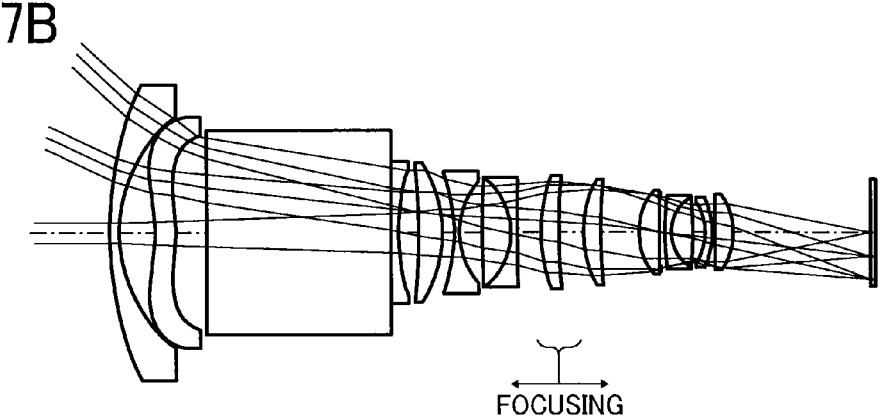
FIG. 7B is a view of optical paths of the projection lens according to Example 4.
Figure 7C:
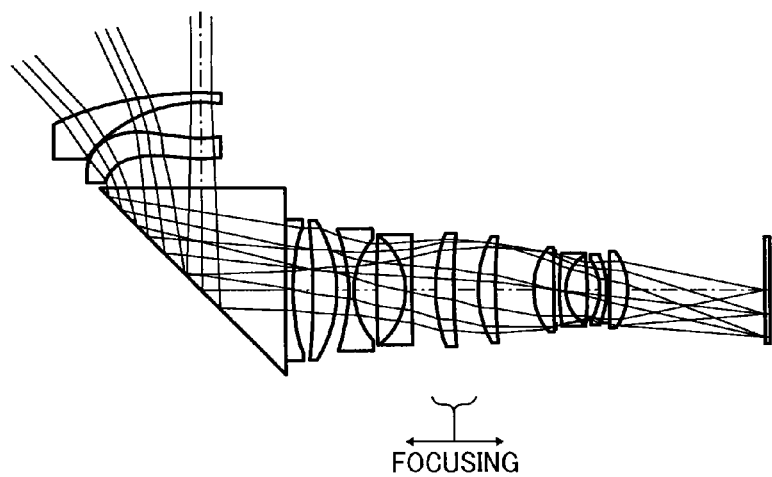
FIG. 7C is a view of the projection lens including a right-angle prism as a reflector according to Example 4.

The projection lens PL according to Example 4 is as illustrated in FIGS. 7A through 7C.

As illustrated in FIG. 7A, a first lens group G1 includes a lens L101 and a lens L102. A reflector Ref. is a right-angle prism. A second lens group G2 includes lenses L201 through L212.

In the projection lens PL according to Example 4, one lens (the lens L206) of the second lens group G2 moves along the direction of the optical axis to achieve focusing.

It should be noted that, a configuration as illustrated in FIG. 7C is also applicable, that employs the first lens group G1 partially cut off. However, the projection lens PL is not limited to this configuration.

The first lens group G1 is a negative group including a negative meniscus lens L101 with a convex surface facing the magnification side and a meniscus lens L102 with a low thickness deviation ratio. The lens L102 has the center portion with a concave surface facing the magnification side and peripheral portions that inflect toward the reduction side.

The second lens group G2 is a positive group including twelve lenses L201 through L212.

The lens L201 is a negative plano-concave meniscus lens, and the lens L202 is a positive meniscus lens with a convex surface facing the reduction side. The lens 203 is a negative biconcave lens, and the lens L204 is a positive meniscus lens with a convex surface facing the reduction side.

The lens L205 is a negative meniscus lens with a concave surface facing the magnification side, and the lens L206 is a positive meniscus lens with a convex surface facing the magnification side. The lens L207 is a positive meniscus lens with a convex surface facing the magnification side. The lens L208 is a positive meniscus lens with a convex surface facing the magnification side.

The eight lenses L201 through L208 constitute a positive lens group G2-k on the magnification side of the aperture stop STOP.

The lens 209 disposed on the reduction side of the aperture stop STOP is a negative meniscus lens with a convex surface facing the magnification side. The lens 210 is a positive biconvex lens. The lens 211 is a negative meniscus lens with a convex surface facing the reduction side. The lens L212 is a positive meniscus lens with a convex surface facing the reduction side.

The lenses L209 through L212 constitute a negative lens group G2-s on the reduction side of the aperture stop STOP.

In the positive lens group G2-k, the lens L204 and the lens L205 are cemented to each other. In the negative lens group G2-s, the lens L209 and the lens L210 are cemented to each other.

The reflector Ref. is disposed between the first lens group G1 and the second lens group G2.

In Example 4, the focal length of the entire system, the range of F, F-number, and a half angle of view at the wide angle end (ωw) are as follows:

F is 12.8 mm, Fno is 2.56, and ωw is 42.5°. Table 13 shows data regarding the projection lens PL in Example 4 below.

TABLE 13

| S | R | D | Nd | vd | Lens | Group |
|---|---|---|---|---|---|---|
| 0 | — | D0 | | | | |
| 1 | 87.318 | 2.3 | 1.80400 | 46.6 | L101 | G1 |
| 2 | 35.166 | 9.0 | | | | |
| 3 | −29.857 | 5.1 | 1.53111 | 56.0 | L102 | |
| 4* | −43.936 | 7.3 | | | | |
| 5 | INF | 0.0 | | | | |
| 6 | INF | 46.0 | 1.51680 | 64.2 | Ref. | — |
| 7 | INF | 0.0 | | | | |
| 8 | INF | 1.6 | 1.92286 | 20.9 | L201 | G2-k G2 |
| 9 | 62.673 | 4.9 | | | | |
| 10 | −117.557 | 5.9 | 1.80610 | 40.9 | L202 | |
| 11 | −30.178 | 2.7 | | | | |
| 12 | −43.798 | 1.8 | 1.43875 | 94.9 | L203 | |
| 13 | 19.821 | 4.9 | | | | |
| 14 | 367.020 | 7.4 | 1.64769 | 33.8 | L204 | |
| 15 | −16.836 | 2.0 | 1.77250 | 49.6 | L205 | |
| 16 | −1085.642 | D16 | | | | |
| 17 | 45.214 | 4.7 | 1.72000 | 46.0 | L206 | |
| 18 | 253.464 | D18 | | | | |
| 19 | 31.344 | 4.0 | 1.69700 | 48.5 | L207 | |
| 20 | 99.348 | 9.6 | | | | |
| 21 | 17.069 | 5.3 | 1.49700 | 81.5 | L208 | |
| 22 | −681.383 | 0.3 | | | | |
| 23 | INF | 0.9 | | | | |
| 24 | 86.800 | 1.6 | 1.83400 | 37.3 | L209 | G2-s |
| 25 | 9.856 | 5.4 | 1.48749 | 70.4 | L210 | |
| 26 | −143.157 | 3.0 | | | | |
| 27 | −13.587 | 1.6 | 1.80000 | 29.8 | L211 | |
| 28 | −23.163 | 0.7 | | | | |

TABLE 13-continued

| S | R | D | Nd | vd | Lens | Group |
|---|---|---|---|---|---|---|
| 29* | −340.235 | 4.5 | 1.48749 | 70.4 | L212 | |
| 30* | −16.779 | 33.2 | | | | |
| 31 | INF | 1.0 | 1.51680 | 64.2 | CG | — |
| 32 | INF | — | | | | |

[Data Regarding Aspherical Surface]

Table 14 shows data regarding the respective aspherical surfaces below.

TABLE 14

| | 3 | 4 | 29 | 30 |
|---|---|---|---|---|
| k | 0 | 0 | 0 | 0 |
| C4 | 7.7700E−05 | 6.2423E−05 | 6.3345E−06 | 1.8106E−05 |
| C6 | −1.7991E−07 | −9.2766E−08 | 6.0431E−08 | 7.6636E−08 |
| C8 | 2.6477E−10 | −1.1805E−10 | 1.4554E−09 | 8.1885E−10 |
| C10 | 2.8644E−14 | 6.0200E−13 | −6.1156E−12 | −3.5099E−12 |
| C12 | −4.9544E−16 | 9.3768E−16 | 0.0000E+00 | 0.0000E+00 |
| C14 | 4.4820E−19 | −5.0296E−18 | 0.0000E+00 | 0.0000E+00 |
| C16 | −7.2229E−23 | 4.6836E−21 | 0.0000E+00 | 0.0000E+00 |

Table 15 shows the relations of object distance D0, surface distance D16, and surface distance D18, as in Table 3. At least one lens of the second lens group (at this example, L206) moves along a direction of the optical axis to perform focusing.

TABLE 15

| D0 | 770 | 1600 | 6136 |
|---|---|---|---|
| D16 | 5.8 | 5.7 | 5.6 |
| D18 | 5.9 | 6.0 | 6.1 |

[Values of Parameters of Conditional Formulas]

Table 16 below shows values of parameters in condition A, and conditional formulas (1) through (4).

TABLE 16

| Parameters | | Values |
|---|---|---|
| Ot | | 69.7 |
| Y' | | 11.8 |
| F | | 12.80 |
| f1 | | −54.2 |
| f2 | | 27.6 |
| f2-k | | 17.0 |
| f2-s | | −127.2 |
| (A) | Ot/Y' | 5.9 |
| (1) | f1/F | −4.23 |
| (2) | f2-s/f1 | 2.35 |
| (3) | |f2-s/f2-k| | 7.48 |
| (4) | F2f/f2 | 2.73 |

FIGS. 8A through 8C are diagrams of aberration of the projection lens PL in Example 4, as in FIGS. 2A through 2C.

Example 5

Figure 9A:
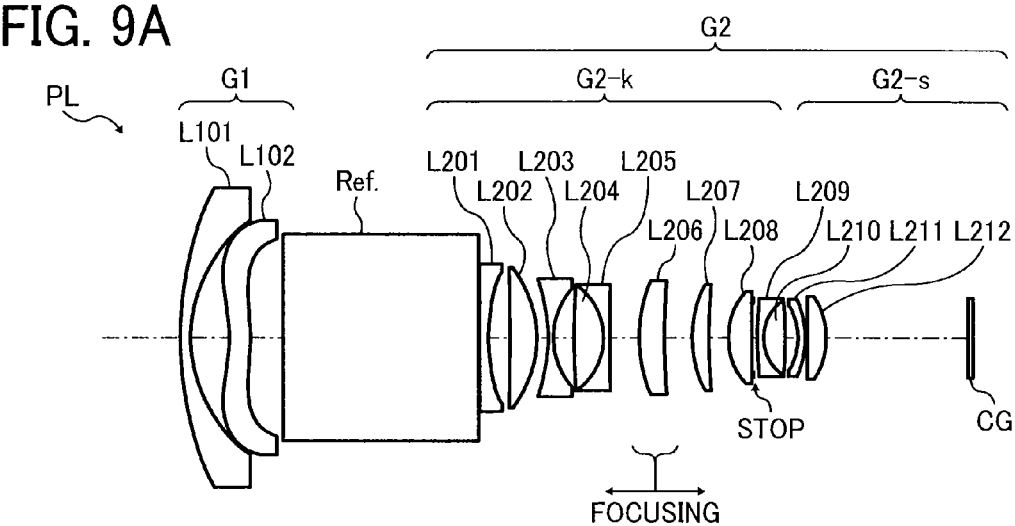
FIG. 9A is a cross-sectional view of a configuration of a projection lens according to Example 5.
Figure 9B:
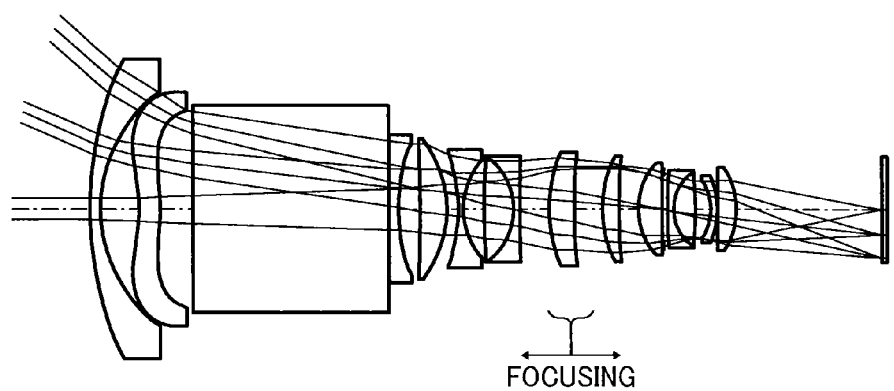
FIG. 9B is a view of optical paths of the projection lens according to Example 5.
Figure 9C:
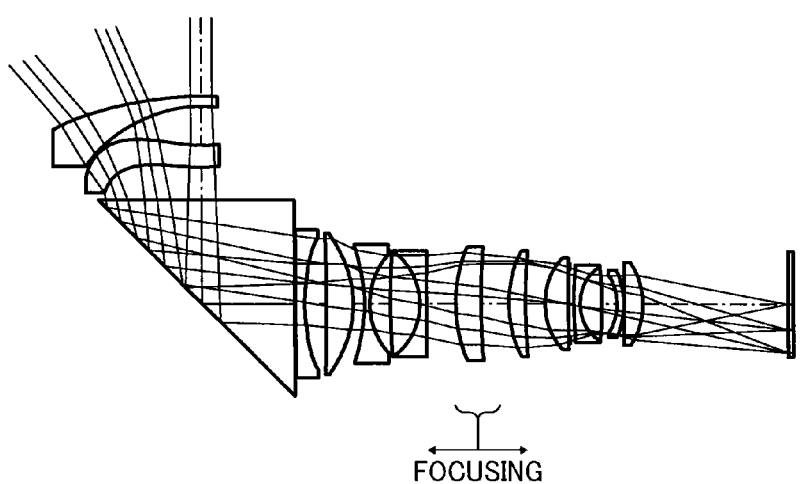
FIG. 9C is a view of the projection lens including a right-angle prism as a reflector according to Example 5.

The projection lens PL according to Example 5 is as illustrated in FIGS. 9A through 9C.

As illustrated in FIG. 9A, a first lens group G1 includes a lens L101 and a lens L102. A reflector Ref. is a right-angle prism. A second lens group G2 includes lenses L201 through L212.

One lens (the lens L206) of the second lens group G2 moves along the optical axis to perform focusing.

It should be noted that, a configuration as illustrated in FIG. 9C is also applicable, that employs the first lens group G1 partially cut off. However, the projection lens PL is not limited to this configuration.

The first lens group G1 is a negative group including a negative meniscus lens L101 with a convex surface facing the magnification side and a meniscus lens L102 with a low thickness deviation ratio. The lens L102 has the center portion with a concave surface facing the magnification side and peripheral portions that inflect toward the reduction side.

The second lens group G2 is a positive group including twelve lenses L201 through L212.

The lens L201 is a negative meniscus lens with a convex surface facing the magnification side, and the lens L202 is a positive meniscus lens with a convex surface facing the reduction side. The lens 203 is a negative biconcave lens, and the lens L204 is a positive biconvex positive lens.

The lens L205 is a negative biconcave lens, and the lens L206 is a positive meniscus lens with a convex surface facing the magnification side. The lens L207 is a positive meniscus lens with a convex surface facing the magnification side, and the lens L208 is a positive biconvex lens.

The lenses L201 through L208 constitute a positive lens group G2-k on the magnification side of the aperture stop STOP.

The lens 209 disposed on the reduction side of the aperture stop STOP is a negative meniscus lens with a convex surface facing the magnification side. The lens 210 is a positive biconvex lens. The lens 211 is a negative meniscus lens with a convex surface facing the reduction side. The lens L212 is a positive meniscus lens with a convex surface facing the reduction side.

The four lenses L209 through L212 constitute a negative lens group G2-s on the reduction side of the aperture stop STOP.

In the positive lens group G2-k, the lens L204 and the lens L205 are cemented to each other. In the negative lens group G2-s, the lens L209 and the lens L210 are cemented to each other.

The reflector Ref. is disposed between the first lens group G1 and the second lens group G2.

In Example 5, the focal length of the entire system, the range of F, F-number, and a half angle of view at the wide angle end (ωw) are as follows:

F is 12.9 mm, Fno is 2.56, and ωw is 42.4°. Table 17 shows data regarding Example 5 below.

TABLE 17

| S | R | D | Nd | vd | Lens | Group |
|---|---|---|---|---|---|---|
| 0 | — | D0 | | | | |
| 1 | 87.313 | 2.3 | 1.80400 | 46.6 | L101 | G1 |

TABLE 17-continued

| S | R | D | Nd | vd | Lens | Group |
|---|---|---|---|---|---|---|
| 2 | 34.946 | 9.0 | | | | |
| 3* | −30.796 | 5.0 | 1.53111 | 56.0 | L102 | |
| 4* | −45.730 | 7.7 | | | | |
| 5 | INF | 0.0 | | | | |
| 6 | INF | 46.0 | 1.51680 | 64.2 | Ref. | — |
| 7 | INF | 0.3 | | | | |
| 8 | 446.731 | 2.0 | 1.84666 | 23.8 | L201 | G2-k G2 |
| 9 | 42.123 | 4.7 | | | | |
| 10 | −482.956 | 6.4 | 1.80610 | 40.9 | L202 | |
| 11 | −29.627 | 2.8 | | | | |
| 12 | −35.487 | 1.5 | 1.43875 | 94.9 | L203 | |
| 13 | 20.948 | 3.9 | | | | |
| 14 | 143.037 | 7.3 | 1.64769 | 33.8 | L204 | |
| 15 | −16.169 | 1.8 | 1.77250 | 49.6 | L205 | |
| 16 | 612.359 | D16 | | | | |
| 17 | 36.151 | 6.0 | 1.72000 | 46.0 | L206 | |
| 18 | 97.309 | D18 | | | | |
| 19 | 29.484 | 3.7 | 1.69700 | 48.5 | L207 | |
| 20 | 87.998 | 4.8 | | | | |
| 21 | 17.278 | 5.3 | 1.49700 | 81.5 | L208 | |
| 22 | −298.945 | 0.3 | | | | |
| 23 | INF | 0.9 | | | | |
| 24 | 112.122 | 1.5 | 1.83400 | 37.3 | L209 | G2-s |
| 25 | 9.988 | 5.5 | 1.48749 | 70.4 | L210 | |
| 26 | −113.311 | 3.1 | | | | |
| 27 | −13.173 | 1.6 | 1.80000 | 29.8 | L211 | |
| 28 | −21.874 | 0.3 | | | | |
| 29* | −292.846 | 4.4 | 1.48749 | 70.4 | L212 | |
| 30* | −16.774 | 33.6 | | | | |
| 31 | INF | 1.0 | 1.51680 | 64.2 | CG | — |
| 32 | INF | — | | | | |

[Data Regarding Aspherical Surface]

Table 18 shows data regarding the respective aspherical surfaces below.

TABLE 18

| | 3 | 4 | 29 | 30 |
|---|---|---|---|---|
| k | 0 | 0 | 0 | 0 |
| C4 | 7.71463E−05 | 6.27771E−05 | 9.12044E−07 | 1.71924E−05 |
| C6 | −1.79058E−07 | −9.06057E−08 | 5.93077E−08 | 4.85520E−08 |
| C8 | 2.66269E−10 | −1.20256E−10 | 1.81951E−09 | 9.31880E−10 |
| C10 | 2.73554E−14 | 6.07468E−13 | −1.54158E−12 | 4.09439E−12 |
| C12 | −4.96654E−16 | 9.42548E−16 | 0.00000E+00 | 0.00000E+00 |
| C14 | 4.47504E−19 | −5.03098E−18 | 0.00000E+00 | 0.00000E+00 |
| C16 | −7.19761E−23 | 4.67687E−21 | 0.00000E+00 | 0.00000E+00 |

Table 19 shows the relations of object distance D0, surface distance D16, and surface distance D18, as in Table 15. At least one lens of the second lens group moves along a direction of the optical axis to perform focusing.

TABLE 19

| D0 | 773 | 1600 | 5971 |
|---|---|---|---|
| D16 | 6.4 | 6.3 | 6.2 |
| D18 | 6.6 | 6.7 | 6.8 |

[Values of Parameters of Conditional Formulas]

Table 20 below shows values of parameters in condition A, and conditional formulas (1) through (4).

TABLE 20

| Parameters | | Values |
|---|---|---|
| Ot | | 70.0 |
| Y' | | 11.8 |
| F | | 12.87 |
| f1 | | −53.7 |
| f2 | | 27.8 |
| f2-k | | 16.8 |
| f2-s | | −112.2 |
| (A) | Ot/Y' | 5.9 |
| (1) | f1/F | −4.17 |
| (2) | f2-s/f1 | 2.09 |
| (3) | \|f2-s/f2-k\| | 6.69 |
| (4) | f2s/f2 | 2.75 |

FIGS. 10A through 10C are diagrams of aberration of the projection lens PL in Example 5, as in FIGS. 2A through 2C.

Example 6

Figure 11A:
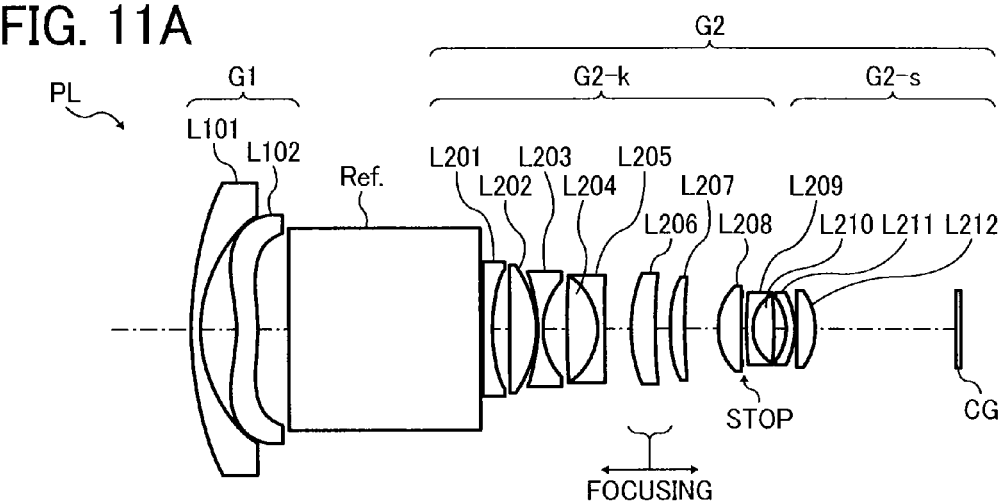
FIG. 11A is a cross-sectional view of a configuration of a projection lens according to Example 6.
Figure 11B:
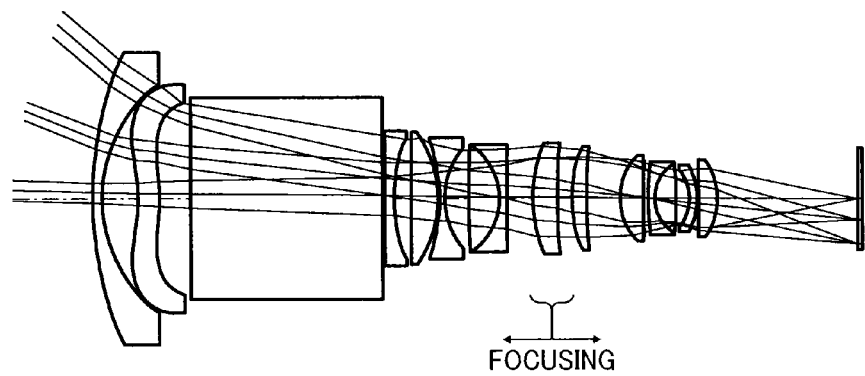
FIG. 11B is a view of optical paths of the projection lens according to Example 6.
Figure 11C:
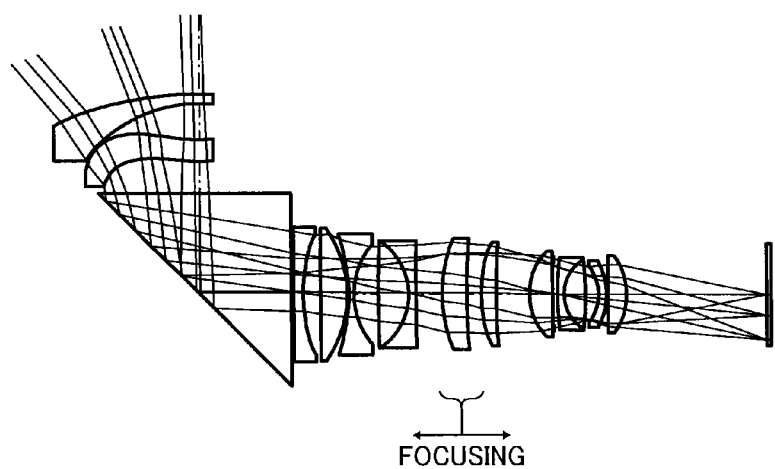
FIG. 11C is a view of the projection lens including a right-angle prism as a reflector according to Example 6.

The projection lens PL according to Example 6 is as illustrated in FIGS. 11A through 11C.

As illustrated in FIG. 11A, a first lens group G1 includes a lens L101 and a lens L102. A reflector Ref. is a right-angle prism. A second lens group G2 includes lenses L201 through L212.

One lens (the lens L206) of the second lens group G2 moves along the optical axis to perform focusing.

It should be noted that, a configuration as illustrated in FIG. 11C is also applicable, that employs a first lens group G1 partially cut off. However, the projection lens PL is not limited to this configuration.

The first lens group G1 is a negative group including a negative meniscus lens L101 with a convex surface facing the magnification side and a meniscus lens L102 with a low thickness deviation ratio. The lens L102 has the center portion with a concave surface facing the magnification side and peripheral portions that inflect toward the reduction side.

The second lens group G2 is a positive group including twelve lenses L201 through L212.

The lens L201 is a negative meniscus lens with a convex surface facing the magnification side, and the lens L202 is a positive biconvex lens. The lens 203 is a negative biconcave lens, and the lens L204 is a positive biconvex lens.

The lens L205 is a negative biconcave lens, and the lens L206 is a positive meniscus lens with a convex surface facing the magnification side. The lens L207 is a positive meniscus lens with a convex surface facing the magnification side, and the lens L208 is a positive biconvex lens.

The lenses L201 through L208 constitute a positive lens group G2-k on the magnification side of the aperture stop STOP.

The lens 209 disposed on the reduction side of the aperture stop STOP is a negative meniscus lens with a convex surface facing the magnification side. The lens 210 is a positive biconvex lens. The lens 211 is a negative meniscus lens with a convex surface facing the reduction side. The lens L212 is a positive meniscus lens with a convex surface facing the reduction side.

The four lenses L209 through L212 constitute a negative lens group G2-s on the reduction side of the aperture stop STOP.

In the positive lens group G2-k, the lens L204 and the lens L205 are cemented to each other. In the negative lens group G2-s, the lens L209 and the lens L210 are cemented to each other.

The reflector Ref. is disposed between the first lens group G1 and the second lens group G2.

In Example 6, the focal length of the entire system, the range of F, F-number, and a half angle of view at the wide angle end (ωw) are as follows:

F is 13.0 mm, Fno is 2.56, and ωw is 42.1°. Table 21 shows data regarding Example 6 below.

TABLE 21

| S | R | D | Nd | vd | Lens | Group |
|---|---|---|---|---|---|---|
| 0 | — | D0 | | | | |
| 1 | 84.168 | 2.3 | 1.77250 | 49.6 | L101 | G1 |
| 2 | 34.808 | 9.0 | | | | |
| 3* | −30.286 | 4.9 | 1.53111 | 56.0 | L102 | |
| 4* | −44.666 | 7.2 | | | | |
| 5 | INF | 0.0 | | | | |
| 6 | INF | 47.0 | 1.51680 | 64.2 | Ref. | — |
| 7 | INF | 0.3 | | | | |
| 8 | 2954.025 | 2.0 | 1.84666 | 23.8 | L201 | G2-k G2 |
| 9 | 38.195 | 4.2 | | | | |
| 10 | 624.572 | 6.4 | 1.80610 | 40.9 | L202 | |
| 11 | −28.587 | 0.3 | | | | |
| 12 | −41.100 | 1.5 | 1.43875 | 94.9 | L203 | |
| 13 | 19.561 | 5.4 | | | | |
| 14 | 195.115 | 7.5 | 1.64769 | 33.8 | L204 | |
| 15 | −16.305 | 1.8 | 1.77250 | 49.6 | L205 | |
| 16 | 811.486 | D16 | | | | |
| 17 | 34.101 | 6.0 | 1.72000 | 46.0 | L206 | |
| 18 | 95.121 | D18 | | | | |
| 19 | 36.482 | 3.4 | 1.74320 | 49.3 | L207 | |
| 20 | 96.320 | 8.3 | | | | |
| 21 | 16.493 | 5.3 | 1.49700 | 81.5 | L208 | |
| 22 | −501.786 | 0.3 | | | | |
| 23 | INF | 0.8 | | | | |
| 24 | 82.180 | 1.5 | 1.83400 | 37.3 | L209 | G2-s |
| 25 | 9.857 | 5.5 | 1.48749 | 70.4 | L210 | |
| 26 | −166.384 | 3.3 | | | | |
| 27 | −12.448 | 1.6 | 1.80000 | 29.8 | L211 | |
| 28 | −19.846 | 0.3 | | | | |
| 29* | −192.595 | 4.4 | 1.48749 | 70.4 | L212 | |
| 30* | −15.885 | 33.5 | | | | |
| 31 | INF | 1.0 | 1.51680 | 64.2 | CG | — |
| 32 | INF | — | | | | |

Table 22 shows data regarding the respective aspherical surfaces below.

TABLE 22

| | 3 | 4 | 29 | 30 |
|---|---|---|---|---|
| k | 0 | 0 | 0 | 0 |
| C4 | 7.7197E−05 | 6.3092E−05 | 3.5943E−06 | 1.9425E−05 |
| C6 | −1.7942E−07 | −9.2570E−08 | 3.3927E−08 | 5.0128E−08 |
| C8 | 2.6600E−10 | −1.2137E−10 | 1.4678E−09 | 6.5811E−10 |
| C10 | 2.7452E−14 | 6.0835E−13 | −3.5727E−12 | 1.7683E−12 |
| C12 | −4.9556E−16 | 9.5254E−16 | 0.0000E+00 | 0.0000E+00 |
| C14 | 4.4787E−19 | −5.0351E−18 | 0.0000E+00 | 0.0000E+00 |
| C16 | −7.4039E−23 | 4.6461E−21 | 0.0000E+00 | 0.0000E+00 |

Table 23 shows the relations of object distance D0, surface distance D16, and surface distance D18, as in Table 15. At least one lens of the second lens group (at this example, L206) moves along a direction of the optical axis to perform focusing.

TABLE 23

| D0 | 965 | 1600 | 6208 |
|---|---|---|---|
| D16 | 6.2 | 6.1 | 6.3 |
| D18 | 3.4 | 3.5 | 3.6 |

[Values of Parameters of Conditional Formulas]

Table 24 below shows values of parameters in condition A, and conditional formulas (1) through (4).

TABLE 24

| Parameters | | Values |
|---|---|---|
| Ot | | 70.4 |
| Y' | | 11.8 |
| F | | 13.0 |
| f1 | | −56.1 |
| f2 | | 27.0 |
| f2-k | | 17.1 |
| f2-s | | −160.6 |
| (A) | Ot/Y' | 5.9 |
| (1) | f1/F | −4.32 |
| (2) | f2-s/f1 | 0.35 |
| (3) | f2-s/f2-k | 9.37 |
| (4) | f2f/f2 | 2.61 |

FIGS. 12A through 12C are diagrams of aberration of the projection lens PL in Example 6, as in FIGS. 2A through 2C.

As illustrated in the aberration diagrams of Examples, highly accurate correction is performed on various aberrations, such as spherical aberration, astigmatism, field curvature, lateral chromatic aberration, and distortion.

As is clear from FIGS. 2A through 2C, 4A through 4C, and 6A through 6C corresponding to Examples 1 through 3, respectively, the fluctuations in aberration due to focusing is small.

As is clear from FIGS. 8A through 8C, 10A through 10C, and 12A through 12C illustrating aberration of Example, 4, Example 5, and Example 6, respectively, the fluctuations in aberration due to movement of the lens L206 in the first lens group G1 to perform focusing is small.

According to the Examples described above, the projections lens and the image display device are produced as follows.

—Aspect 1—

A projection lens PL is a projection optical system of an image display device to enlarge and project an image displayed on a display surface of an image display element onto a projection surface. The projection lens includes in order from a magnification side to a reduction side: a first lens group G1 having a negative refractive power; a reflector Ref. to bend an optical path; a second lens group G2 having a positive refractive power; and an aperture stop STOP disposed within the second lens group G2. The second lens group G2 has a positive refractive power on the magnification side of the aperture stop STOP, and a negative refractive power on the reduction side of the aperture stop STOP. Conditional formula (A) is satisfied:

$$Ot/Y'<6.1, \quad (A)$$

where, Ot is a distance along the optical axis between a maximum-magnification-side surface of the first lens group G1 and a surface of a lens adjacent to a reduction-side surface of the reflector Ref., and Y' is a maximum height of the image displayed on the display surface of the image display element.

—Aspect 2—

In the projection lens (Examples 1 through 3) according to Aspect 1, the first lens group G1 moves along the direction of the optical axis to perform focusing.

—Aspect 3—

In the projection lens (Examples 4 through 6) according to Aspect 1, at least one lens of the second lens group G2 moves along the direction of the optical axis to perform focusing.

—Aspect 4—

In the projection lens (Examples 1 through 6) according to Aspect 1, conditional formula (1) below is satisfied:

$$3.3<|F1|/F<4.6, \quad (1)$$

where F is the focal length of an entire lens system, and F1 is the focal length of the first lens group G1.

—Aspect 5—

In the projection lens (Examples 1 through 6) according to any one of Aspects 1 through 4, conditional formula (2) below is satisfied:

$$1.5<f2\text{-}s/F1<20.0, \quad (2)$$

where f2-s is the focal length of a negative lens group G2-s on the reduction side of the aperture stop STOP in the second lens group G2.

—Aspect 6—

In the projection lens (Examples 1 through 6) according to any one of Aspects 1 through 5, conditional formula (3) below is satisfied:

$$5.5<|f2\text{-}s|/f2\text{-}k<10.5, \quad (3)$$

where f2-s is the focal length of a negative lens group G2-s on the reduction side of the aperture stop STOP in the second lens group G2, and f2-k is the focal length of a positive lens group G2-k on the magnification side of the aperture stop STOP in the second lens group G2.

—Aspect 7—

In the projection lens (Examples 1 through 6) according to Aspect 3, conditional formula (4) below is satisfied:

$$1.5<f2f/F2<3.8, \quad (4)$$

where F2 is the focal length of the second lens group G2, and F2f is the focal length of a positive lens of the second lens group G2 that moves while focusing.

—Aspect 8—

The projection lens according to any one of Aspects 1 through 7, includes a light source 21 to emit light rays; an image display element 3 having a display surface to be displayed with an image to be projected; an illumination optical system CL, CW, M to illuminate the display surface of the image display element with the light rays emitted from the light source; and a projection optical system 4 to receive, from the illumination optical system, a projection light rays modulated by the image displayed on the display surface, to enlarge and project the image onto a projection surface S. The projection optical system is the projection lens according to Aspect 1.

A description is provided of embodiments below.

Each of FIGS. 14A through 14C, FIGS. 16A through 16C, FIGS. 18A through 18C, and FIGS. 20A through 20C is a view of a projection lens PL according to a corresponding embodiment.

The projection lenses PL of FIGS. 14A through 14C, FIGS. 16A through 16C, FIGS. 18A through 18C, and FIGS. 20A through 20C correspond to Example 7, Example 8, Example 9, and Example 10, respectively.

The same reference signs are given to corresponding elements in FIG. 22A, FIG. 24A, FIG. 26A, and FIG. 28A to facilitate understanding of elements.

In each of FIG. 22A, FIG. 24A, FIG. 26A, and FIG. 28A, reference sign "G1" denotes a first lens group, and reference sign "G2" denotes a second lens group. Reference sign "G3" denotes a third lens group, and reference sign "G4" denotes a fourth lens group. Reference sign "G5" denotes a fifth lens group. Reference sign "Ref." denotes a reflector.

Each of FIGS. 22A through 22C, 24A through 24C, 26A through 26C, and 28A through 28C includes four types of arrangement of the projection lens PL according to Examples 11 through 14. Each of FIGS. 22A and 22B, 24A and 24B, 26A and 26B, and 28A and 28B illustrates a projection lens PL with the optical axis linearly elongated from the first lens group G1 to the fifth lens group G5. Each of FIGS. 22A, 24A, 26A, and 28A illustrates displacement of the second lens group G2 through the fifth lens group G5 when changing magnification from the wide angle end to the telephoto end. The letters "WIDE" representing the wide angle end and "TELE" representing the telephoto end are indicated in the figures listed above.

In FIGS. 22A through 22C, 24A through 24C, 26A through 26C, and 28A through 28C, the left side is the magnification side, and the right side is the reduction side.

As illustrated in the Figures listed above, the second lens group G2 moves toward the reduction side, and the third lens group G3, the fourth lens group G4, and the fifth lens group G5 move toward the magnification side when changing magnification from the wide angle end to the telephoto end. In this case, the amount of movement differs from each other among the second lens group G2, the third lens group G3, the fourth lens group G4, and the fifth lens group G5.

Each of FIGS. 22A through 22C, 24A through 24C, 26A through 26C, and 28A through 28C indicates the letters "FOCUSING" that represents movement for focusing of a moving lens group, with arrow indicating the directions of the movement for focusing. Each of FIGS. 22C, 24C, 26C, and 28C illustrates movement of focusing of a moving lens group with the optical paths bent by the reflector Ref.

Each of FIGS. 22B and 22C, 24B and 24C, 26B and 26C, and 28B and 28C illustrates the optical path of light rays passing through the optical system.

In each of the figures listed above, the projection lens PL according to an embodiment of the present disclosure includes, in the order from the magnification side to the reduction side, the first lens group G1, the second lens group G2, the third lens group G3, the fourth lens group G4, and the fifth lens group G5. The reflector Ref. is disposed between lenses within the first lens group G1. In the projection lens PL according to an embodiment of the present disclosure, the reflector Ref. is, but not limited to, a right-angle prism.

The reflector Ref. is disposed between lenses within the first lens group G1, which means that the reflector Ref. is not disposed on the maximum-magnification side in the first lens group G1.

In the figures listed above, an aperture stop STOP is disposed between the fourth lens group G4 and the fifth lens group G5. An image display element 3, such as a light valve, is disposed on the reduction side of the fifth lens group G5, including a cover glass CG to protect a display surface of the image display element 3.

In the projection lens PL according to an embodiment of the present disclosure, the examples of the light valve include, but not limited to, a micro mirror device (DMD). Instead of the DMD, a reflective or transmissive liquid crystal panel may be employed.

In the projection lens PL according to an embodiment of the present disclosure as illustrated in each figure, the first lens group G1 has a negative refractive power, and the second lens group G2 has a negative refractive power. The third lens group G3 has a positive refractive power, and the fourth lens group G4 has a positive refractive power. The fifth lens group G5 has a negative refractive power.

Accordingly, the projection lens PL according to an embodiment of the present disclosure has a negative refractive power, a negative refractive power, a positive refractive power, a positive refractive power, and a negative refractive power in this recited order from the magnification side to the reduction side.

With the lens groups G1 and G2 having a negative refractive power disposed in the magnification side, the height of a chief ray decreases, thereby reducing the effective diameters of the lenses disposed on the magnification side in the first lens group G1.

This configuration reduces the size in the projection lens PL according to the embodiments of the present disclosure, thus allowing a reduction in the size of the image display device.

The first lens group has a greater thickness in the direction of the optical axis than those of the second lens group G2 through the fifth lens group G5. That is, the first lens group G1 has the greatest thickness in the direction of the optical axis among the first lens group G1 through the fifth lens group G5.

This configuration secures a sufficient space to allow the light rays to bend within the first lens group G1.

Further, as illustrated in the embodiments corresponding to the figures listed above, the reflector Ref., which is disposed between lenses within the first lens group G1, bends the optical paths, thereby reducing the visual thickness of the projection lens PL according to the embodiments of the present disclosure.

The projection lens PL according to the embodiments of the present disclosure achieves focusing by a method that moves at least one lens of the first lens group G1 along the direction of the optical axis, or a method that moves the third lens group G3 along the direction of the optical axis.

In the method that moves at least one lens of the first lens group G1 along the direction of the optical axis to achieve focusing, at least one lens of the first lens group G1 moves with the remaining lenses fixed.

The lenses that move while focusing are herein referred to as a "moving group".

In addition, the remaining lenses, which are fixed while focusing, are referred to as a "fixed group".

The moving group is at least moving lens of a lens group or a moving lens group while focusing.

In the method that moves the third lens group G3 along the direction of the optical axis to achieve focusing, the third lens group G3 is the moving group.

The focusing method that moves at least one lens of the first lens group G1 as a "moving group" reduces the fluctuations in ray aberration, further reducing the amount of movement of the moving group to achieve focusing. Increasing the refractive power of the moving group increases angles of view effectively, which further increases an optical performance of the projection lens PL according to the present disclosure.

The method that moves the third lens group G3 as the moving group is an inner focus method.

Both of the methods described above reduce fluctuations in the optical performance with changes in projection distance while changing magnification.

It should be noted that the focusing method is not limited to the above-described methods. Optionally, a method that moves the entirety of the first lens group G1, or the entire extending system that move the entire lens may be employed.

Preferably, the projection lens PL according to the embodiments of the present disclosure satisfies any one of conditional formulas (1') through (3') below:

$$0.1 < F1/F2 < 50.0; \quad (1')$$

$$2.0 < F3/F4 < 4.0; \text{ and} \quad (2')$$

$$-9.5 < F5/Bf < -3.5. \quad (3')$$

In the respective conditional formulas (1'), (2'), and (3'), symbols in parameters denote as follows:

F1: the focal length (<0) of the first lens group G1;
F2: the focal length (<0) of the second lens group G2; and
F3: the focal length (>0) of the third lens group G3;
F4: the focal length (>0) of the fourth lens group G4;
F5: the focal length (<0) of the fifth lens group G5; and
Bf: the back focus at the wide angle end (the distance from the most-reduction-side surface of the fifth lens group G5 to the display surface of the image display element 3).

In the method that moves the moving group of the first lens group G1 along the direction of the optical axis, it is preferable to satisfy conditional formula (4') alone or in combination with any one or more of conditional formulas (1'), (2'), and (3').

$$0.1 < f1-1/f1-2 < 2.0. \quad (4')$$

In conditional formula (4'), symbols in parameters denote as follows:

f1-1: the focal length (<0) of the moving group in the first lens group G1; and
f1-2: the focal length (<0) of the fixed group in the first lens group G1.

Conditional formula (1') defines an appropriate range of the ratio of the focal length F1 of the first lens group G1 to the focal length F2 of the second lens group G2.

Decreasing (increasing) the parameter of F1/F2 in conditional formula (1') means that the negative refractive power of the first lens group G1 increases (decreases) relative to the negative refractive power of the second lens group G2.

Decreasing the parameter of F1/F2 reduces the aperture diameters of the lenses disposed on the magnification side in the first lens group G1. That is, decreasing the parameter of F1/F2 is advantageous from the viewpoint of a reduction in the size of the projection lens PL according to the present disclosure. However, with parameter of F1/F2 not greater than the lower limit defined by conditional formula (1'), astigmatism excessively increases.

With the parameter of F1/F2 greater than or equal to the upper limit defined by conditional formula (1'), the negative refractive power of the first lens group becomes insufficient relative to the negative refractive power of the second lens group G2. This increases the size of the lenses on the magnification side in the first lens group G1, leading to an increase in the size of the projection lens PL according to the embodiments of the present disclosure, hampering wider angles of view.

Satisfying conditional formula (1') easily achieves a reduction in size of projection lens, maintaining a favorable astigmatism.

In the projection lenses of FIGS. 14A through 14C, FIGS. 16A through 16C, FIGS. 18A through 18C, and FIGS. 20A through 20C, oblique rays are used as an image-forming rays.

When projecting an image onto a screen S, projection light rays, which are oblique rays, are guided from the light valve to the fifth lens group G5 to the first lens group G1. In this case, the first lens group G1 having a negative refractive power further increases the divergence angles of divergent rays having passed through the second lens group G2 having a negative refractive power.

With conditional formula (1') satisfied, a favorable balance is made in the negative refractive power between the first lens group G1 and the second lens group G2, thereby reducing divergent angles of the light rays having passed through the second lens group G2 to enter the first lens group G1.

Accordingly, the projection light rays diverge from the first lens group G1 at a great amount of divergent angles, maintaining a favorable balance in aberration. This arrangement further eliminates or reduces a deterioration in performance due to the eccentricity of lenses when manufacturing the lenses.

Conditional formula (2') defines the range to favorably distribute the positive refractive power between the third lens group G3 and the fourth lens group G4 that move while focusing.

With the parameter of F3/F4 not greater than the lower limit defined by conditional formula (2'), the positive refractive power of the third lens group G3 excessively increases relative to the positive refractive power of the fourth lens group G4, thereby hampering action of the negative refractive power of the second lens group G2. As a result, a great amount of field curvature occurs over the entire magnification range.

With the parameter of F3/F4 greater than or equal to the upper limit defined by conditional formula (2'), the positive refractive power of the third lens group G3 becomes insufficient relative to the positive refractive power of the fourth lens group G4. As a result, a great amount of field curvature easily occurs in the telephoto end side, in which the third lens group G3 approaches the second lens group G2.

Conditional formula (3') defines the range to reduce coma aberration.

Failing to satisfy conditional formula (3') excessively increases or excessively decreases the negative refractive power of the fifth lens group G5 that expands the incident angle of the light rays coming from the reduction side (the light valve side). This arrangement further excessively increases or excessively decreases the angles of the light rays advancing from the fourth lens group G4 toward the magnification side, resulting in an increase in coma aberration.

Conditional formula (4') defines the range to make a good balance in the refractive power between the moving group and fixed group in the first lens group G1.

Decreasing (increasing) the parameter of f1-1/f1-2 in conditional formula (4') means that the negative refractive power of the moving group increases (decreases) relative to the negative refractive power of the fixed group.

With a decrease in parameter of f1-1/f1-2 in conditional formula (4'), the negative refractive power of the moving group increases, thereby reducing the amount of movement of the moving group to achieve focusing.

With the parameter of f1-1/f1-2 not greater than the lower limit defined by conditional formula (4'), the refractive power of the moving group excessively increases, resulting in a poor balance in the refractive power between the moving group and the fixed group. As a result, a great amount of spherical aberration easily occurs.

With the parameter of $|f-1/f1-2|$ greater than or equal to the upper limit defined by conditional formula (4'), the refractive power of the fixed group excessively increases, thereby easily generating a great amount of spherical aberration.

Satisfying conditional formula (4') achieves a favorable optical performance even with changes in size of the screen S, onto which an image is enlarged and projected, when changing magnification.

A brief description is provided of a projector 1 according to two embodiments of the present disclosure, referring to FIGS. 13A and 13B, before describing specific Examples of the projection lens according to the embodiments of the present disclosure. The same reference signs are given to corresponding elements, which are not likely to cause confusion, in FIGS. 13A and 13B to facilitate understanding of the elements.

In each of FIGS. 13A and 13B, the projector 1 includes a digital mirror device (DMD), which is a micro mirror device, as an image display element 3.

The projector 1 further includes an illumination optical system 2, the DMD 3 as the image display element 3, and a projection lens as a projection optical system 4 or 4A.

The projection lens 4 or 4A includes any one of the projection lenses PL according to Examples 7 through 10.

The illumination optical system 2 time-separates light rays into the three colors of red, green, and blue to illuminate the display surface of the DMD 3, thereby adjusting inclination of the micro mirrors corresponding to the respective pixels of the colors in response to the respective light rays in the DMD 3.

Then, an image to be projected is displayed on the DMD 3, and the light with a modulated intensity corresponding to the image is magnified by the projection lens 4 or 4A to be enlarged and projected onto a screen S as a projection surface.

The illumination optical system 2 includes a light source 21, a condenser lens CL, a red green blue (RGB) color wheel CW, and a mirror M.

To ensure a sufficient amount of space to include the light source 21, the condenser lens CL, the red green blue (RGB) color wheel CW, and the mirror M in the illumination optical system 2, the incident angle of the light rays emitted from the illumination optical system 2 to the DMD 3 is increased.

To keep such space between the projection lens 4 or 4A and the illumination optical system 2, there is a need for a certain degree of the back focus of the projection lens 4 or 4A to be secured.

Accordingly, a mirror M is employed to secure the incident angle of the light rays and the back focus.

It should be noted that the condenser lens CL, the RGB color wheel CW, and the mirror M constitute an illumination optical system 2 to illuminate the display surface of the image display element 3.

In the example of FIG. 13A, the projector 1 includes the projection lens 4 within the casing of the projector 1. In the example of FIG. 13B, a portion of the projection lens 4A is exposed to the outside of the casing of the projector 1. The portion includes the reflector Ref. and the first lens group disposed on the magnification side of the reflector Ref.

The configuration of FIG. 13B may be a configuration, in which the projection body is disposed with the bottom face vertical to the ground. Alternatively, a configuration, in which the projection direction is toward the ceiling side or the floor side, may be employed.

In Examples 7 through 9, at least one lens of the first lens group G1 moves as a moving group along the direction of the optical axis to perform focusing. In Example 10, the third lens group G3 moves as the moving group along the direction of the optical axis to perform focusing. In Examples 7 through 10, a sufficient amount of back focus is secured during changes in magnification.

EXAMPLES

A description is given of specific Examples 7 through 10 regarding a projection lens PL according to the present disclosure.

The meanings of symbols in Examples 1 through 6 are described below:

F: the focal length (>0) of the projection lens PL;

Fno: numerical aperture;

R: the radius of curvature ("paraxial radius of curvature" for an aspherical surface);

D: The distance between surfaces (which is referred to also as surface distance);

Nd: refractive index;

vd: the Abbe number; and

BF: back focus.

Aspherical surface is expressed by the following formula:

$$X=(H^2/R)/[1+\{1-K(H/r)^2\}^{1/2}]+C4 \cdot H^4+C6 \cdot H^6+C8 \cdot H^8+C10 \cdot H^{10}+ \ldots$$

In the formula, X denotes a displacement along the direction of the optical axis at a position of a height H from the optical axis to the peak of a surface. K denotes a constant of the cone, and "C4, C6, C8, C10 . . . " refer to aspherical surface coefficients.

The unit of length (F, R, D, and Bf), which is a dimension, is mm unless otherwise mentioned, and the unit of angle is degree.

Example 7

Figure 14A:
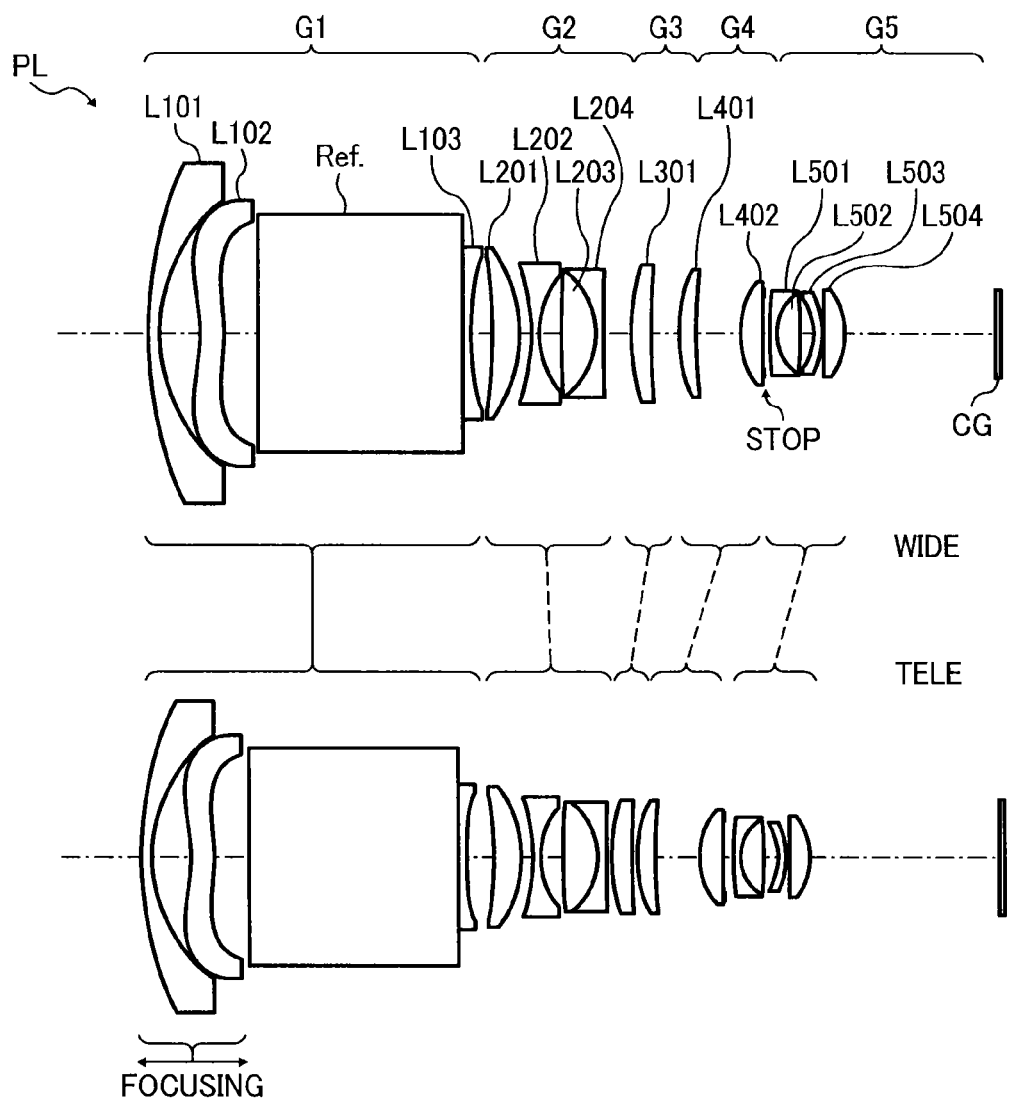
FIGS. 14A through 14C are views of a configuration, movement of changing magnification, and focusing movement of a projection lens according to Example 7.
Figure 14B:
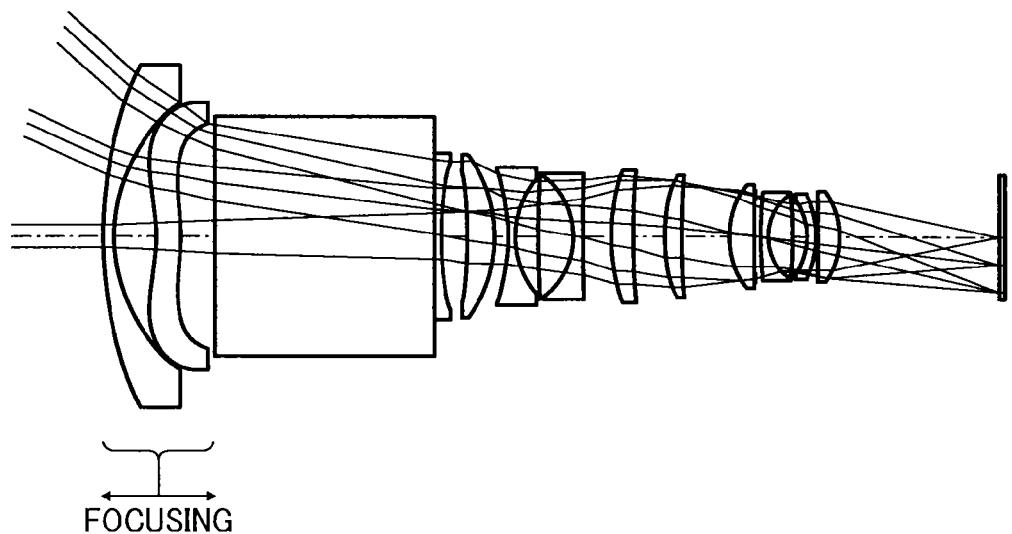
Figure 14C:
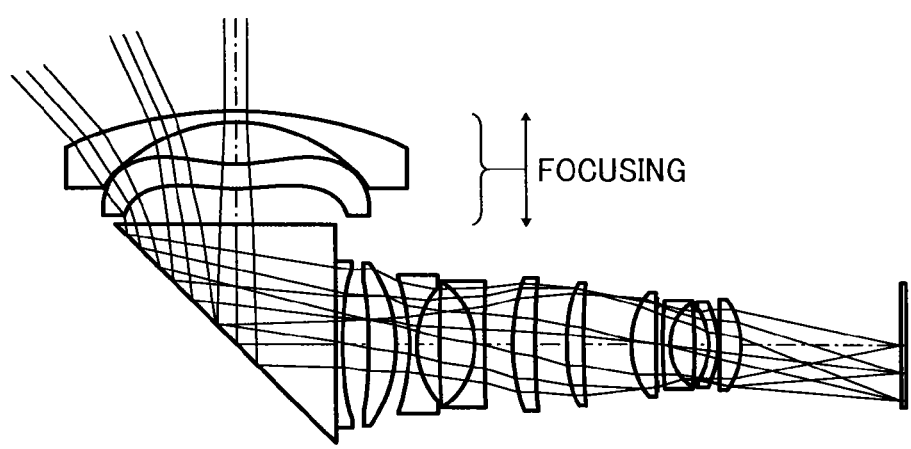

The projection lens PL according to Example 7 is as illustrated in FIGS. 14A through 14C.

As illustrated in FIG. 14A, a first lens group G1 includes a lens L101 through a lens L103, and a reflector Ref. A second lens group G2 includes lenses L201 through L204. A third lens group G3 includes a lens L301. A fourth lens group G4 includes a lens L401 and a lens L402. A fifth lens group G5 includes a lens L501 through a lens L504.

As described above, a light valve is used as the DMD. A cover glass CG is disposed on the most-reduction side to cover the display surface of the DMD.

The aperture stop STOP is disposed between the fourth lens group G4 and the fifth lens group G5.

In the projections lens PL according to Example 7, the lens L101 and the lens L102 within the first lens group G1 simultaneously moves as the moving group along the direction of the optical axis to perform focusing.

The first lens group G1 is a negative group including a negative meniscus lens L101 on the magnification side of the reflector Ref and a meniscus lens L102.

A negative plano-concave lens L103 is disposed on the reduction side of the reflector Ref.

The second lens group G2 is a negative group including a positive meniscus lens L201, a negative lens L202, a positive lens L203, and a negative meniscus lens L204. In this case, the lens L203 and the lens L204 are cemented to each other.

The third lens group G3 is a positive group, including one positive meniscus lens L301.

The fourth lens group G4 is a positive group, including a positive meniscus lens L401 and a positive lens L402.

The fifth lens group G5 is a negative group, including a negative meniscus lens L501, a positive lens L502, a negative meniscus lens L503, and a positive meniscus lens L504. In this case, the lens L501 and the lens L502 are cemented to each other.

Among the first lens group G1 through the fifth lens group G5, the first lens group G1 has the greatest thickness in the direction of the optical axis, as is clear from FIG. 14A.

In Example 7, the focal length of the entire system, the range of F, F-number, and a half angle of view (ω) are as follows:

F is 12.8 through 16.6 mm, Fno is 2.56 through 3.35, and ο is 42.5° through 35.3°. Table 25 shows data regarding the projection lens PL in Example 1 below.

TABLE 25

| S | R | D | Nd | vd | Lens | Group |
|---|---|---|---|---|---|---|
| 0 | INF | D0 | | | | |
| 1 | 87.318 | 2.30 | 1.80400 | 46.6 | L101 | G1-1  G1 |
| 2 | 35.166 | 9.00 | | | | |
| 3* | −29.857 | 5.11 | 1.53111 | 56.0 | L102 | |
| 4* | −43.936 | 7.28 | | | | |
| 5 | INF | 0.0 | | | | |
| 6 | INF | 46.0 | 1.51680 | 64.2 | PZ | |
| 7 | INF | 0.00 | | | | |
| 8 | INF | 1.60 | 1.92286 | 20.9 | L103 | G1-2 |
| 9 | 62.673 | D9 | | | | |
| 10 | −117.557 | 5.94 | 1.80610 | 40.9 | L201 | G2 |
| 11 | −30.178 | 2.67 | | | | |
| 12 | −43.798 | 1.83 | 1.43875 | 94.9 | L202 | |
| 13 | 19.821 | 4.86 | | | | |
| 14 | 367.020 | 7.45 | 1.64769 | 33.8 | L203 | |
| 15 | −16.836 | 1.97 | 1.77250 | 49.6 | L204 | |
| 16 | −1085.642 | D16 | | | | |
| 17 | 45.214 | 4.68 | 1.72000 | 46.0 | L301 | G3 |
| 18 | 253.464 | S18 | | | | |
| 19 | 31.344 | 4.03 | 1.69700 | 48.5 | L401 | G4 |
| 20 | 99.348 | 9.56 | | | | |
| 21 | 17.069 | 5.34 | 1.49700 | 81.5 | L402 | |
| 22 | −681.383 | 0.31 | | | | |
| 23 | INF | D23 | | | | |
| 24 | 86.800 | 1.61 | 1.83400 | 37.3 | L501 | G5 |
| 25 | 9.856 | 5.40 | 1.48749 | 70.4 | L502 | |
| 26 | −143.157 | 2.98 | | | | |
| 27 | −13.587 | 1.62 | 1.80000 | 29.8 | L503 | |
| 28 | −23.163 | 0.68 | | | | |
| 29* | −340.235 | 4.53 | 1.48749 | 70.4 | L504 | |
| 30* | −16.779 | D30 | | | | |
| 31 | INF | 1.00 | 1.51680 | 64.2 | CG | — |
| 32 | INF | — | | | | |

In Table 25, the symbol "S" (surface numbers) indicates the numbers of lens surfaces sequentially numbered from the magnification side. The surface of the aperture stop STOP, which is 23 in Table 25, is included in the surface numbers. The symbol "PZ" denotes a right-angle prism as the reflector Ref. The symbol "CG" denotes a cover glass of a light valve.

The symbol "INF" in Table 25 indicates that the radius curvature is infinite. The mark "*" is indicated at surface numbers of "aspherical surfaces". The same applies to Examples 8 through 10.

[Data Regarding Aspherical Surface]
Table 26 shows data regarding aspherical surfaces below.

TABLE 26

| | 3 | 4 | 29 | 30 |
|---|---|---|---|---|
| k | 0 | 0 | 0 | 0 |
| C4 | 7.7700E−05 | 6.2423E−05 | 6.3345E−06 | 1.8106E−05 |
| C6 | −1.7991E−07 | −9.2766E−08 | 6.0431E−08 | 7.6636E−08 |
| C8 | 2.6477E−10 | −1.1805E−10 | 1.4554E−09 | 8.1885E−10 |
| C10 | 2.8644E−14 | 6.0200E−13 | −6.1156E−12 | −3.5099E−12 |
| C12 | −4.9544E−16 | 9.3768E−16 | 0.0000E+00 | 0.0000E+00 |
| C14 | 4.4820E−19 | −5.0296E−18 | 0.0000E+00 | 0.0000E+00 |
| C16 | −7.2229E−23 | 4.6836E−21 | 0.0000E+00 | 0.0000E+00 |

In Table 26, "4.6836E−21" represents "4.6836×10$^{-21}$". The same applies to the following Examples.

In Table 25, surface distances D9, D16, D18, D23, and D30 vary depending on the position of focusing, such as the wide angle end, the intermediate focal length, and the telephoto end, with an objection distance of 1600 mm (=D0). At least one lens of the first lens group (G1-1) moves along a direction of an optical axis to perform focusing. Table 27 shows the detailed data.

TABLE 27

| | D9 | D16 | D18 | D23 | D30 |
|---|---|---|---|---|---|
| Wide angle end | 4.86 | 5.68 | 6.02 | 0.87 | 33.23 |
| Intermediate | 5.69 | 2.85 | 4.28 | 1.36 | 36.49 |
| Telephoto end | 5.90 | 0.88 | 0.91 | 1.76 | 41.20 |

[Values of Parameters of Conditional Formulas]
Table 28 below shows values of parameters in conditional formulas (1') through (4').

TABLE 28

| Parameters | | Numerical Values |
|---|---|---|
| F1 | | −21.2 |
| F2 | | −64.7 |
| F3 | | 75.4 |
| F4 | | 25.4 |
| F5 | | −127.2 |
| f1-1 | | −54.2 |
| f1-2 | | −67.2 |
| Bf | | 33.2 |
| (1') | F1/F2 | 0.33 |
| (2') | F3/F4 | 2.97 |
| (3') | F5/Bf | −3.83 |
| (4') | f1-1/f1-2 | 0.81 |

FIGS. 15A through 15C are diagrams of aberration of the projection lens PL in Example 7.

FIG. 15A is a diagram of aberration with the projection lens PL focused on the wide angle end. FIG. 15B is a diagram of aberration with the intermediate focal length. FIG. 15C is a diagram of aberration with the projection lens PL focused on the telephoto end. FIGS. 15A, 15B, and 15C illustrate "SA" representing spherical aberration, "AS" representing astigmatism, and "Dist." representing distortion, respectively.

In the diagram of spherical aberration "SA", the symbols "R", "G", and "B" are denoted as the descriptions of a wavelength R of 625 nm, a wavelength G of 550 nm, and a wavelength B of 460 nm.

In the diagram of astigmatism "AS", the symbols "T" and "S" denote aberration with respect to the tangential direction and aberration with respect to the sagittal direction, respectively.

It should be noted that astigmatism and distortion are with respect to light rays having a wavelength of 550 nm.

As illustrated in FIG. 15, the fluctuations in aberration due to changes in magnification are small.

The same applies to Examples 8 through 10.

Example 8

Figure 16A:
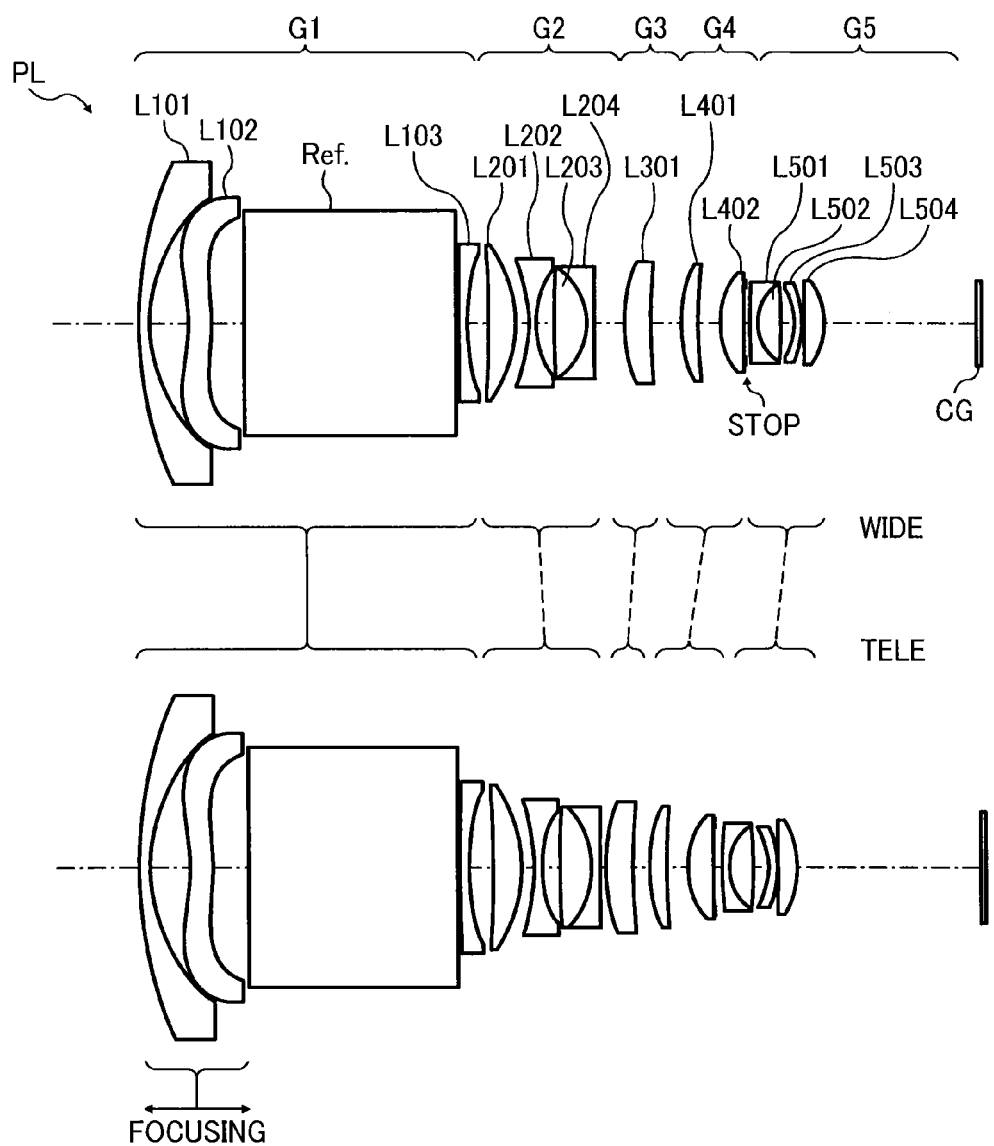
FIGS. 16A through 16C are views of a configuration, movement of changing magnification, and focusing movement of a projection lens according to Example 8.
Figure 16B:
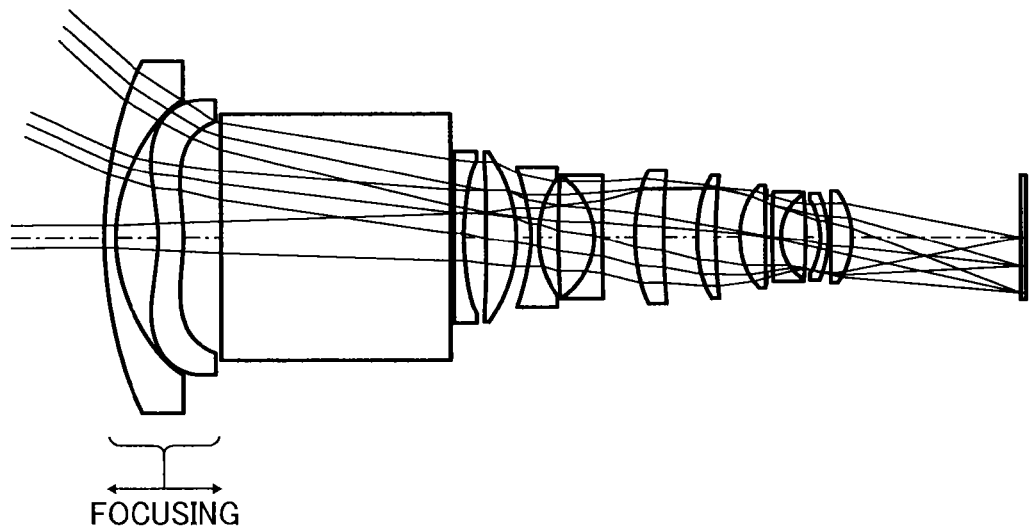
Figure 16C:
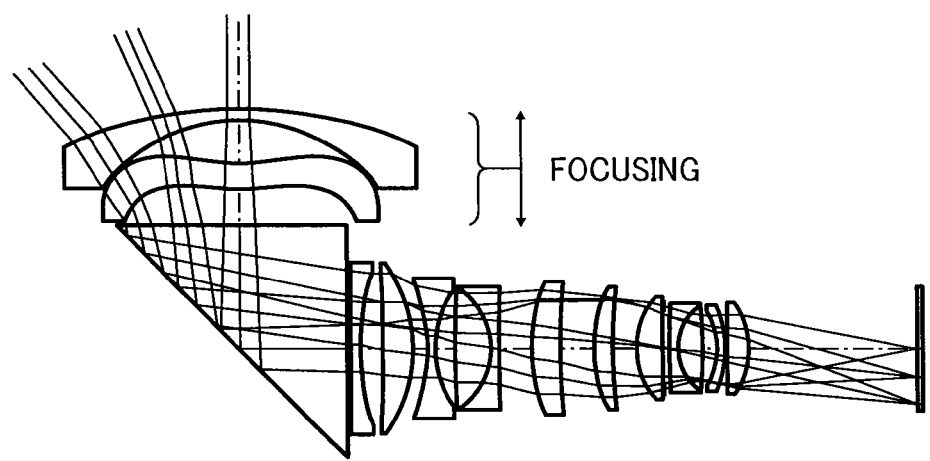

The projection lens PL according to Example 8 is as illustrated in FIGS. 16A through 16C.

A first lens group G1 includes a lens L101 through a lens L103, and a reflector Ref. A second lens group G2 includes lenses L201 through L204. A third lens group G3 includes a lens L301. A fourth lens group G4 includes a lens L401 and a lens L402. A fifth lens group G5 includes a lens L501 through a lens L504.

An aperture stop STOP is disposed between the fourth lens group G4 and the fifth lens group G5.

In the projection lens PL according to Example 8, the lens L101 and the lens L102 as the moving group within the first lens group G1 simultaneously moves along the direction of the optical axis to perform focusing.

The first lens group G1 is a negative group including a negative meniscus lens L101, a meniscus lens L102, a reflector Ref. and a negative meniscus lens L103.

The second lens group G2 is a negative group including a positive meniscus lens L201, a negative lens L202, a positive lens L203, and a negative lens L204. In this case, the lens L203 and the lens L204 are cemented to each other.

The third lens group G3 is a positive group, including one positive meniscus lens L301.

The fourth lens group G4 is a positive group, including a positive meniscus lens L401 and a positive lens L402.

The fifth lens group G5 is a negative group including a negative meniscus lens L501, a positive lens L502, a negative meniscus lens L503, and a positive meniscus lens L504. In this case, the lens L501 and the lens L502 are cemented to each other.

Among the first lens group G1 through the fifth lens group G5, the first lens group G1 has the greatest thickness in the direction of the optical axis, as is clear from FIG. 16A.

In Example 8, the focal length of the entire system, the range of F, F-number, and a half angle of view (ω) are as follows:

F is 12.8 through 16.5 mm, Fno is 2.56 through 3.35, and ω is 42.4° through 35.5°. Table 29 shows data regarding the projection lens PL in Example 8 below.

TABLE 29

| S | R | D | Nd | vd | Lens | Group | |
|---|---|---|---|---|---|---|---|
| 0 | — | D0 | | | | | |
| 1 | 87.313 | 2.30 | 1.80400 | 46.6 | L101 | G1-1 | G1 |
| 2 | 34.946 | 9.00 | | | | | |
| 3* | −30.796 | 4.97 | 1.53111 | 56.0 | L102 | | |
| 4* | −45.730 | 7.72 | | | | | |
| 5 | INF | 0.0 | | | | | |
| 6 | INF | 46.00 | 1.51680 | 64.2 | PZ | | |
| 7 | INF | 0.30 | | | | | |
| 8 | 446.731 | 2.00 | 1.84666 | 23.8 | L103 | G1-2 | |
| 9 | 42.123 | D9 | | | | | |
| 10 | −482.956 | 6.36 | 1.80610 | 40.9 | L201 | G2 | |
| 11 | −29.627 | 2.84 | | | | | |
| 12 | −35.487 | 1.50 | 1.43875 | 94.9 | L202 | | |
| 13 | 20.948 | 3.94 | | | | | |
| 14 | 143.037 | 7.27 | 1.64769 | 33.8 | L203 | | |
| 15 | −16.169 | 1.80 | 1.77250 | 49.6 | L204 | | |
| 16 | 612.359 | D16 | | | | | |
| 17 | 36.151 | 6.00 | 1.72000 | 46.0 | L301 | G3 | |
| 18 | 97.309 | S18 | | | | | |

TABLE 29-continued

| S | R | D | Nd | vd | Lens | Group |
|---|---|---|---|---|---|---|
| 19 | 29.484 | 3.73 | 1.69700 | 48.5 | L401 | G4 |
| 20 | 87.998 | 4.78 | | | | |
| 21 | 17.278 | 5.29 | 1.49700 | 81.5 | L402 | |
| 22 | −298.945 | 0.30 | | | | |
| 23 | INF | D23 | | | | |
| 24 | 112.122 | 1.50 | 1.83400 | 37.3 | L501 | G5 |
| 25 | 9.988 | 5.54 | 1.48749 | 70.4 | L502 | |
| 26 | −113.311 | 3.05 | | | | |
| 27 | −13.173 | 1.60 | 1.80000 | 29.8 | L503 | |
| 28 | −21.874 | 0.30 | | | | |
| 29* | −292.846 | 4.37 | 1.48749 | 70.4 | L504 | |
| 30* | −16.774 | D30 | | | | |
| 31 | INF | 1.0 | 1.51680 | 64.2 | CG | |
| 32 | INF | — | | | | |

[Data Regarding Aspherical Surface]

Table 30 shows data regarding aspherical surfaces below.

TABLE 30

| | 3 | 4 | 29 | 30 |
|---|---|---|---|---|
| k | 0 | 0 | 0 | 0 |
| C4 | 7.71463E−05 | 6.27771E−05 | 9.12044E−07 | 1.71924E−05 |
| C6 | −1.79058E−07 | −9.06057E−08 | 5.93077E−08 | 4.85520E−08 |
| C8 | 2.66269E−10 | −1.20256E−10 | 1.81951E−09 | 9.31880E−10 |
| C10 | 2.73554E−14 | 6.07468E−13 | −1.54158E−12 | 4.09439E−12 |
| C12 | −4.96654E−16 | 9.42548E−16 | 0.00000E+00 | 0.00000E+00 |
| C14 | 4.47504E−19 | −5.03098E−18 | 0.00000E+00 | 0.00000E+00 |
| C16 | −7.19761E−23 | 4.67687E−21 | 0.00000E+00 | 0.00000E+00 |

In Table 29, surface distances D9, D16, D18, D23, and D30 vary depending on the position of focusing, such as the wide angle end, the intermediate focal length, and the telephoto end, with an objection distance of 1600 mm (=D0). At least one lens of the first lens group (G1-1) moves along a direction of an optical axis to perform focusing. Table 31 shows the detailed data.

TABLE 31

| | D9 | D16 | D18 | D23 | D30 |
|---|---|---|---|---|---|
| Wide angle end | 4.72 | 6.28 | 6.70 | 0.89 | 33.60 |
| Intermediate | 5.04 | 3.44 | 5.91 | 1.30 | 36.51 |
| Telephoto end | 5.24 | 1.09 | 3.75 | 1.76 | 40.35 |

[Values of Parameters of Conditional Formulas]

Table 32 below shows values of parameters in conditional formulas (1') through (4').

TABLE 32

| Parameters | | Numerical Values |
|---|---|---|
| F1 | | −18.4 |
| F2 | | −109.5 |
| F3 | | 76.4 |
| F4 | | 23.5 |
| F5 | | −112.2 |
| F1-1 | | −53.7 |
| F1-2 | | −54.6 |
| Bf | | 33.6 |
| (1') | F1/F2 | 0.17 |
| (2') | F3/F4 | 3.25 |
| (3') | f5/Bf | −3.34 |
| (4') | F1-1/F1-2 | 0.98 |

FIGS. 17A through 17C are diagrams of aberration of the projection lens PL in Example 8, as in FIGS. 15A through 15C.

Example 9

Figure 18A:
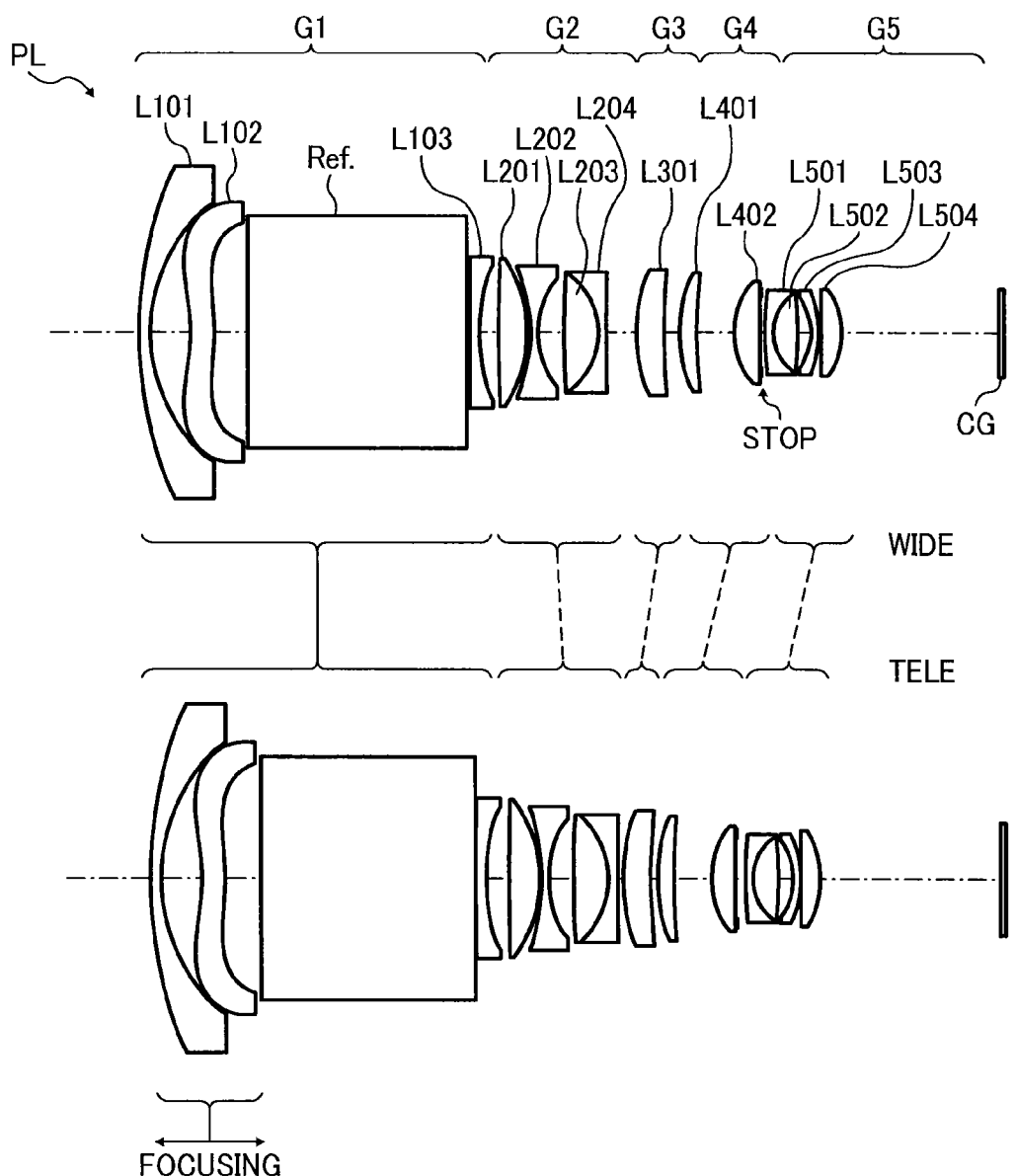
FIGS. 18A through 18C are views of a configuration, movement of changing magnification, and focusing movement of a projection lens according to Example 9.
Figure 18B:
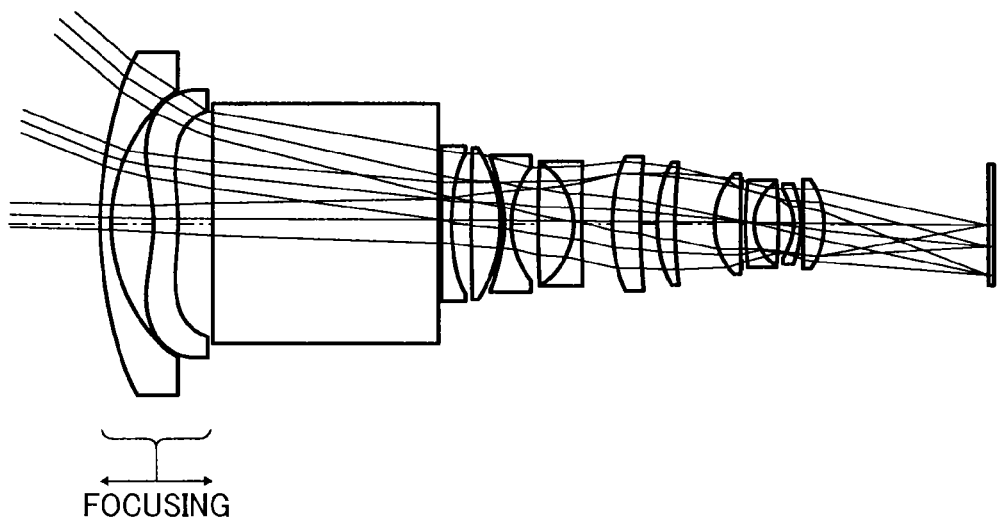
Figure 18C:
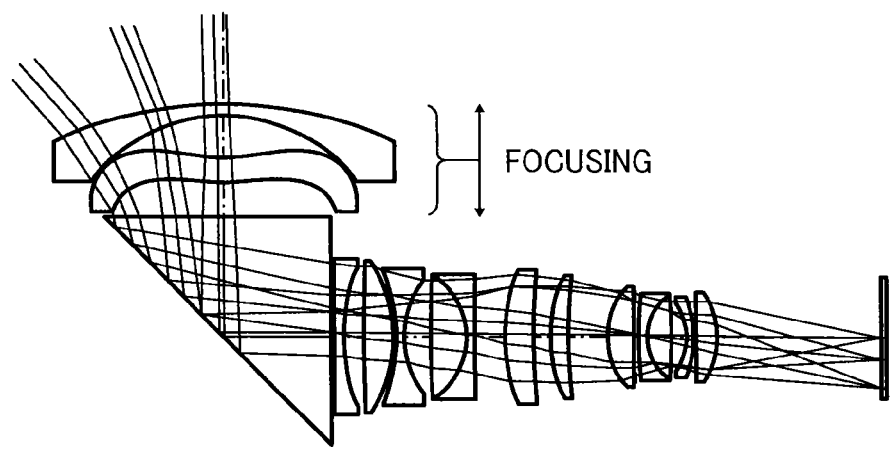

The projection lens PL according to Example 9 is as illustrated in FIGS. 18A through 18C.

As illustrated in FIG. 18A, a first lens group G1 includes a lens L101 through a lens L103, and a reflector Ref. A second lens group G2 includes lenses L201 through L204. A third lens group G3 includes a lens L301. A fourth lens group G4 includes a lens L401 and a lens L402. A fifth lens group G5 includes a lens L501 through a lens L504.

An aperture stop STOP is disposed between the fourth lens group G4 and the fifth lens group G5.

In the projection lens PL according to Example 9, the lens L101 and the lens L102 within the first lens group G1 simultaneously moves as the moving group along the direction of the optical axis to perform focusing.

The first lens group G1 is a negative group including a negative meniscus lens L101, a meniscus lens L102, a reflector Ref. and a negative meniscus lens L103.

The second lens group G2 is a negative group including a positive lens L201, a negative lens L202, a positive lens L203, and a negative lens L204. In this case, the lens L203 and the lens L204 are cemented to each other.

The third lens group G3 is a positive group, including one positive meniscus lens L301.

The fourth lens group G4 is a positive group, including a positive meniscus lens L401 and a positive lens L402.

The fifth lens group G5 is a negative group including a negative meniscus lens L501, a positive lens L502, a negative meniscus lens L503, and a positive meniscus lens L504. In this case, the lens L501 and the lens L502 are cemented to each other.

Among the first lens group G1 through the fifth lens group G5, the first lens group G1 has the greatest thickness in the direction of the optical axis, as is clear from FIG. 18A.

In Example 9, the focal length of the entire system, the range of F, F-number, and a half angle of view (ω) are as follows:

F is 13.0 through 15.8 mm, Fno is 2.56 through 3.34, and ω is 42.1° through 36.6°. Table 33 shows data regarding Example 9 below.

TABLE 33

| S | R | D | Nd | vd | Lens | Group | |
|---|---|---|---|---|---|---|---|
| 0 | — | D0 | | | | | |
| 1 | 84.168 | 2.30 | 1.77250 | 49.6 | L101 | G1-1 | G1 |
| 2 | 34.808 | 9.00 | | | | | |
| 3* | −30.286 | 4.87 | 1.53111 | 56.0 | L102 | | |
| 4* | −44.666 | 7.18 | | | | | |
| 5 | INF | 0.0 | | | | | |
| 6 | INF | 47.00 | 1.51680 | 64.2 | PZ | | |
| 7 | INF | 0.30 | | | | | |
| 8 | 2954.025 | 2.00 | 1.84666 | 23.8 | L103 | G1-2 | |
| 9 | 38.195 | D9 | | | | | |
| 10 | 624.572 | 6.42 | 1.80610 | 40.9 | L201 | G2 | |
| 11 | −28.587 | 0.31 | | | | | |
| 12 | −41.100 | 1.50 | 1.43875 | 94.9 | L202 | | |
| 13 | 19.561 | 5.41 | | | | | |
| 14 | 195.115 | 7.46 | 1.64769 | 33.8 | L203 | | |
| 15 | −16.305 | 1.80 | 1.77250 | 49.6 | L204 | | |
| 16 | 811.486 | D16 | | | | | |
| 17 | 34.101 | 6.00 | 1.72000 | 46.0 | L301 | G3 | |
| 18 | 95.121 | D18 | | | | | |
| 19 | 36.482 | 3.35 | 1.74320 | 49.3 | L401 | G4 | |

TABLE 33-continued

| S | R | D | Nd | vd | Lens | Group |
|---|---|---|---|---|---|---|
| 20 | 96.320 | 8.34 | | | | |
| 21 | 16.493 | 5.30 | 1.49700 | 81.5 | L402 | |
| 22 | −501.786 | 0.30 | | | | |
| 23 | INF | D23 | | | | |
| 24 | 82.180 | 1.50 | 1.83400 | 37.3 | L501 | G5 |
| 25 | 9.857 | 5.47 | 1.48749 | 70.4 | L502 | |
| 26 | −166.384 | 3.27 | | | | |
| 27 | −12.448 | 1.60 | 1.80000 | 29.8 | L503 | |
| 28 | −19.846 | 0.30 | | | | |
| 29* | −192.595 | 4.45 | 1.48749 | 70.4 | L504 | |
| 30* | −15.885 | D30 | | | | |
| 31 | INF | 1.00 | 1.51680 | 64.2 | CG | — |
| 32 | INF | — | | | | |

Table 34 shows data regarding the respective aspherical surfaces below.

TABLE 34

| | 3 | 4 | 29 | 30 |
|---|---|---|---|---|
| k | 0 | 0 | 0 | 0 |
| C4 | 7.7197E−05 | 6.3092E−05 | 3.5943E−06 | 1.9425E−05 |
| C6 | −1.7942E−07 | −9.2570E−08 | 3.3927E−08 | 5.0128E−08 |
| C8 | 2.6600E−10 | −1.2137E−10 | 1.4678E−09 | 6.5811E−10 |
| C10 | 2.7452E−14 | 6.0835E−13 | −3.5727E−12 | 1.7683E−12 |
| C12 | −4.9556E−16 | 9.5254E−16 | 0.0000E+00 | 0.0000E+00 |
| C14 | 4.4787E−19 | −5.0351E−18 | 0.0000E+00 | 0.0000E+00 |
| C16 | −7.4039E−23 | 4.6461E−21 | 0.0000E+00 | 0.0000E+00 |

In Table 33, surface distances D9, D16, D18, D23, and D30 vary depending on the position of focusing, such as the wide angle end, the intermediate focal length, and the telephoto end, with an objection distance of 1600 mm (=D0). At least one lens of the first lens group (G1-1) moves along a direction of an optical axis to perform focusing. Table 35 shows the detailed data.

TABLE 35

| | D9 | D16 | D18 | D23 | D30 |
|---|---|---|---|---|---|
| Wide angle end | 4.23 | 6.09 | 3.47 | 0.81 | 33.51 |
| Intermediate | 4.67 | 3.22 | 2.81 | 1.30 | 36.11 |
| Telephoto end | 4.97 | 1.18 | 1.52 | 1.75 | 38.70 |

[Values of Parameters of Conditional Formulas]

Table 36 below shows values of parameters in conditional formulas (1') through (4').

TABLE 36

| Parameters | | Numerical Values |
|---|---|---|
| F1 | | −16.7 |
| F2 | | −126.9 |
| F3 | | 70.6 |
| F4 | | 25.3 |
| F5 | | −160.6 |
| F1-1 | | −56.1 |
| F1-2 | | −45.3 |
| Bf | | 33.5 |
| (1') | F1/F2 | 0.13 |
| (2') | F3/F4 | 2.79 |
| (3') | F5/Bf | −4.79 |
| (4') | F1-1/F1-2 | 1.24 |

FIGS. 19A through 19C are diagrams of aberration of the projection lens PL in Example 9, as in FIGS. 15A through 15C.

Example 10

Figure 20A:
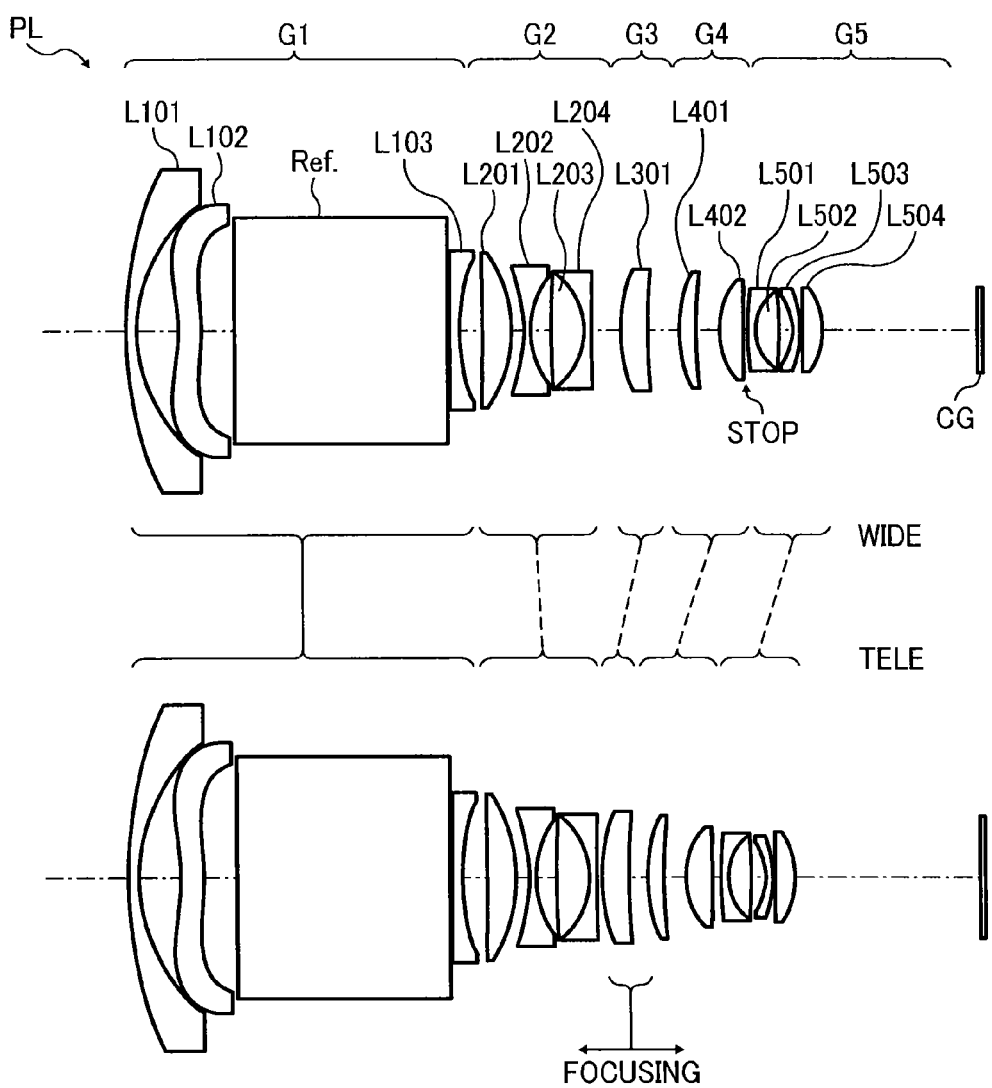
FIGS. 20A through 20C are views of a configuration, movement of changing magnification, and focusing movement of a projection lens according to Example 10.
Figure 20B:
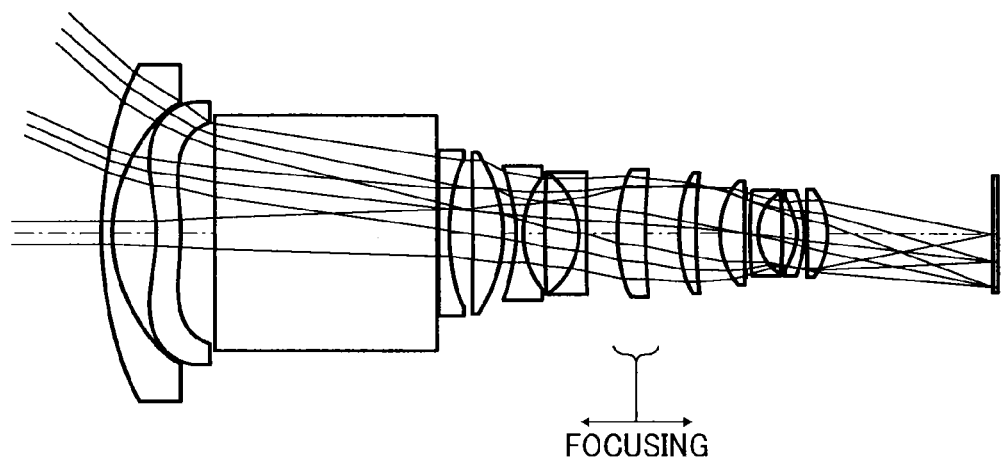
Figure 20C:
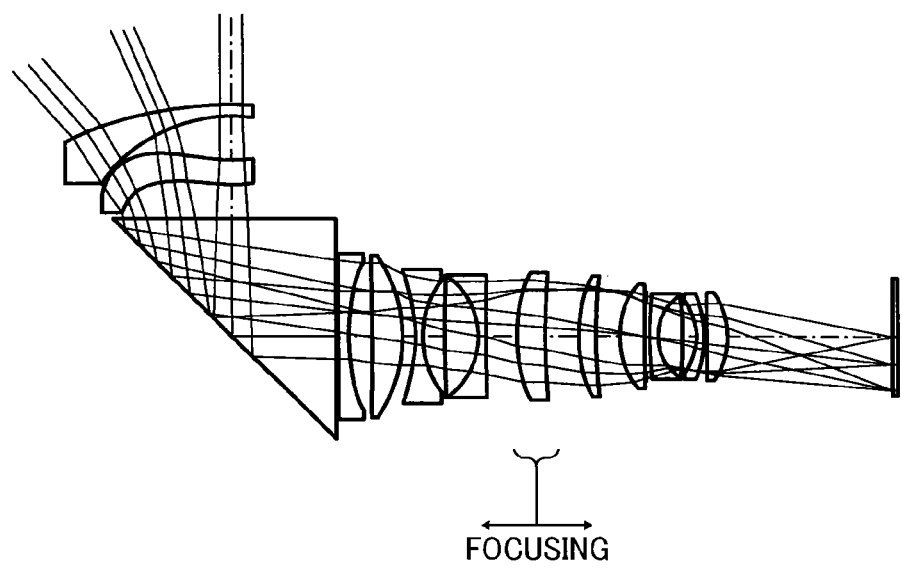

The projection lens PL according to Example 11 is as illustrated in FIGS. 20A through 20C.

A first lens group G1 includes a lens L101 through a lens L103, and a reflector Ref. A second lens group G2 includes lenses L201 through L204. A third lens group G3 includes a lens L301. A fourth lens group G4 includes a lens L401 and a lens L402. A fifth lens group G5 includes a lens L501 through a lens L504.

An aperture stop STOP is disposed between the fourth lens group G4 and the fifth lens group G5.

In the projection lens PL according to Example 10, the lens L301 that constitutes the third lens group G3 as the moving group moves along the direction of the optical axis to perform focusing.

It should be noted that, with oblique rays used as an image-forming rays, a configuration as illustrated in FIG. 20C is applicable that employs a first lens group G1 partially cut off. However, the projection lens PL according to the present disclosure is not limited to this configuration.

The first lens group G1 is a negative group including a negative meniscus lens L101, a meniscus lens L102, a reflector Ref. and a negative meniscus lens L103.

The second lens group G2 is a negative group including a positive meniscus lens L201, a negative lens L202, a positive lens L203, and a negative lens L204. In this case, the lens L203 and the lens L204 are cemented to each other.

The third lens group G3 is a positive group, including one positive meniscus lens L301.

The fourth lens group G4 is a positive group, including a positive meniscus lens L401 with a convex surface and a positive lens L402.

The fifth lens group G5 is a negative group including a negative meniscus lens L501, a positive lens L502, a negative meniscus lens L503, and a positive meniscus lens L504. In this case, the lens L501 and the lens L502 are cemented to each other.

Among the first lens group G1 through the fifth lens group G5, the first lens group G1 has the greatest thickness in the direction of the optical axis, as is clear from FIG. 20A.

In Example 10, the focal length of the entire system, the range of F, F-number, and a half angle of view (ω) are as follows:

F is 12.8 through 16.5 mm, Fno is 2.56 through 3.35, and ω is 42.4° through 35.5°. Table 37 shows data regarding the projection lens PL in Example 10 below.

TABLE 37

| S | R | D | Nd | vd | Lens | Group |
|---|---|---|---|---|---|---|
| 0 | — | D0 | | | | |
| 1 | 87.313 | 2.30 | 1.80400 | 46.6 | L101 | G1-1  G1 |
| 2 | 34.946 | 9.00 | | | | |
| 3* | −30.796 | 4.97 | 1.53111 | 56.0 | L102 | |
| 4* | −45.730 | 7.72 | | | | |
| 5 | INF | 0.0 | | | | |
| 6 | INF | 46.00 | 1.51680 | 64.2 | PZ | |
| 7 | INF | 0.30 | | | | |
| 8 | 446.731 | 2.00 | 1.84666 | 23.8 | L103 | G1-2 |
| 9 | 42.123 | D9 | | | | |
| 10 | −482.956 | 6.36 | 1.80610 | 40.9 | L201 | G2 |
| 11 | −29.627 | 2.84 | | | | |
| 12 | −35.487 | 1.50 | 1.43875 | 94.9 | L202 | |
| 13 | 20.948 | 3.94 | | | | |
| 14 | 143.037 | 7.27 | 1.64769 | 33.8 | L203 | |
| 15 | −16.169 | 1.80 | 1.77250 | 49.6 | L204 | |
| 16 | 612.359 | D16 | | | | |
| 17 | 36.151 | 6.00 | 1.72000 | 46.0 | L301 | G3 |
| 18 | 97.309 | S18 | | | | |
| 19 | 29.484 | 3.73 | 1.69700 | 48.5 | L401 | G4 |
| 20 | 87.998 | 4.78 | | | | |
| 21 | 17.278 | 5.29 | 1.49700 | 81.5 | L402 | |
| 22 | −298.945 | 0.30 | | | | |
| 23 | INF | D23 | | | | |
| 24 | 112.122 | 1.50 | 1.83400 | 37.3 | L501 | G5 |
| 25 | 9.988 | 5.54 | 1.48749 | 70.4 | L502 | |
| 26 | −113.311 | 3.05 | | | | |
| 27 | −13.173 | 1.60 | 1.80000 | 29.8 | L503 | |
| 28 | −21.874 | 0.30 | | | | |
| 29* | −292.846 | 4.37 | 1.48749 | 70.4 | L504 | |
| 30* | −16.774 | D30 | | | | |
| 31 | INF | 1.0 | 1.51680 | 64.2 | CG | — |
| 32 | INF | — | | | | |

Table 38 shows data regarding the respective aspherical surfaces below.

TABLE 38

| | 3 | 4 | 29 | 30 |
|---|---|---|---|---|
| k | 0 | 0 | 0 | 0 |
| C4 | 7.71463E−05 | 6.27771E−05 | 9.12044E−07 | 1.71924E−05 |
| C6 | −1.79058E−07 | −9.06057E−08 | 5.93077E−08 | 4.85520E−08 |
| C8 | 2.66269E−10 | −1.20256E−10 | 1.81951E−09 | 9.31880E−10 |
| C10 | 2.73554E−14 | 6.07468E−13 | −1.54158E−12 | 4.09439E−12 |
| C12 | −4.96654E−16 | 9.42548E−16 | 0.00000E+00 | 0.00000E+00 |
| C14 | 4.47504E−19 | −5.03098E−18 | 0.00000E+00 | 0.00000E+00 |
| C16 | −7.19761E−23 | 4.67687E−21 | 0.00000E+00 | 0.00000E+00 |

In Table 37, surface distances D9, D16, D18, D23, and D30 vary depending on the position of focusing, such as the wide angle end, the intermediate focal length, and the telephoto end, with an objection distance of 1600 mm (=D0). The third lens group G3 simultaneously moves as the moving group along the direction of the optical axis to perform focusing. Table 39 shows the detailed data.

TABLE 39

| | D9 | D16 | D18 | D23 | D30 |
|---|---|---|---|---|---|
| Wide angle end | 4.72 | 6.28 | 6.70 | 0.89 | 33.60 |
| Intermediate | 5.04 | 3.44 | 5.91 | 1.30 | 36.51 |
| Telephoto end | 5.24 | 1.09 | 3.75 | 1.76 | 40.35 |

[Values of Parameters of Conditional Formulas]

Table 16 below shows values of parameters in conditional formulas (1') through (3'). Conditional formula (4') does not apply to Example 4, in which the third lens group G3 moves as the moving group to achieve focusing.

TABLE 40

| Parameters | | Numerical Values |
|---|---|---|
| F1 | | −18.4 |
| F2 | | −109.5 |
| F3 | | 76.4 |
| F4 | | 23.5 |
| F5 | | −112.2 |
| F1-1 | | −53.7 |
| F1-2 | | −54.6 |
| Bf | | 33.6 |
| (1') | F1/F2 | 0.17 |
| (2') | F3/F4 | 3.25 |
| (3') | F5/Bf | −3.34 |

FIGS. 21A through 21C are diagrams of aberration of the projection lens PL in Example 10, as in FIGS. 15A through 15C.

As illustrated in the aberration diagrams of Examples, highly accurate correction is performed on various aberration, such as spherical aberration, astigmatism, field curvature, lateral chromatic aberration, and distortion in the projection lens PL according to each Example of the present disclosure.

As illustrated in FIGS. 15A through 15C, 17A through 17C, 19A through 19C, and 21A through 21C, the fluctuations in aberration due to changes in magnification is small over the entire range of magnification in the projection lens PL according to Examples 7 through 10.

With the configurations according to the embodiments of the present disclosure, the projection lens and the image display device are produced as follows.

—Aspect 1'—

A projection lens PL (Examples 7 through 10) is a projection optical system (M, CW, CL) of an image display device to enlarge and project an image displayed on a display surface of an image display element 3 onto a projection surface. The projection lens includes, in order from a magnification side to a reduction side, a first lens group G1 having a negative refractive power fixed while changing magnification from a wide angle end to a telephoto end; a second lens group G2 having a negative refractive power; a third lens group G3 having a positive refractive power; a fourth lens group G4 having a positive refractive power; and a fifth lens group G5 having a negative refractive power. The second lens group G2, the third lens group G3, the fourth lens group G4, and the fifth lens group G5 separately move to the reduction side or the magnification side while changing magnification from the wide angle end to the telephoto end.

—Aspect 2'—

In the projection lens PL (Examples 7 through 10) according to Aspect 1', with the first lens group G1 fixed, the second lens group G2 moves to the reduction side, and the third lens group G3, the fourth lens group G4, and the fifth lens group G5 move to the magnification side by different amounts of movement while changing magnification from the wide angle end to the telephoto end.

—Aspect 3'—

The projection lens PL (Examples 7 through 10) according to Aspect 1' or 2' further includes a reflector Ref. disposed between lenses within the first lens group G1, to bend an optical path.

—Aspect 4'—

In the projection lens PL (Examples 7 through 9) according to any one of Aspects 1' through 3', at least one lens (L101, L102) of the first lens group G1 moves along the direction of the optical axis to perform focusing.

—Aspect 5'—

In the projection lens PL (Examples 7 through 9) according to Aspect 4', conditional formula (4'):

$$0.1<f1\text{-}1/f1\text{-}2<2.0,$$

where f1-1 is the focal length of lenses L101 and L102 that moves while focusing, and f1-2 is the focal length of a lens L103 that is fixed while focusing.

—Aspect 6'—

In the projection lens PL (Example 10) according to any one of Aspects 1' through 3', the third lens group G3 (the lens L301) moves along the direction of the optical axis to perform focusing.

—Aspect 7'—

In the projection lens PL (Examples 7 through 10) according to any one of Aspects 1' through 6', conditional formula (1') below is satisfied:

$$0.1<F1/F2<50.0, \tag{1'}$$

where F1 is the focal length of the first lens group G1, and F2 is the focal length of the second lens group G2.

—Aspect 8'—

In the projection lens PL (Examples 7 through 10) according to any one of Aspects 1' through 7', conditional formula (2') is satisfied:

$$2.0<F3/F4<4.0, \tag{2'}$$

where F3 is the focal length of the third lens group G3; and F4 is the focal length of the fourth lens group G4.

—Aspect 9'—

In the projection lens PL (Examples 7 through 10) according to any one of Aspects 1' through 8', conditional formula (3') below is satisfied:

$$-9.5<F5/Bf<-3.5, \tag{3'}$$

Where F5 is the focal length of the fifth lens group G5, and Bf is the back focus at the wide angle end.

—Aspect 10'—

An image display device (FIGS. 13A and 13B) includes a light source to emit light rays; an image display element having a display surface to be displayed with an image to be projected; an illumination optical system to illuminate the display surface of the image display element with the light rays emitted from the light source; and a projection optical system to receive, from the illumination optical system, a projection light rays modulated by the image displayed on the display surface, to enlarge and project the image onto a projection surface. The projection optical system is the projection lens PL according to Aspects 1' through 9'.

Although the embodiments of the present disclosure have been described above, the present disclosure is not limited to the embodiments described above, and a variety of modifications can naturally be made within the scope of the present disclosure.

In view of the permissible ranges for a reduction in chromatic aberration and manufacturing error in projection lenses, the use of a cemented lens is preferable. In Examples 7 through 10, each of the second lens group G2 and the fifth lens group G5 includes a cemented lens, in which two lenses are cemented to each other.

However, the projection lens according to the Examples of the present disclosure is not limited to such configuration.

In the projection lens PL according to the embodiments and Examples, the first lens group G1 includes a right-angle prism as the reflector Ref. to bend the optical paths.

However, the present disclosure is not limited to this configuration. A configuration without the reflector Ref. (the right-angle prism) in the first lens group G1 is also applicable. Alternatively, instead of the reflector Ref. in FIGS. 14A through 14C, 16A through 16C, 18A through 18C, and 20A through 20C, a transparent block may be employed. Such configuration reduces the actual length in the optical path from the lens L102 to the lens L103 in the first lens group G1, thus reducing the size in the projection lens PL.

A description is provided of embodiments below.

Each of FIGS. 22A through 22C, FIGS. 24A through 24C, FIGS. 26A through 26C, and FIGS. 28A through 28C is a view of a projection lens according to a corresponding embodiment.

The projection lenses PL of FIGS. 22A through 22C, FIGS. 24A through 24C, FIGS. 26A through 26C, and FIGS. 28A through 28C correspond to Example 22, Example 24, Example 26, and Example 28, respectively.

The same reference signs are given to corresponding elements in FIG. 22A, FIG. 24A, FIG. 26A, and FIG. 28A to facilitate understanding of elements.

In each of FIG. 22A, FIG. 24A, FIG. 26A, and FIG. 28A, reference sign "G1" denotes a first lens group, and reference sign "G2" denotes a second lens group. Reference sign "G3" denotes a third lens group, and reference sign "G4" denotes a fourth lens group. Reference sign "G5" denotes a fifth lens group. Reference sign "Ref." denotes a reflector.

Each of FIGS. 22A through 22C, 24A through 24C, 26A through 26C, and 28A through 28C includes four types of arrangement of the projection lens PL according to Examples 11 through 14. Each of FIGS. 22A and 22B, 24A and 24B, 26A and 26B, and 28A and 28B illustrates a projection lens PL with the optical axis linearly elongated from the first lens group G1 to the fifth lens group G5. Each of FIGS. 22A, 24A, 26A, and 28A illustrates displacement of the second lens group G2 through the fifth lens group G5 when changing magnification from the wide angle end to the telephoto end. The letters "WIDE" representing the wide angle end and "TELE" representing the telephoto end are indicated in the figures listed above.

In FIGS. 22A through 22C, 24A through 24C, 26A through 26C, and 28A through 28C, the left side is the magnification side, and the right side is the reduction side.

As illustrated in the Figures listed above, the second lens group G2 moves toward the reduction side, and the third lens group G3, the fourth lens group G4, and the fifth lens group G5 move toward the magnification side when changing magnification from the wide angle end to the telephoto end. In this case, the amount of movement differs from each other among the second lens group G2, the third lens group G3, the fourth lens group G4, and the fifth lens group G5.

Each of FIGS. 22A through 22C, 24A through 24C, 26A through 26C, and 28A through 28C indicates the letters "FOCUSING" that represents movement for focusing of a moving lens group, with arrow indicating the directions of the movement for focusing. Each of FIGS. 22C, 24C, 26C, and 28C illustrates movement of focusing of a moving lens group with the optical paths bent by the reflector Ref.

Each of FIGS. 22B and 22C, 24B and 24C, 26B and 26C, and 28B and 28C illustrates the optical path of light rays passing through the optical system.

In each of the figures listed above, the projection lens PL according to an embodiment of the present disclosure includes, in the order from the magnification side to the reduction side, the first lens group G1, the second lens group G2, the third lens group G3, the fourth lens group G4, and the fifth lens group G5. The reflector Ref. is disposed between lenses within the first lens group G1. In the projection lens PL according to an embodiment of the present disclosure, the reflector Ref. is, but not limited to, a right-angle prism.

The reflector Ref. is disposed between lenses within the first lens group G1, which means that the reflector Ref. is not disposed on the most-magnification side in the first lens group G1.

The first lens group has a greater thickness in the direction of the optical axis than those of the second lens group G2 through the fifth lens group G5. That is, the first lens group G1 has the greatest thickness in the direction of the optical axis among the first lens group G1 through the fifth lens group G5.

In the figures listed above, an aperture stop STOP is disposed between the fourth lens group G4 and the fifth lens group G5. An image display element 3, such as a light valve, is disposed on the reduction side of the fifth lens group G5, including a cover glass CG to protect a display surface of the image display element 3.

In the projection lens PL according to an embodiment of the present disclosure, the examples of the light valve include, but not limited to, a micro mirror device (DMD). Instead of the DMD, a reflective or transmissive liquid crystal panel may be employed.

In the projection lens PL according to an embodiment of the present disclosure as illustrated in each figure, the first lens group G1 has a negative refractive power, and the second lens group G2 has a negative refractive power. The third lens group G3 has a positive refractive power, and the fourth lens group G4 has a positive refractive power. The fifth lens group G5 has a negative refractive power.

Accordingly, the projection lens PL according to an embodiment of the present disclosure has a positive refractive power, a negative refractive power, a positive refractive power, a positive refractive power, and a negative refractive power in this recited order from the magnification side to the reduction side.

With the lens group G2 having a negative refractive power disposed close to the magnification side, the height of a chief ray decreases, thereby reducing the effective diameters of the lenses, which results in a reduction in size of the projection lens PL.

Further, as illustrated in the embodiments corresponding to the figures listed above, the reflector Ref., which is disposed between lenses within the first lens group G1, bends the optical paths, thereby reducing the visual thickness of the projection lens PL according to the embodiments of the present disclosure.

The projection lens PL according to the embodiments of the present disclosure adopts a method that moves at least one lens of the first lens group G1 along the direction of the optical axis, or a method that moves at least one lens of the second lens group G2 or the third lens group G3 along the direction of the optical axis.

In the method that moves at least one lens of the first lens group G1 along the direction of the optical axis to achieve focusing, at least one lens of the first lens group G1 moves with the remaining lenses fixed. In the former method, within the first lens group G1, the lenses that move while focusing are referred to as a moving group, and the remaining lenses, which are fixed while focusing, are referred to as a "fixed group".

In the latter method, within the second lens group G2, at least one lens that moves while focusing is referred to as a moving group, and the lenses, which are fixed while focusing, are referred to as a fixed group.

The moving group is a moving lens group while focusing.

In the method that moves the third lens group G3 along the direction of the optical axis to achieve focusing, the third lens group G3 is the moving group.

The focusing method that moves at least one lens of the first lens group G1 as a "moving group" reduces the fluctuations in ray aberration, further reducing the amount of movement of the moving group to achieve focusing. Increasing the refractive power of the moving group increases angles of view effectively, which further increases an optical performance of the projection lens PL according to the present disclosure.

The method that moves at least one lens of the second lens group G2 or the third lens group G3 to achieve focusing is an inner focus method.

Both of the methods described above reduce fluctuations in the optical performance with changes in projection distance while changing magnification.

It should be noted that the focusing method is not limited to the above-described methods. Optionally, a method that moves the entirety of the first lens group G1, or the entire extending system that move the entire lens may be employed.

Preferably, the projection lens PL according to the embodiments of the present disclosure satisfies any one of conditional formulas (1") through (3") below:

$$4.0<|F1/F2|<50.0; \quad (1")$$

$$2.0<F3/F4<4.0; \text{ and} \quad (2")$$

$$-11.0<F5/Bf<-5.0. \quad (3")$$

In the respective conditional formulas (1"), (2"), and (3"), symbols in parameters denote as follows:

F1: the focal length (>0) of the first lens group G1;
F2: the focal length (<0) of the second lens group G2; and
F3: the focal length (>0) of the third lens group G3;
F4: the focal length (>0) of the fourth lens group G4;
F5: the focal length (<0) of the fifth lens group G5; and
Bf: the back focus at the wide angle end (>0 the distance from the most-reduction-side surface of the fifth lens group G5 to the display surface of the image display element 3).

In the method that moves the moving group of the first lens group G1 along the direction of the optical axis, it is preferable to satisfy conditional formula (4") alone or in combination with any one or more of conditional formulas (1"), (2"), and (3").

$$0.1<|f1-1/f1-2|<2.0. \quad (4")$$

In conditional formula (4"), symbols in parameters denote as follows:

f1-1: the focal length of the moving group in the first lens group G1; and f1-2: the focal length of the fixed group in the first lens group G1.

Conditional formula (1") defines an appropriate range of the ratio of the focal length F1 of the first lens group G1 to the focal length F2 of the second lens group G2.

Decreasing (increasing) the parameter of |F1/F2| in conditional formula (1") means that the negative refractive power of the first lens group G1 increases (decreases) relative to the negative refractive power of the second lens group G2.

With the parameter of |F1/F2| not greater than the lower limit defined by conditional formula (1"), the positive refractive power of the first lens group G1 excessively increases relative to the negative refractive power of the second lens group G2, thereby easily generating a great amount of astigmatism, narrowing the angle of view of the projection lens PL.

With the parameter of |F1/F2| greater than or equal to the upper limit defined by conditional formula (1"), the positive refractive power of the first lens group G1 becomes insufficient relative to the negative refractive power of the second lens group G2. This increases the size of the lenses on the magnification side in the first lens group G1, leading to an increase in the size of the projection lens PL according to the embodiments of the present disclosure.

Satisfying conditional formula (1") easily achieves a reduction in size of projection lens, favorably maintaining astigmatism.

When projecting an image onto a screen S, projection light rays output from the light valve are guided from the fifth lens group G5 to the first lens group G1. In this case, the first lens group G1 having a positive refractive power decreases the divergence angles of divergent rays having passed through the second lens group G2 having a negative refractive power.

With conditional formula (1") satisfied, a good balance is made between the positive refractive power of the first lens group G1 and the negative refractive power of the second lens group G2, thereby advantageously canceling a negative distortion generated by the divergent angles of the light rays passing through the second lens group G2, by a positive distortion generated by the positive refractive power of the first lens group G1.

Accordingly, distortion is favorably corrected in the projection lens PL according to the embodiments of the present disclosure.

Conditional formula (2") defines the range to favorably distribute the positive refractive power between the third lens group G3 and the fourth lens group G4 that move while focusing.

With the parameter of F3/F4 not greater than the lower limit defined by conditional formula (2"), the positive refractive power of the third lens group G3 excessively increases relative to the positive refractive power of the fourth lens group G4, thereby hampering action of the negative refractive power of the second lens group G2. As a result, a great amount of field curvature occurs over the entire magnification range.

With the parameter of F3/F4 greater than or equal to the upper limit defined by conditional formula (2"), the positive refractive power of the third lens group G3 becomes insufficient relative to the positive refractive power of the fourth lens group G4. As a result, a great amount of field curvature easily occurs in the telephoto end side, in which the third lens group G3 approaches the second lens group G2.

Conditional formula (3") defines the range to reduce coma aberration.

Failing to satisfy conditional formula (3") excessively increases or excessively decreases the negative refractive power of the fifth lens group G5 that expands the incident angle of the light rays coming from the reduction side (the light valve side). This arrangement further excessively increases or excessively decreases the angles of the light rays advancing from the fourth lens group G4 toward the magnification side, resulting in an increase in coma aberration.

Conditional formula (4") defines the range to make a good balance in the refractive power between the moving group and fixed group in the first lens group G1.

Decreasing (increasing) the parameter of |f1-1/f1-2| in conditional formula (4") means that the refractive power of the moving group increases (decreases) relative to the refractive power of the fixed group.

With a decrease in parameter of |f1-1/f1-2| in conditional formula (4"), the refractive power of the moving group increases, thereby reducing the amount of movement of the moving group to achieve focusing.

With the parameter of |f1-1/f1-2| not greater than the lower limit defined by conditional formula (4"), the refractive power of the moving group excessively increases, resulting in a poor balance in the refractive power between the moving group and the fixed group. As a result, a great amount of spherical aberration easily occurs.

With the parameter of |f1-1/f1-2| greater than or equal to the upper limit defined by conditional formula (4"), the refractive power of the fixed group excessively increases, thereby easily generating a great amount of spherical aberration.

Satisfying conditional formula (4") achieves a favorable optical performance even with changes in size of the screen S, onto which an image is enlarged and projected.

As is clear from FIGS. 22A through 22C, FIGS. 24A through 24C, FIGS. 26A through 26C, and FIGS. 28A through 28C, in the projection lens PL according to the embodiment of the present disclosure, oblique rays are used as image-forming rays.

A brief description is provided of a projector 1 according to two embodiments of the present disclosure, referring to FIGS. 13A and 13B, before describing specific Examples of the projection lens according to the embodiments of the present disclosure. The same reference signs are given to corresponding elements, which are not likely to cause confusion, in FIGS. 13A and 13B to facilitate understanding of the elements.

In each of FIGS. 13A and 13B, the projector 1 includes a digital mirror device (DMD), which is a micro mirror device, as an image display element 3.

The projector 1 further includes an illumination optical system 2, the DMD 3 as the image display element 3, and a projection lens as a projection optical system 4 or 4A.

The projection lens 4 or 4A includes any one of the projection lenses according to Examples 11 through 14.

The illumination optical system 2 time-separates light rays into the three colors of red, green, and blue to illuminate the display surface of the DMD 3, thereby adjusting inclination of the micro mirrors corresponding to the respective pixels of the colors in response to the respective light rays in the DMD 3.

Then, an image to be projected is displayed on the DMD 3, and the light with a modulated intensity corresponding to the image is magnified by the projection lens 4 or 4A to be enlarged and projected onto a screen S as a projection surface.

The illumination optical system 2 includes a light source 21, a condenser lens CL, a red green blue (RGB) color wheel CW, and a mirror M.

To ensure a sufficient amount of space to include the light source 21, the condenser lens CL, the red green blue (RGB) color wheel CW, and the mirror M in the illumination optical system 2, the incident angle of the light rays emitted from the illumination optical system 2 to the DMD 3 is increased.

To keep such space between the projection lens 4 or 4A and the illumination optical system 2, there is a need for a certain degree of the back focus of the projection lens 4 or 4A to be secured.

Accordingly, a mirror M is employed to secure the incident angle of the light rays and the back focus.

It should be noted that the condenser lens CL, the RGB color wheel CW, and the mirror M constitute an illumination optical system 2 to illuminate the display surface of the image display element 3.

In the example of FIG. 13A, the projector 1 includes the projection lens 4 within the casing of the projector 1. In the example of FIG. 13B, a portion of the projection lens 4A is exposed to the outside of the casing of the projector 1. The portion includes the reflector Ref. and the first lens group disposed on the magnification side of the reflector Ref.

The configuration of FIG. 13B may be a configuration, in which the projection body is disposed with the bottom face vertical to the ground. Alternatively, a configuration, in which the projection direction is toward the ceiling side or the floor side, may be employed.

In Examples 11 and 12, at least one lens of the first lens group G1 moves as a moving group along the direction of the optical axis to perform focusing. In Example 13, at least one lens of the second lens group G2 moves as the moving group along the direction of the optical axis to perform focusing. In Example 14, the third lens group G3 moves as the moving group along the direction of the optical axis to perform focusing. In Examples 11 through 14, a sufficient amount of back focus is secured during changes in magnification.

EXAMPLES

A description is given of specific Examples 7 through 10 regarding a projection lens PL according to the present disclosure.

The meanings of symbols in Examples 1 through 6 are described below:

F: the focal length of the entire optical system;
Fno: numerical aperture (F-number);
R: the radius of curvature ("paraxial radius of curvature" for an aspherical surface);
D: The distance between surfaces (which is referred to also as surface distance);
Nd: refractive index;
vd: the Abbe number; and
BF: back focus.

Aspherical surface is expressed by the following formula:

$$X=(H^2/R)/[1+\{1-K(H/r)^2\}^{1/2}]+C4 \cdot H^4+C6 \cdot H^6+C8 \cdot H^8+C10 \cdot H^{10}+ \ldots$$

In the formula, X denotes a displacement along the direction of the optical axis at a position of a height H from the optical axis to the peak of a surface. K denotes a constant of the cone, and "C4, C6, C8, C10 . . . " refer to aspherical surface coefficients.

The unit of length (F, R, D, and Bf), which is a dimension, is mm unless otherwise mentioned, and the unit of angle is degree.

Example 11

Figure 22A:
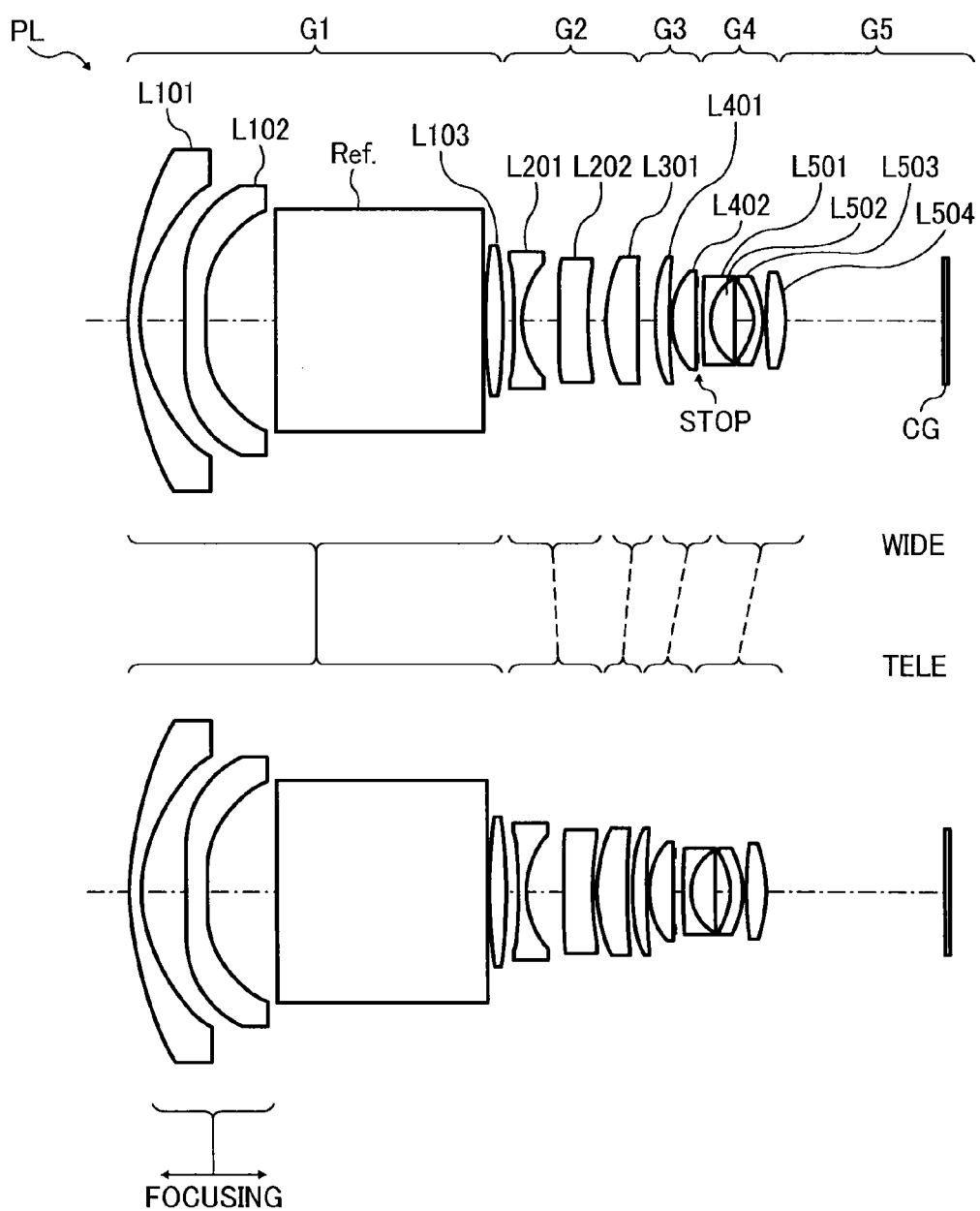
FIGS. 22A through 22C are views of a configuration, movement of changing magnification, and focusing movement of a projection lens according to Example 11.
Figure 22B:
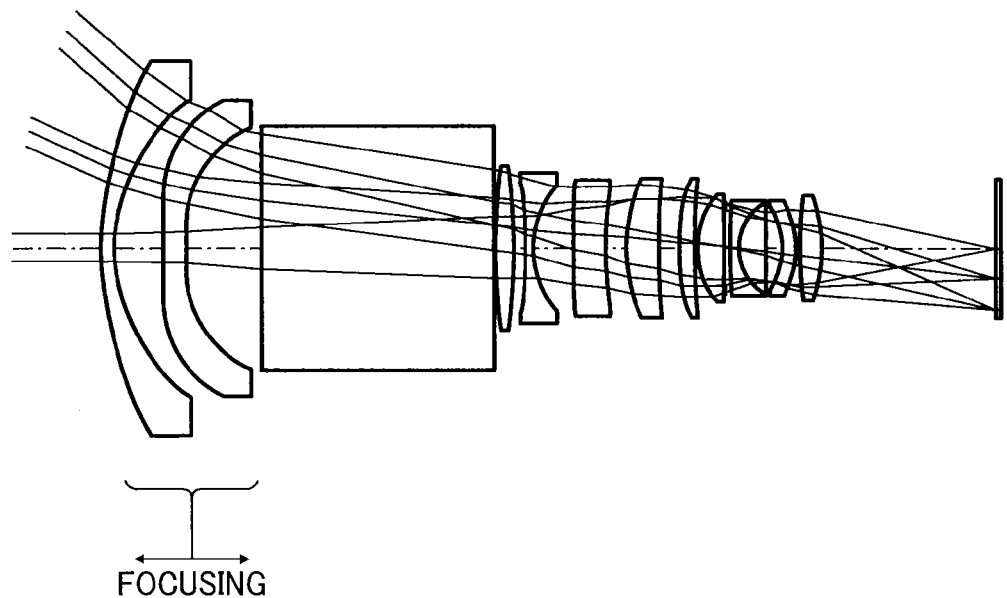
Figure 22C:
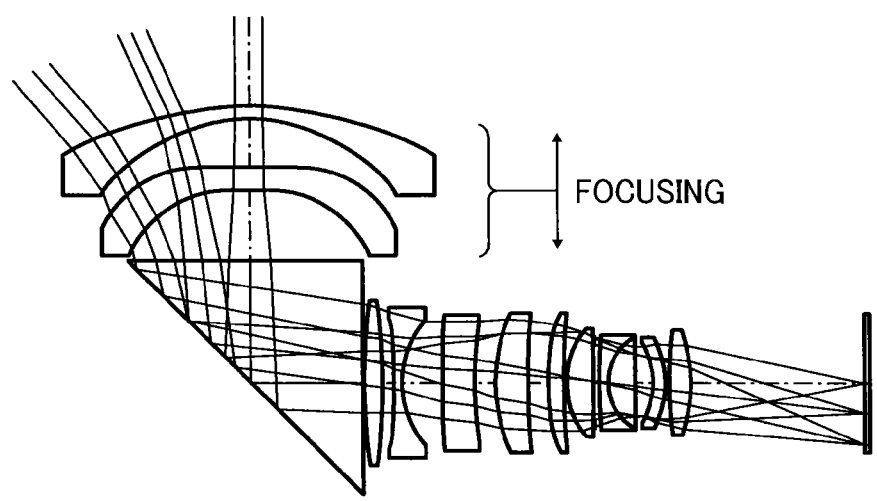

The projection lens PL according to Example 11 is as illustrated in FIGS. 22A through 22C.

As illustrated in FIG. 22A, a first lens group G1 includes a lens L101 through a lens L103, and a reflector Ref. A second lens group G2 includes a lens L201 through a lens L202. A third lens group G3 includes a lens L301. A fourth lens group G4 includes a lens L401 and a lens L402. A fifth lens group G5 includes a lens L501 through a lens L504.

As described above, a light valve is used as the DMD. A cover glass CG is disposed on the most-reduction side to cover the display surface of the DMD.

An aperture stop STOP is disposed between the fourth lens group G4 and the fifth lens group G5.

In the projections lens PL according to Example 11, the lens L101 and the lens L102 as the moving group within the first lens group G1 simultaneously moves along the direction of the optical axis to perform focusing.

The first lens group G1 is a positive group including the lenses L101, L102, and L103, and the reflector Ref.

The second lens group G2 is a negative group, including two lenses L201 and L202.

The third lens group G3 is a positive group, including one lens L301.

The fourth lens group G4 is a positive group, including two lenses L401 and L402.

The fifth lens group G5 is a negative group, including four lenses L501, L502, L503, and L504.

Among the first lens group G1 through the fifth lens group G5, the first lens group G1 has the greatest thickness in the direction of the optical axis, as is clear from FIG. 22A.

In Example 11, the focal length of the entire system, the range of F, F-number, and a half angle of view ($\omega$) are as follows:

F is 13.1 through 15.8 mm, Fno is 2.56 through 3.35, and $\omega$ is 42.0° through 36.7°. Table 41 shows data regarding the projection lens PL in Example 11 below.

TABLE 41

| S | R | D | Nd | vd | Lens | Group |
|---|---|---|----|----|------|-------|
| 0 | INF | D0 | | | | |
| 1 | 71.654 | 2.30 | 1.80400 | 46.6 | L101 | G1-1  G1 |
| 2 | 33.371 | 9.00 | | | | |
| 3* | −66.811 | 4.00 | 1.53111 | 56.0 | L102 | |
| 4* | 157.587 | 13.63 | | | | |
| 5 | INF | D5 | | | | |
| 6 | INF | 43.0 | 1.51680 | 64.2 | PZ | |
| 7 | INF | 0.48 | | | | |
| 8 | 140.647 | 3.32 | 1.84666 | 23.8 | L103 | G1-2 |
| 9 | −139.753 | D9 | | | | |
| 10 | −77.510 | 1.60 | 1.43875 | 94.9 | L201 | G2 |
| 11 | 17.613 | 7.38 | | | | |
| 12 | 421.247 | 5.62 | 1.78125 | 47.3 | L202 | |
| 13 | 64.368 | D13 | | | | |
| 14 | 30.382 | 6.00 | 1.72000 | 46.0 | L301 | G3 |
| 15 | 126.529 | D15 | | | | |
| 16 | 36.148 | 2.87 | 1.69700 | 48.5 | L401 | G4 |
| 17 | 87.275 | 0.40 | | | | |
| 18 | 15.197 | 5.16 | 1.49700 | 81.5 | L402 | |
| 19 | −206.418 | 0.30 | | | | |
| 20 | INF | D20 | | | | |
| 21 | 94.491 | 1.60 | 1.83400 | 37.3 | L501 | G5 |
| 22 | 9.395 | 4.99 | 1.48749 | 70.4 | L502 | |
| 23 | 930.351 | 3.25 | | | | |
| 24 | −11.887 | 2.34 | 1.80000 | 29.8 | L503 | |
| 25 | −15.483 | 0.63 | | | | |
| 26* | 89.410 | 3.75 | 1.48749 | 70.4 | L504 | |
| 27* | −25.352 | D27 | | | | |
| 28 | INF | 1.00 | 1.51680 | 64.2 | CG | |
| 29 | INF | — | | | | |

In Table 41, the symbol "S" (surface numbers) indicates the numbers of lens surfaces sequentially numbered from the magnification side. The surface of the aperture stop STOP, which is 20 in Table 41, is included in the surface numbers. The symbol "PZ" denotes a right-angle prism as the reflector Ref. The symbol "CG" denotes a cover glass of a light valve.

The symbol "INF" in Table 41 represents infinite radius of curvature. The mark "*" is indicated at surface numbers of "aspherical surfaces".

The same applies to Examples 12, 13, and 14.

[Data Regarding Aspherical Surface]

Table 42 shows data regarding aspherical surfaces below.

TABLE 42

| | 3 | 4 | 26 | 27 |
|---|---|---|----|----|
| k | 0 | 0 | 0 | 0 |
| C4 | 8.3734E−05 | 8.5222E−05 | 4.1993E−06 | 1.9827E−05 |
| C6 | −2.0112E−07 | −1.4552E−07 | −6.6870E−08 | −1.0811E−07 |
| C8 | 2.5696E−10 | −7.1500E−11 | 1.6644E−09 | 2.2224E−09 |
| C10 | 4.2186E−14 | 6.2871E−13 | −1.1364E−11 | −1.5761E−11 |
| C12 | −4.7473E−16 | 8.9440E−16 | 0.00000E+00 | 0.00000E+00 |
| C14 | 4.5023E−19 | −5.1031E−18 | 0.00000E+00 | 0.00000E+00 |
| C16 | −1.1939E−22 | 4.7520E−21 | 0.00000E+00 | 0.00000E+00 |

In Table 42, "4.7520E-21" represents "$4.7520 \times 10^{-21}$". The same applies to the following Examples.

In Table 41, surface distances D9, D13, D15, D20, and D27 vary depending on the position of focusing, such as the wide angle end, the intermediate focal length, and the telephoto end, with an objection distance of 1600 mm (=D0). Table 53 shows the detailed data.

TABLE 43

| | D9 | D13 | D15 | D20 | D27 |
|---|----|-----|-----|-----|-----|
| Wide angle end | 2.36 | 3.71 | 3.62 | 0.87 | 32.00 |
| Intermediate | 2.37 | 2.10 | 2.58 | 1.16 | 34.34 |
| Telephoto end | 2.70 | 0.97 | 0.80 | 1.42 | 36.67 |

In the projections lens according to Example 11, the lens L101 and the lens L102 (G1-1) within the first lens group G1 simultaneously moves as the moving group along the direction of the optical axis to perform focusing.

In Table 41, a surface distance D4 of 13.63 refers to the distance between the reduction-side surface of the lens L102 and the magnification-side surface of the right-angle prism PZ as the reflector Ref. while focusing is not performed. When focusing is performed, the distance between the reduction-side surface of the lens L102 and the magnification-side surface of the right-angle prism PZ varies. Table 41 indicates such variations in the distance between the reduction-side surface of the lens L102 and the magnification-side surface of the right-angle prism PZ, as "D5".

Table 44 shows the values of D5 with changes in size of screen at the wide angle end.

TABLE 44

| Screen Size | D5 |
|-------------|-----|
| 40 inch | 1.44 |
| 80 inch | 0.00 |
| 300 inch | −0.94 |

[Values of Parameters of Conditional Formulas]

Table 45 below shows values of parameters in conditional formulas (1") through (4").

TABLE 45

| Parameters | Numerical Values |
|------------|------------------|
| F1 | 224.1 |
| F2 | −22.4 |

TABLE 45-continued

| Parameters | | Numerical Values |
|---|---|---|
| F3 | | 53.9 |
| F4 | | 22.2 |
| F5 | | -200.2 |
| F1-1 | | -39.6 |
| F1-2 | | 75.6 |
| Bf | | 32.0 |
| (1") | \|F1/F2\| | 10.00 |
| (2") | F3/F4 | 2.43 |
| (3") | F5/Bf | -6.25 |
| (4") | F1-1/F1-2 | -0.52 |

FIGS. 23A through 23C are diagrams of aberration of the projection lens PL in Example 11.

FIG. 23A is a diagram of aberration with the projection lens PL focused on the wide angle end. FIG. 23B is a diagram of aberration with the intermediate focal length. FIG. 23C is a diagram of aberration with the projection lens PL focused on the telephoto end. FIG. 23D is a diagram of aberration with a size of the screen of 40 inch at the wide angle end. FIG. 23E is a diagram of aberration with a size of the screen of 80 inch. FIG. 23F is a diagram of aberration with a size of the screen of 300 inch.

FIGS. 23A, 23B, and 23C illustrate "SA" representing spherical aberration, "AS" representing astigmatism, and "Dist." representing distortion, respectively.

In the diagram of spherical aberration "SA", the symbols "R", "G", and "B" are denoted as the descriptions of a wavelength R of 625 nm, a wavelength G of 550 nm, and a wavelength B of 460 nm.

In the diagram of astigmatism "AS", the symbols "T" and "S" denote aberration with respect to the tangential direction and aberration with respect to the sagittal direction, respectively.

It should be noted that astigmatism and distortion are with respect to light rays having a wavelength of 550 nm.

As illustrated in FIG. 23, the fluctuation in aberration is small even with changes in magnification.

The same applies to Examples 12 through 14.

Example 12

Figure 24A:
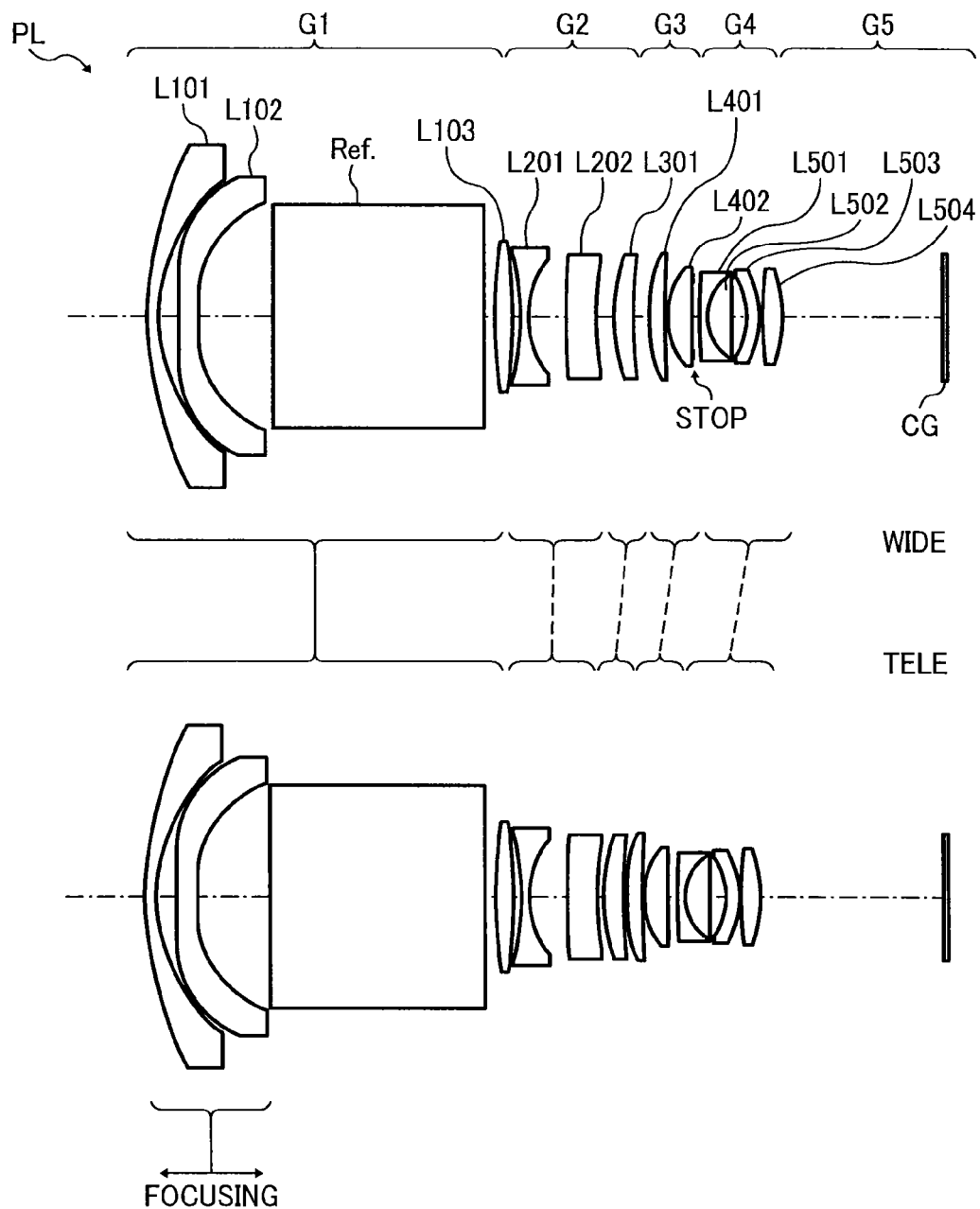
FIGS. 24A through 24C are views of a configuration, movement of changing magnification, and focusing movement of a projection lens according to Example 12.
Figure 24B:
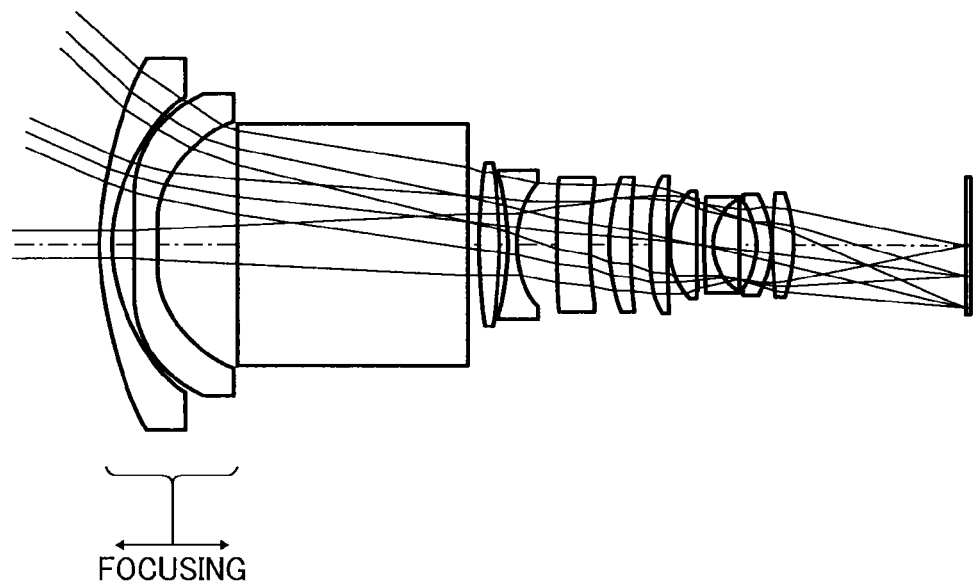
Figure 24C:
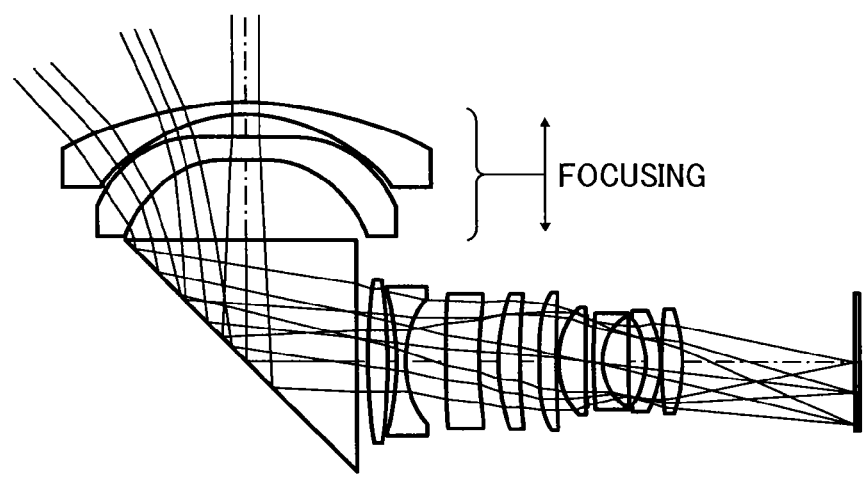

The projection lens PL according to Example 12 is as illustrated in FIGS. 24A through 24C.

A first lens group G1 includes a lens L101 through a lens L103, and a reflector Ref. A second lens group G2 includes a lens L201 through a lens L202. A third lens group G3 includes a lens L301. A fourth lens group G4 includes a lens L401 and a lens L402. A fifth lens group G5 includes a lens L501 through a lens L504.

An aperture stop STOP is disposed between the fourth lens group G4 and the fifth lens group G5.

In the projections lens according to Example 12, the lens L101 and the lens L102 within the first lens group G1 simultaneously moves as the moving group along the direction of the optical axis to perform focusing.

The first lens group G1 is a positive group including the lenses L101, L102, and L103, and the reflector Ref.

The second lens group G2 is a negative group, including two lenses L201 and L202.

The third lens group G3 is a positive group, including one lens L301.

The fourth lens group G4 is a positive group, including two lenses L401 and L402.

The fifth lens group G5 is a negative group, including four lenses L501, L502, L503, and L504.

Among the first lens group G1 through the fifth lens group G5, the first lens group G1 has the greatest thickness in the direction of the optical axis, as is clear from FIG. 24A.

In Example 12, the focal length of the entire system, the range of F, F-number, and a half angle of view ($\omega$) are as follows:

F is 13.0 through 15.8 mm, Fno is 2.56 through 3.35, and $\omega$ is 42.0° through 36.7°. Table 46 shows data regarding the projection lens PL in Example 12 below.

TABLE 46

| S | R | D | Nd | vd | Lens | Group |
|---|---|---|---|---|---|---|
| 0 | — | D0 | | | | |
| 1 | 70.431 | 2.30 | 1.80400 | 46.6 | L101 | G1-1 G1 |
| 2 | 32.999 | 4.00 | | | | |
| 3* | -76.034 | 4.00 | 1.53111 | 56.0 | L102 | |
| 4* | 114.794 | 15.10 | | | | |
| 5 | INF | D5 | | | | |
| 6 | INF | 43.00 | 1.51680 | 64.2 | PZ | |
| 7 | INF | 2.13 | | | | |
| 8 | 179.752 | 3.47 | 1.84666 | 23.8 | L103 | G1-2 |
| 9 | -91.418 | D9 | | | | |
| 10 | -48.291 | 1.60 | 1.43875 | 94.9 | L201 | G2 |
| 11 | 19.317 | 7.32 | | | | |
| 12 | 176.846 | 6.00 | 1.83400 | 37.3 | L202 | |
| 13 | 52.309 | D13 | | | | |
| 14 | 29.101 | 4.19 | 1.72000 | 46.0 | L301 | G3 |
| 15 | 84.911 | D15 | | | | |
| 16 | 36.651 | 3.17 | 1.69700 | 48.5 | L401 | G4 |
| 17 | 142.042 | 0.30 | | | | |
| 18 | 15.555 | 5.19 | 1.49700 | 81.5 | L402 | |
| 19 | -312.383 | 0.30 | | | | |
| 20 | INF | D20 | | | | |
| 21 | 102.077 | 1.60 | 1.83400 | 37.3 | L501 | G5 |
| 22 | 9.596 | 5.10 | 1.48749 | 70.4 | L502 | |
| 23 | -447.319 | 3.17 | | | | |
| 24 | -12.654 | 2.93 | 1.80000 | 29.8 | L503 | |
| 25 | -16.937 | 0.30 | | | | |
| 26* | 75.062 | 3.90 | 1.48749 | 70.4 | L504 | |
| 27* | -26.904 | D27 | | | | |
| 28 | INF | 1.0 | 1.51680 | 64.2 | CG | — |
| 29 | INF | — | | | | |

[Data Regarding Aspherical Surface]

Table 47 shows data regarding aspherical surfaces below.

TABLE 47

| | 3 | 4 | 26 | 27 |
|---|---|---|---|---|
| k | 0 | 0 | 0 | 0 |
| C4 | 8.41056E-05 | 8.77272E-05 | 9.25126E-07 | 1.68281E-05 |
| C6 | -2.00679E-07 | -1.48849E-07 | -1.02093E-07 | -1.55443E-07 |
| C8 | 2.56351E-10 | -6.34580E-11 | 1.51338E-09 | 2.03654E-09 |
| C10 | 4.33244E-14 | 6.43428E-13 | -7.91027E-12 | -1.20687E-11 |
| C12 | -4.72205E-16 | 8.98724E-16 | 0.00000E+00 | 0.00000E+00 |
| C14 | 4.51967E-19 | -5.13970E-18 | 0.00000E+00 | 0.00000E+00 |
| C16 | -1.23302E-22 | 4.79525E-21 | 0.00000E+00 | 0.00000E+00 |

In Table 45, surface distances D9, D13, D15, D20, and D27 vary depending on the position of focusing, such as the wide angle end, the intermediate focal length, and the telephoto end, with an objection distance of 1600 mm. Table 48 shows the detailed data.

TABLE 48

|  | D9 | D13 | D15 | D20 | D27 |
|---|---|---|---|---|---|
| Wide angle end | 1.53 | 3.53 | 3.65 | 0.90 | 32.00 |
| Intermediate | 1.50 | 2.08 | 2.53 | 1.18 | 34.32 |
| Telephoto end | 1.58 | 1.09 | 0.80 | 1.41 | 36.74 |

In the projections lens according to Example 12, the lens L101 and the lens L102 (G1-1) within the first lens group G1 simultaneously moves as the moving group along the direction of the optical axis to perform focusing.

Table 49 shows the values of D5 with changes in size of screen at the wide angle end, as in Table 44.

TABLE 49

| Screen Size | D5 |
|---|---|
| 40 inch | 1.47 |
| 80 inch | 0.00 |
| 300 inch | −1.01 |

[Values of Parameters of Conditional Formulas]
Table 50 below shows values of parameters in conditional formulas (1") through (4").

TABLE 50

| Parameters | | Numerical Values |
|---|---|---|
| F1 | | 105.2 |
| F2 | | −21.0 |
| F3 | | 59.3 |
| F4 | | 21.6 |
| F5 | | −319.7 |
| F1-1 | | −40.1 |
| F1-2 | | 65.4 |
| Bf | | 32.0 |
| (1") | |F1/F2| | 5.01 |
| (2") | F3/F4 | 2.75 |
| (3") | F5/Bf | −9.99 |
| (4") | F1-1/F1-2 | −0.61 |

Figure 25A:
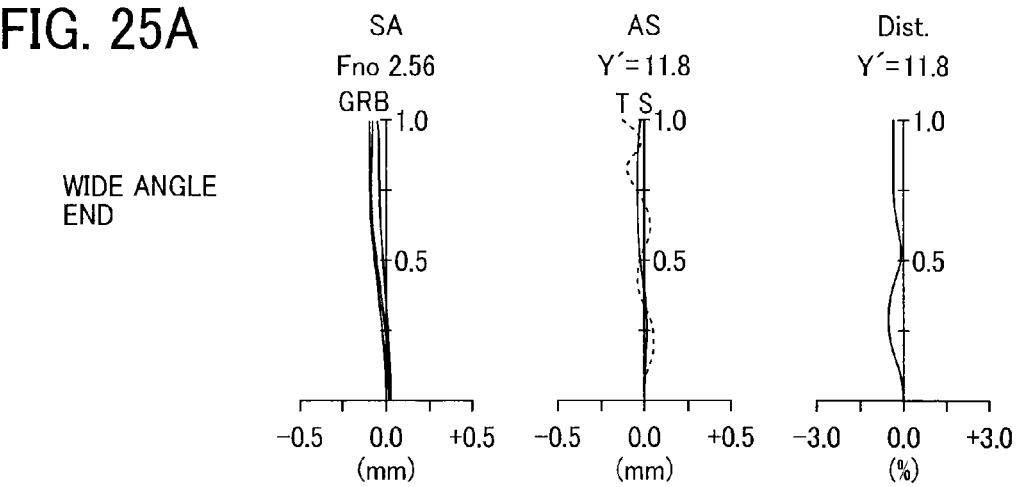
Figure 25B:
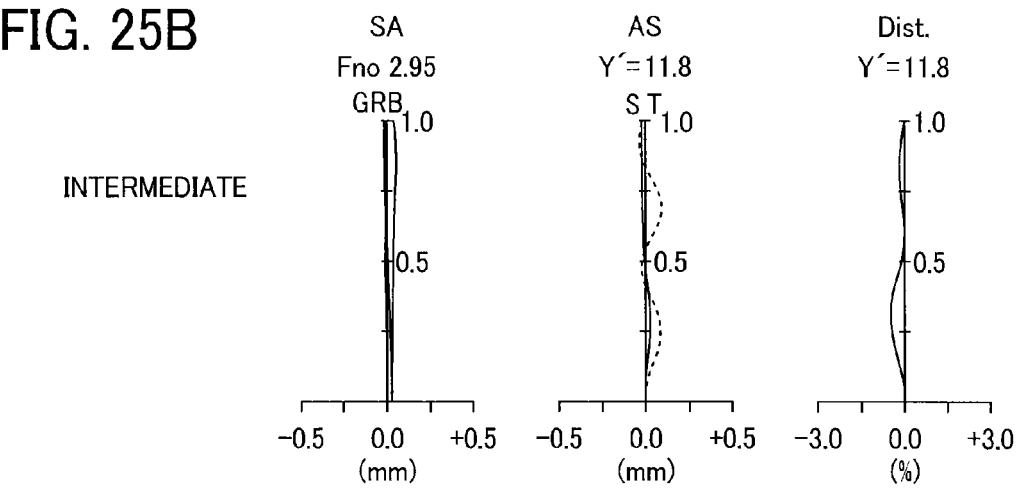
Figure 25C:
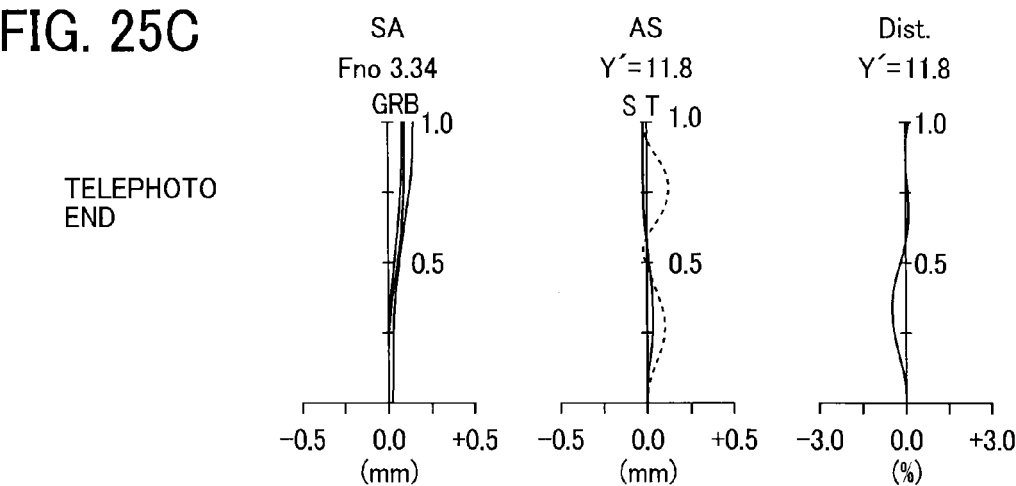

FIGS. 25A through 25C are diagrams of aberration of the projection lens PL in Example 12, as in FIGS. 23A through 23C.

Example 13

Figure 26A:
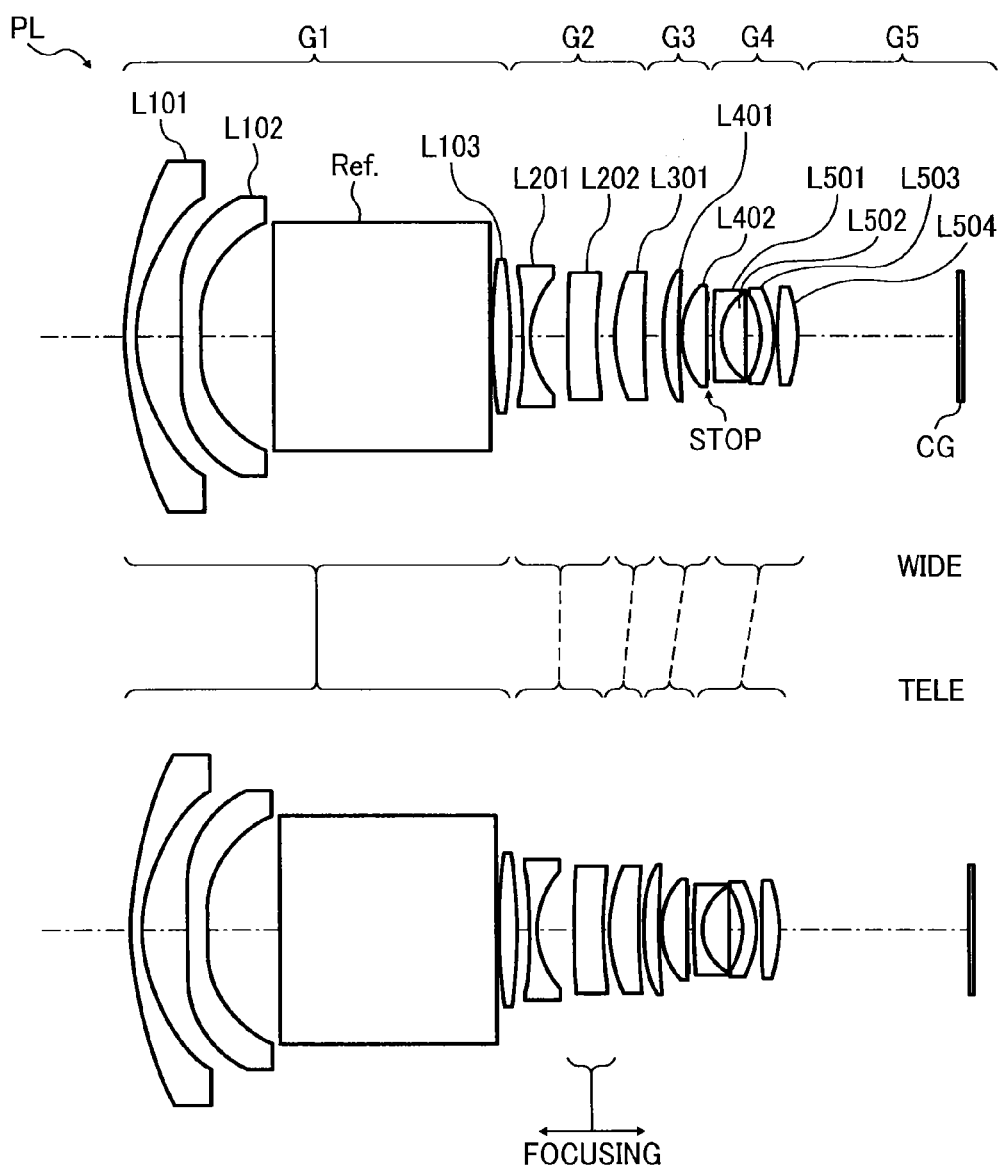
FIGS. 26A through 26C are views of a configuration, movement of changing magnification, and focusing movement of a projection lens according to Example 13.
Figure 26B:
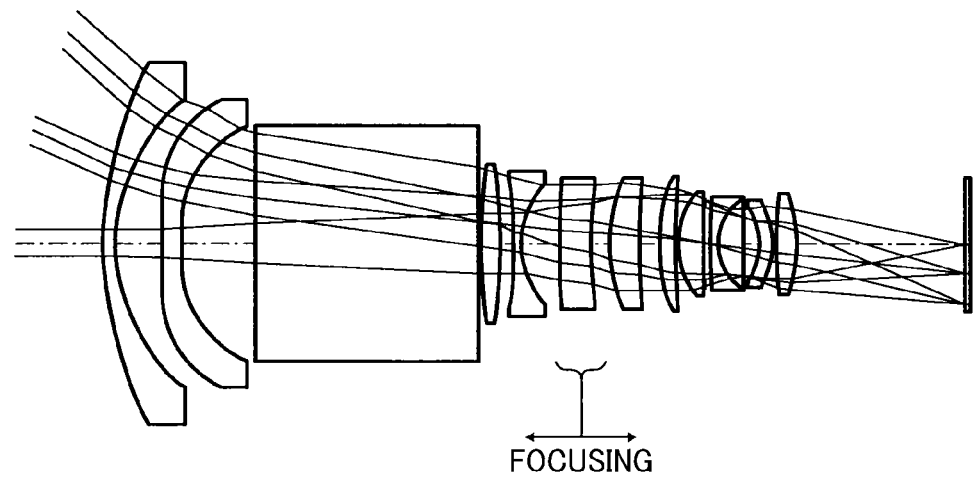
Figure 26C:
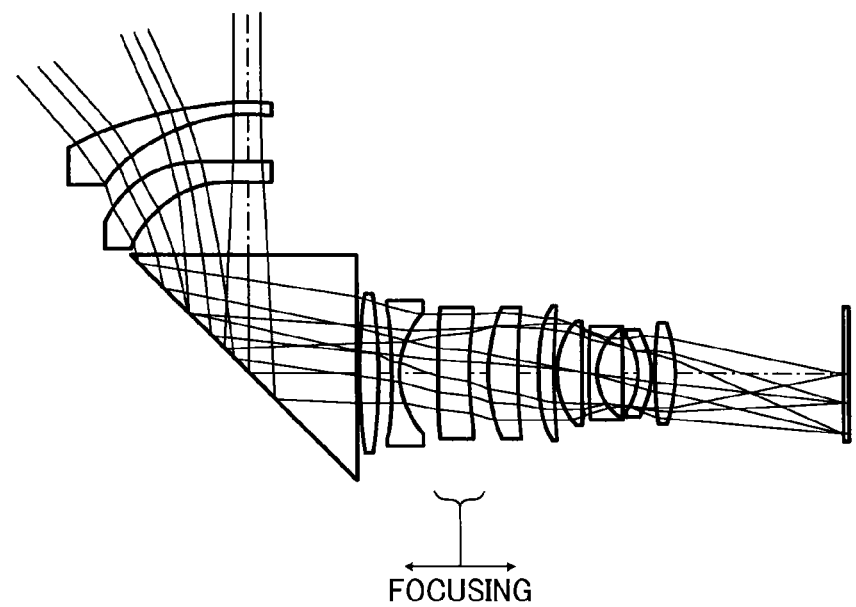

The projection lens PL according to Example 13 is as illustrated in FIGS. 26A through 26C.

As illustrated in FIG. 26A, a first lens group G1 includes a lens L101 through a lens L103, and a reflector Ref. A second lens group G2 includes a lens L201 through a lens L202. A third lens group G3 includes a lens L301. A fourth lens group G4 includes a lens L401 and a lens L402. A fifth lens group G5 includes a lens L501 through a lens L504.

An aperture stop STOP is disposed between the fourth lens group G4 and the fifth lens group G5.

In the projections lens PL according to Example 13, the lens L202 of the second lens group G2 moves as the moving group along the direction of the optical axis to perform focusing.

FIG. 26C is a diagram of optical paths of the projection lens PL according to Example 13 with the reflector Ref. as a right-angle prism.

It should be noted that, with oblique rays used as an image-forming rays, a configuration as illustrated in FIG. 26C is applicable that employs a first lens group G1 partially cut off. However, the projection lens PL is not limited to this configuration.

The first lens group G1 is a positive group including the lenses L101, L102, and L103, and the reflector Ref.

The second lens group G2 is a negative group, including two lenses L201 and L202.

The third lens group G3 is a positive group, including one lens L301.

The fourth lens group G4 is a positive group, including two lenses L401 and L402.

The fifth lens group G5 is a negative group, including four lenses L501, L502, L503, and L504.

Among the first lens group G1 through the fifth lens group G5, the first lens group G1 has the greatest thickness in the direction of the optical axis, as is clear from FIG. 26A.

In Example 13, the focal length of the entire system, the range of F, F-number, and a half angle of view ($\omega$) are as follows:

F is 13.1 through 15.8 mm, Fno is 2.56 through 3.35, and $\omega$ is 42.0° through 36.7°. Table 51 shows data regarding the projection lens PL in Example 13 below.

TABLE 51

| S | R | D | Nd | vd | Lens | Group | |
|---|---|---|---|---|---|---|---|
| 0 | INF | D0 | | | | | |
| 1 | 71.654 | 2.30 | 1.80400 | 46.6 | L101 | G1-1 | G1 |
| 2 | 33.371 | 9.00 | | | | | |
| 3 | −66.811 | 4.00 | 1.53111 | 56.0 | L102 | | |
| 4* | 157.587 | 13.63 | | | | | |
| 5 | INF | 0.0 | | | | | |
| 6 | INF | 43.0 | 1.51680 | 64.2 | PZ | | |
| 7 | INF | 0.48 | | | | | |
| 8 | 140.647 | 3.32 | 1.84666 | 23.8 | L103 | G1-2 | |
| 9 | −139.753 | D9 | | | | | |
| 10 | −77.510 | 1.60 | 1.43875 | 94.9 | L201 | G2 | |
| 11 | 17.613 | D11 | | | | | |
| 12 | 421.247 | 5.62 | 1.78125 | 47.3 | L202 | | |
| 13 | 64.368 | D13 | | | | | |
| 14 | 30.382 | 6.00 | 1.72000 | 46.0 | L301 | G3 | |
| 15 | 126.529 | D15 | | | | | |
| 16 | 36.148 | 2.87 | 1.69700 | 48.5 | L401 | G4 | |
| 17 | 87.275 | 0.40 | | | | | |
| 18 | 15.197 | 5.16 | 1.49700 | 81.5 | L402 | | |
| 19 | −206.418 | 0.30 | | | | | |
| 20 | INF | D20 | | | | | |
| 21 | 94.491 | 1.60 | 1.83400 | 37.3 | L501 | G5 | |
| 22 | 9.395 | 4.99 | 1.48749 | 70.4 | L502 | | |
| 23 | 930.351 | 3.25 | | | | | |
| 24 | −11.887 | 2.34 | 1.80000 | 29.8 | L503 | | |
| 25 | −15.483 | 0.63 | | | | | |
| 26* | 89.410 | 3.75 | 1.48749 | 70.4 | L504 | | |
| 27* | −25.352 | D27 | | | | | |
| 28 | INF | 1.00 | 1.51680 | 64.2 | CG | — | |
| 29 | INF | — | | | | | |

[Data Regarding Aspherical Surface]
Table 52 shows data regarding aspherical surfaces below.

TABLE 52

|  | 3 | 4 | 26 | 27 |
|---|---|---|---|---|
| k | 0 | 0 | 0 | 0 |
| C4 | 8.3734E−05 | 8.5222E−05 | 4.1993E−06 | 1.9827E−05 |
| C6 | −2.0112E−07 | −1.4552E−07 | −6.6870E−08 | −1.0811E−07 |

TABLE 52-continued

|  | 3 | 4 | 26 | 27 |
|---|---|---|---|---|
| C8 | 2.5696E−10 | −7.1500E−11 | 1.6644E−09 | 2.2224E−09 |
| C10 | 4.2186E−14 | 6.2871E−13 | −1.1364E−11 | −1.5761E−11 |
| C12 | −4.7473E−16 | 8.9440E−16 | 0 | 0 |
| C14 | 4.5023E−19 | −5.1031E−18 | 0 | 0 |
| C16 | −1.1939E−22 | 4.7520E−21 | 0 | 0 |

In Table 49, surface distances D9, D11, D13, D15, D20, and D27 vary depending on the position of focusing, such as the wide angle end, the intermediate focal length, and the telephoto end, with an objection distance of 1600 mm (=D0). Table 53 shows the detailed data.

TABLE 53

|  | D9 | D11 | D13 | D15 | D20 | D27 |
|---|---|---|---|---|---|---|
| Wide angle end | 2.36 | 7.38 | 3.71 | 3.62 | 0.87 | 32.00 |
| Intermediate | 2.37 | 7.38 | 2.10 | 2.58 | 1.16 | 34.34 |
| Telephoto end | 2.70 | 7.38 | 0.97 | 0.80 | 1.42 | 36.67 |

In the projections lens according to Example 13, the lens L202 within at least one lens of the second lens group G2 simultaneously moves as the moving group along the direction of the optical axis to perform focusing.

Table 54 shows the values of D11 and D13 with changes in size of screen at the wide angle end.

TABLE 54

| Screen Size | D11 | D13 |
|---|---|---|
| 40 inch | 7.24 | 3.85 |
| 80 inch | 7.38 | 3.71 |
| 300 inch | 7.48 | 3.61 |

[Values of Parameters of Conditional Formulas]

Table 55 below shows values of parameters in conditional formulas (1″) through (3″). Conditional formula (4″) does not apply to Example 4, in which the lens L202 other than the lenses of the first lens group G1 moves to perform focusing.

TABLE 55

| Parameters | Numerical Values |
|---|---|
| F1 |  | 224.1 |
| F2 |  | −22.4 |
| F3 |  | 53.9 |
| F4 |  | 22.2 |
| F5 |  | −200.2 |
| Bf |  | 32.0 |
| (1″) | |F1/F2| | 10.00 |
| (2″) | F3/F4 | 2.43 |
| (3″) | F5/Bf | −6.25 |

FIGS. 27A through 27C are diagrams of aberration of the projection lens PL in Example 14, as in FIGS. 23A through 23C.

Example 14

Figure 28A:
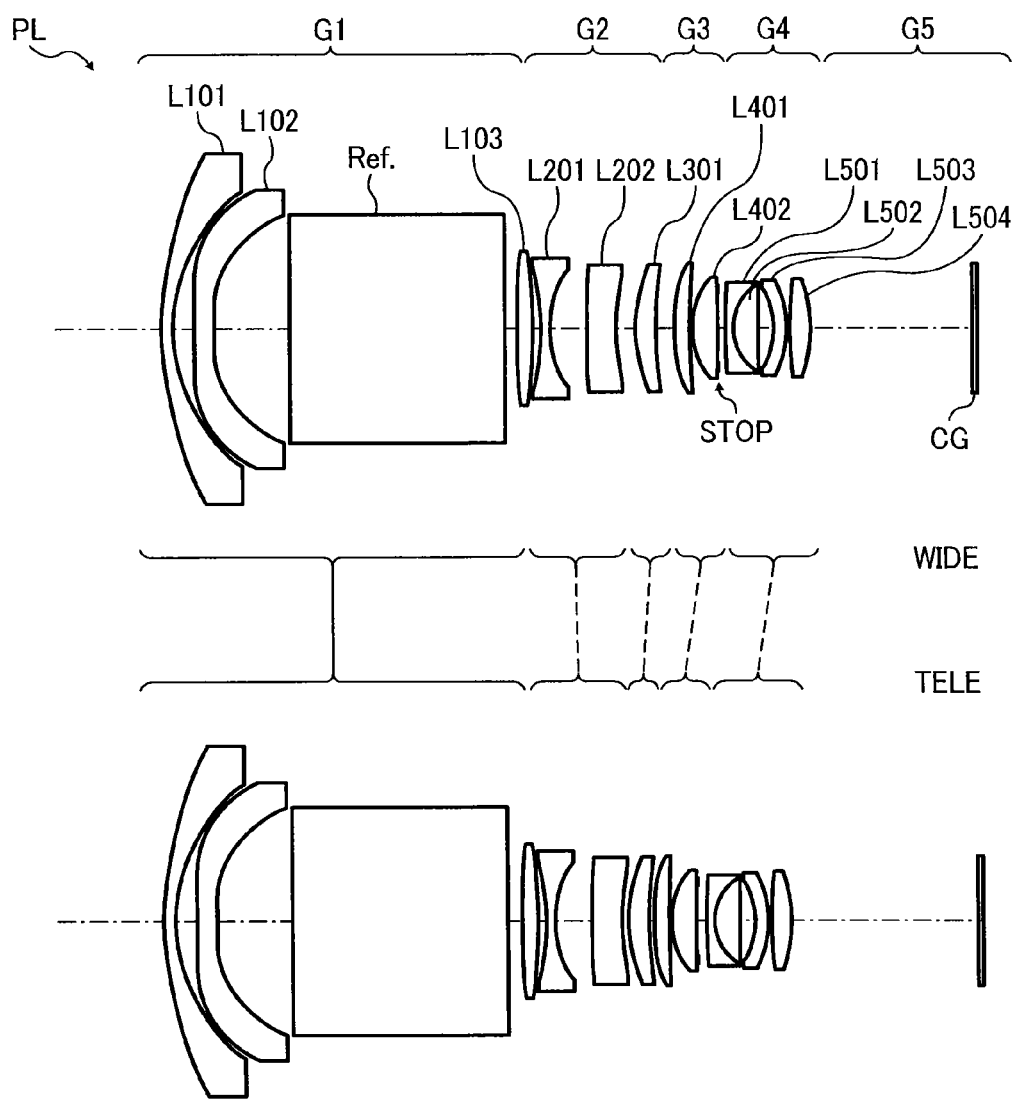
FIGS. 28A through 28C are views of a configuration, movement of changing magnification, and focusing movement of a projection lens according to Example 14.
Figure 28B:
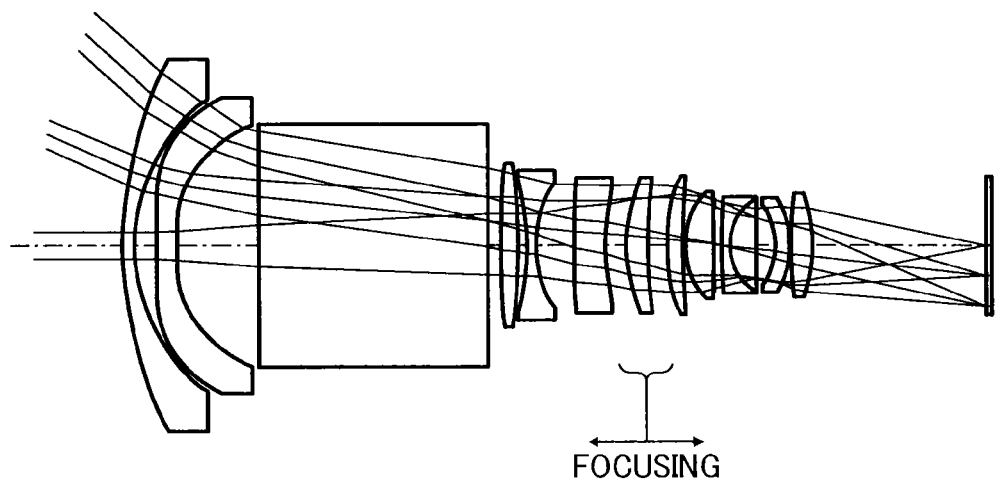
Figure 28C:
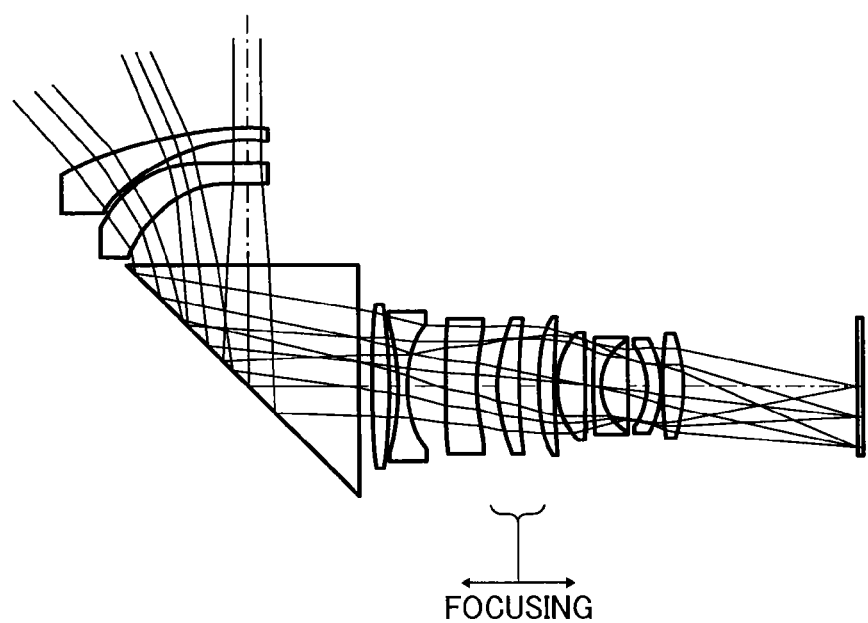

The projection lens PL according to Example 14 is as illustrated in FIGS. 28A through 28C.

A first lens group G1 includes lenses L101 through L103, and a reflector Ref. A second lens group G2 includes lenses L201 and L202. A third lens group G3 includes a lens L301. A fourth lens group G4 includes a lens 401 and a lens 402. A fifth lens group G5 includes lenses L501 through L504.

An aperture stop STOP is disposed between the fourth lens group G4 and the fifth lens group G5.

In the projections lens PL according to Example 14, the lens L301 of the third lens group G3 moves along the direction of the optical axis to perform focusing.

It should be noted that, with oblique rays used as an image-forming rays, a configuration as illustrated in FIG. 28C is applicable that employs a first lens group G1 partially cut off. However, the projection lens PL is not limited to this configuration.

The first lens group G1 is a positive group including the lenses L101, L102, and L103, and the reflector Ref.

The second lens group G2 is a negative group, including two lenses L201 and L202.

The third lens group G3 is a positive group, including one lens L301.

The fourth lens group G4 is a positive group, including two lenses L401 and L402.

The fifth lens group G5 is a negative group, including four lenses L501, L502, L503, and L504.

Among the first lens group G1 through the fifth lens group G5, the first lens group G1 has the greatest thickness in the direction of the optical axis, as is clear from FIG. 28A.

In Example 14, the focal length of the entire system, the range of F, F-number, and a half angle of view (ω) are as follows:

F is 13.0 through 15.8 mm, Fno is 2.56 through 3.35, and ω is 42.0° through 36.7°. Table 56 shows data regarding the projection lens PL in Example 14 below.

TABLE 56

| S | R | D | Nd | vd | Lens | Group |
|---|---|---|---|---|---|---|
| 0 | — | D0 |  |  |  |  |
| 1 | 70.431 | 2.30 | 1.80400 | 46.6 | L101 | G1-1 G1 |
| 2 | 32.999 | 4.00 |  |  |  |  |
| 3* | −76.034 | 4.00 | 1.53111 | 56.0 | L102 |  |
| 4* | 114.794 | 15.10 |  |  |  |  |
| 5 | INF | 0.0 |  |  |  |  |
| 6 | INF | 43.00 | 1.51680 | 64.2 | PZ |  |
| 7 | INF | 2.13 |  |  |  |  |
| 8 | 179.752 | 3.47 | 1.84666 | 23.8 | L103 | G1-2 |
| 9 | −91.418 | D9 |  |  |  |  |
| 10 | −48.291 | 1.60 | 1.43875 | 94.9 | L201 | G2 |
| 11 | 19.317 | 7.32 |  |  |  |  |
| 12 | 176.846 | 6.00 | 1.83400 | 37.3 | L202 |  |
| 13 | 52.309 | D13 |  |  |  |  |
| 14 | 29.101 | 4.19 | 1.72000 | 46.0 | L301 | G3 |
| 15 | 84.911 | D15 |  |  |  |  |
| 16 | 36.651 | 3.17 | 1.69700 | 48.5 | L401 | G4 |
| 17 | 142.042 | 0.30 |  |  |  |  |
| 18 | 15.555 | 5.19 | 1.49700 | 81.5 | L402 |  |
| 19 | −312.383 | 0.30 |  |  |  |  |
| 20 | INF | D20 |  |  |  |  |
| 21 | 102.077 | 1.60 | 1.83400 | 37.3 | L501 | G5 |
| 22 | 9.596 | 5.10 | 1.48749 | 70.4 | L502 |  |
| 23 | −447.319 | 3.17 |  |  |  |  |
| 24 | −12.654 | 2.93 | 1.80000 | 29.8 | L503 |  |
| 25 | −16.937 | 0.30 |  |  |  |  |
| 26* | 75.062 | 3.90 | 1.48749 | 70.4 | L504 |  |
| 27* | −26.904 | D27 |  |  |  |  |
| 28 | INF | 1.0 | 1.51680 | 64.2 | CG | — |
| 29 | INF | — |  |  |  |  |

[Data Regarding Aspherical Surface]
Table 57 shows data regarding aspherical surfaces below.

TABLE 57

|  | 3 | 4 | 26 | 27 |
|---|---|---|---|---|
| k | 0 | 0 | 0 | 0 |
| C4 | 8.41056E−05 | 8.77272E−05 | 9.25126E−07 | 1.68281E−05 |
| C6 | −2.00679E−07 | −1.48849E−07 | −1.02093E−07 | −1.55443E−07 |
| C8 | 2.56351E−10 | −6.34580E−11 | 1.51338E−09 | 2.03654E−09 |
| C10 | 4.33244E−14 | 6.43428E−13 | −7.91027E−12 | −1.20687E−11 |
| C12 | −4.72205E−16 | 8.98724E−16 | 0.00000E+00 | 0.00000E+00 |
| C14 | 4.51967E−19 | −5.13970E−18 | 0.00000E+00 | 0.00000E+00 |
| C16 | −1.23302E−22 | 4.79525E−21 | 0.00000E+00 | 0.00000E+00 |

In Table 53, surface distances D9, D13, D15, D20, and D27 vary depending on the position of focusing, such as the wide angle end, the intermediate focal length, and the telephoto end, with an objection distance of 1600 mm (=D0). Table 58 shows the detailed data.

TABLE 58

|  | D9 | D13 | D15 | D20 | D27 |
|---|---|---|---|---|---|
| Wide angle end | 1.53 | 3.53 | 3.65 | 0.90 | 32.00 |
| Intermediate | 1.50 | 2.08 | 2.53 | 1.18 | 34.32 |
| Telephoto end | 1.58 | 1.09 | 0.80 | 1.41 | 36.74 |

In the projections lens according to Example 14, the lens L301 within the third lens group G3 simultaneously moves as the moving group along the direction of the optical axis to perform focusing.

Table 59 shows the values of D13 and D15 with changes in size of screen at the wide angle end.

TABLE 59

| Screen Size | D13 | D15 |
|---|---|---|
| 40 inch | 3.61 | 3.57 |
| 80 inch | 3.53 | 3.65 |
| 300 inch | 3.46 | 3.72 |

[Values of Parameters of Conditional Formulas]
Table 60 below shows values of parameters in conditional formulas (1") through (3"). Conditional formula (4") does not apply to Example 14 as in Example 13.

TABLE 60

| Parameters | | Numerical Values |
|---|---|---|
| F1 | | 105.2 |
| F2 | | −21.0 |
| F3 | | 59.3 |
| F4 | | 21.6 |
| F5 | | −319.7 |
| F1-1 | | 32.0 |
| (1") | |F1/F2| | 5.01 |
| (2") | F3/F4 | 2.75 |
| (3") | F5/Bf | −9.99 |

FIGS. 29A through 29C are diagrams of aberration of the projection lens PL in Example 14, as in FIGS. 23A through 23C.

As illustrated in the aberration diagrams of Examples, highly accurate correction is performed on various aberration, such as spherical aberration, astigmatism, field curvature, lateral chromatic aberration, and distortion in the projection lens PL according to each Example of the present disclosure.

In Examples 11 through 14, the fluctuations in aberration are small over the entire zoom range.

In the projection lens PL according to Examples 11 through 14, making the combined focal length of the lens L101 and the lens L102 negative allows a wide angle of view. In this case, the lens L101 and the lens L102 are disposed on the magnification side of the reflector Ref. in the first lens group G1.

In Examples 11 through 14, the first lens group G1 has the greatest thickness along the direction of the optical axis among the first lens group G1 through the fifth lens group G5. In this case, the thickness along the optical axis refers to the distance between the maximum-magnification-side surface and the most-reduction-side surface in each lens group. This configuration secures a sufficient space to allow the light rays to bend within the first lens group G1.

With the configurations according to the embodiments of the present disclosure, the projection lens and the image display device are produced as follows.

—Aspect 1"—

A projection lens PL (Examples 11 through 14) is a projection optical system (M, CW, CL) of an image display device to enlarge and project an image displayed on a display surface of an image display element 3 onto a projection surface. The projection lens PL includes, in order from a magnification side to a reduction side, a first lens group G1 having a positive refractive power fixed while changing magnification from a wide angle end to a telephoto end; a second lens group G2 having a negative refractive power; a third lens group G3 having a positive refractive power; a fourth lens group G4 having a positive refractive power; and a fifth lens group G5 having a negative refractive power. The second lens group G2, the third lens group G3, the fourth lens group G4, and the fifth lens group G5 separately move to the reduction side or the magnification side while changing magnification from the wide angle end to the telephoto end.

—Aspect 2"—

In the projection lens PL (Examples 11 through 14) according to Aspect 1", with the first lens group G1 fixed, the second lens group G2 moves to the reduction side, and the third lens group G3, the fourth lens group G4, and the fifth lens group G5 move to the magnification side by different amounts of movement while changing magnification from the wide angle end to the telephoto end.

—Aspect 3"—

The projection lens PL (Examples 11 through 14) according to Aspect 1" or 2" further includes a reflector Ref. disposed between lenses within the first lens group G1, to bend an optical path.

—Aspect 4"—

In the projection lens PL (Examples 11 and 12) according to any one of Aspects 1" through 3", at least one lens of the first lens group G1 moves along the direction of the optical axis to perform focusing.

—Aspect 5"—

In the projection lens (Examples 13 and 14) according to any one of Aspects 1" through 3", at least one lens of the second lens group G2 or the third lens group G3 moves along the direction of the optical axis to perform focusing.

—Aspect 6"—

In the projection lens PL (Examples 11 through 14) according to any one of Aspects 1" through 5", conditional formula (1") below is satisfied:

$$4.0<|F1/F2|<50.0, \quad (1")$$

where F1 is the focal length of the first lens group G1, and F2 is the focal length of the second lens group G2.

—Aspect 7"—

In the projection lens PL (Examples 11 through 14) according to any one of Aspects 1" through 6", conditional formula (2") below is satisfied:

$$2.0<F3/F4<4.0, \quad (2")$$

where F3 is the focal length of the third lens group G3, and F4 is the focal length of the fourth lens group G4.

—Aspect 8"—

In the projection lens PL (Examples 11 through 14) according to any one of Aspects 1" through 7", conditional formula (3") below is satisfied:

$$-11.0<F5/BF<-5.0, \quad (3")$$

where F5 is the focal length of the fifth lens group G5, and BF is the back focus at the wide angle end.

—Aspects 9"—

In the projection lens (Examples 11 and 12) according to Aspect 3", conditional formula (4") is satisfied:

$$0.1<|f1\text{-}1/f1\text{-}2|<2.0 \text{ is satisfied}, \quad (4")$$

where f1-1 is the focal length of at least one lens that moves while focusing in the first lens group G1; and f1-2 is the focal length of at least one lens fixed while focusing.

—Aspect 10"—

An image display device (FIGS. 13A and 13B) includes a light source to emit light rays; an image display element having a display surface to be displayed with an image to be projected; an illumination optical system to illuminate the display surface of the image display element with the light rays emitted from the light source; and a projection optical system to receive, from the illumination optical system, a projection light rays modulated by the image displayed on the display surface, to enlarge and project the image onto a projection surface. The projection optical system is the projection lens PL according to Aspects 1" through 9".

Although the embodiments of the present disclosure have been described above, the present disclosure is not limited to the embodiments described above, and a variety of modifications can naturally be made within the scope of the present disclosure.

An example was given above, of that with the first lens group G1 fixed, the second lens group G2 moves toward the reduction side, and the third lens group G3, the fourth lens group G4, and the fifth lens group G5 move toward the magnification side by the respective amount of movement while changing magnification from the wide angle end to the telephoto end.

However, the projection lens PL according to the embodiments of the present disclosure is not limited to such configuration, regarding the movement of the second lens group G2 through the fifth lens group G5 move while changing magnification from the wide angle end to the telephoto end. Alternatively, in some embodiments, another configuration may be employed that separately moves the second lens group G2 through the fifth lens group G5 from the magnification side to the reduction side.

Particularly, the fifth lens group G5 functions to correct aberration, moving toward the reduction side to adjust the refractive power of the fifth lens group G5 while changing magnification from the wide angle end to the telephoto end.

In the projection lens PL according to the embodiments and Examples, the first lens group G1 includes a right-angle prism as the reflector Ref. to bend the optical paths.

However, the present disclosure is not limited to this configuration. A configuration without the reflector Ref. (the right-angle prism) in the first lens group G1 is also applicable. Alternatively, instead of the reflector Ref. in FIGS. 22A through 22C, 24A through 24C, 26A through 26C, and 28A through 28C, a transparent block may be employed. Such configuration reduces the actual length in the optical path from the lens L102 to the lens L103 in the first lens group G1, thus reducing the size in the projection lens PL.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A projection lens for a projection optical system of an image display device to enlarge and project an image displayed on a display surface of an image display element onto a projection surface, the projection lens comprising, in order from a magnification side to a reduction side:
    a first lens group having a negative refractive power;
    a reflector to bend an optical path;
    a second lens group having a positive refractive power; and
    an aperture stop disposed within the second lens group,
    the second lens group having a positive refractive power on the magnification side of the aperture stop and a negative refractive power on the reduction side of the aperture stop,
    wherein conditional formula (A) below is satisfied:

$$Ot/Y'<6.1, \quad (A)$$

where Ot is a distance along an optical axis between a maximum-magnification-side surface of the first lens group and a surface of a lens adjacent to a reduction-side surface of the reflector, and Y' is a maximum height of the image displayed on the display surface of the image display element.

2. The projection lens according to claim 1,
    wherein the first lens group moves along a direction of the optical axis to perform focusing.

3. The projection lens according to claim 1,
    wherein at least one lens of the second lens group moves along a direction of the optical axis to perform focusing.

4. The projection lens according to claim 1,
wherein conditional formula (1) below is satisfied:

$$3.3<|F1|/F<4.6, \tag{1}$$

where F is the focal length of an entire lens system and F1 is the focal length of the first lens group.

5. An image display device comprising:
a light source to emit light rays;
an image display element having a display surface to display an image to be projected;
an illumination optical system to illuminate the display surface of the image display element with the light rays emitted from the light source; and
a projection optical system comprising the projection lens according to claim 1, to receive, from the illumination optical system, projection light rays modulated by the image displayed on the display surface, to enlarge and project the image onto a projection surface.

6. A projection lens for a projection optical system of an image display device to enlarge and project an image displayed on a display surface of an image display element onto a projection surface, the projection lens comprising in order from a magnification side to a reduction side:
a first lens group;
a second lens group having a negative refractive power;
a third lens group having a positive refractive power;
a fourth lens group having a positive refractive power; and
a fifth lens group having a negative refractive power,
wherein with the first lens group fixed, the second lens group, the third lens group, the fourth lens group, and the fifth lens group separately move to the reduction side or the magnification side in a change in magnification from a wide angle end to a telephoto end.

7. The projection lens according to claim 6,
wherein the first lens group has a negative refractive power, and
wherein the first lens group has a greater thickness in a direction of an optical axis than a thickness of each of the second lens group, the third lens group, the fourth lens group, and the fifth lens group in the direction of the optical axis.

8. The projection lens according to claim 7,
wherein, with the first lens group fixed, the second lens group moves to the reduction side, and the third lens group, the fourth lens group, and the fifth lens group move to the magnification side by different amounts of movement while changing magnification from the wide angle end to the telephoto end.

9. The projection lens according to claim 7, further comprising a reflector disposed between lenses within the first lens group to bend an optical path.

10. The projection lens according to claim 7,
wherein at least one lens of the first lens group and the third lens group moves along the direction of the optical axis to perform focusing.

11. The projection lens according to claim 7,
wherein conditional formula (1') below is satisfied:

$$0.1<F1/F2<50.0, \tag{1'}$$

where F1 is the focal length of the first lens group and F2 is the focal length of the second lens group.

12. The projection lens according to claim 7,
wherein conditional formula (3') below is satisfied:

$$-9.5<F5/Bf<-3.5, \tag{3'}$$

where F5 is the focal length of the fifth lens group and f is the back focus at the wide angle end.

13. The projection lens according to claim 6,
wherein the first lens group has a positive refractive power.

14. The projection lens according to claim 13,
wherein, with the first lens group fixed, the second lens group moves to the reduction side, and the third lens group, the fourth lens group, and the fifth lens group move to the magnification side by different amounts of movement while changing magnification from the wide angle end to the telephoto end.

15. The projection lens according to claim 13, further comprising a reflector disposed between lenses within the first lens group to bend an optical path.

16. The projection lens according to claim 13,
wherein at least one lens of each of the first lens group, the second lens group, and the third lens group moves along a direction of an optical axis to perform focusing.

17. The projection lens according to claim 13,
wherein conditional formula (1") below is satisfied:

$$4.0 \leq |F1/F2|<50.0, \tag{1"}$$

where F1 is the focal length of the first lens group and F2 is the focal length of the second lens group.

18. The projection lens according to claim 13,
wherein conditional formula (2") below is satisfied:

$$2.0<F3/F4<4.0, \tag{2"}$$

where F3 is the focal length of the third lens group and F4 is the focal length of the fourth lens group.

19. The projection lens according to claim 6,
wherein conditional formula (3") below is satisfied:

$$-11.0<F5/BF<-5.0, \tag{3"}$$

where F5 is the focal length of the fifth lens group and BF is the back focus at the wide angle end.

20. An image display device comprising:
a light source to emit light rays;
an image display element having a display surface to display an image to be projected;
an illumination optical system to illuminate the display surface of the image display element with the light rays emitted from the light source; and
a projection optical system comprising the projection lens according to claim 6, to receive, from the illumination optical system, projection light rays modulated by the image displayed on the display surface, to enlarge and project the image onto a projection surface.

\* \* \* \* \*